(12) United States Patent
Turner

(10) Patent No.: US 10,465,373 B2
(45) Date of Patent: Nov. 5, 2019

(54) INTEGRATED STRUCTURAL MEMBER

(71) Applicant: Cole David Kazuyuki Turner, Dartmouth (CA)

(72) Inventor: Cole David Kazuyuki Turner, Dartmouth (CA)

( * ) Notice: Subject to any disclaimer, the term of this patent is extended or adjusted under 35 U.S.C. 154(b) by 54 days.

(21) Appl. No.: 15/663,118

(22) Filed: Jul. 28, 2017

(65) Prior Publication Data

US 2018/0051457 A1 Feb. 22, 2018

Related U.S. Application Data

(60) Provisional application No. 62/367,846, filed on Jul. 28, 2016.

(51) Int. Cl.
| | |
|---|---|
| *E04B 1/19* | (2006.01) |
| *F16S 3/08* | (2006.01) |
| *H01R 4/28* | (2006.01) |
| *H01R 4/58* | (2006.01) |
| *H01R 35/02* | (2006.01) |

(52) U.S. Cl.
CPC .............. *E04B 1/1903* (2013.01); *F16S 3/08* (2013.01); *E04B 2001/1924* (2013.01); *E04B 2001/1933* (2013.01); *E04B 2001/1936* (2013.01); *E04B 2001/1963* (2013.01); *E04B 2001/1987* (2013.01); *H01R 4/28* (2013.01); *H01R 4/58* (2013.01); *H01R 35/02* (2013.01)

(58) Field of Classification Search
CPC .. E04B 2001/1963; E04B 1/1903; E04B 1/19; E04B 2001/1927; E04B 2001/193; Y10T 403/342

USPC .................................. 411/149, 196, 192, 193
See application file for complete search history.

(56) References Cited

U.S. PATENT DOCUMENTS

| | | | |
|---|---|---|---|
| 1,530,611 A * | 3/1925 | Parker | A63H 33/107 446/123 |
| 2,257,770 A | 10/1941 | Szego | |
| 2,313,280 A | 3/1943 | Szego | |
| 2,352,296 A | 6/1944 | Szego | |
| 2,980,216 A * | 4/1961 | Richards | E04G 1/12 403/170 |
| 3,062,340 A | 11/1962 | Hunnebeck | |

(Continued)

FOREIGN PATENT DOCUMENTS

| | | |
|---|---|---|
| BE | 895191 A1 | 3/1983 |
| CA | 1131872 | 9/1982 |

(Continued)

*Primary Examiner* — Brian D Mattei
*Assistant Examiner* — Daniel J Kenny
(74) *Attorney, Agent, or Firm* — Blake, Cassels & Graydon LLP; Brett J. Slaney

(57) ABSTRACT

An assembly for integrating an elongate structural member is provided. The elongate structural member includes a first end portion, a second end portion, and an elongate mid-portion that extends between the first and the second end portions. The first end portion is within a first plane and the second end portion within a second plane, and the first and the second planes are offset and parallel to each other. The elongate mid-portion is sloped between the first and the second planes. each of the first and the second end portions defining therein a polygonal hole. Multiple elongate structural members may be used to assemble a lattice structure.

33 Claims, 48 Drawing Sheets

(56) References Cited

U.S. PATENT DOCUMENTS

| | | | |
|---|---|---|---|
| 3,221,464 A * | 12/1965 | Miller | E04B 1/19 52/651.09 |
| 3,431,694 A | 3/1969 | Hunnebeck | |
| 3,857,218 A * | 12/1974 | Gilb | E04C 3/292 52/692 |
| 4,062,167 A * | 12/1977 | Gilb | E04C 3/292 403/217 |
| 4,247,218 A * | 1/1981 | Jeannin | E04B 1/1903 403/217 |
| 4,308,699 A * | 1/1982 | Slysh | B64G 9/00 244/159.5 |
| 4,347,690 A | 9/1982 | Wallace, Jr. | |
| 4,622,795 A * | 11/1986 | Codd | E04B 1/1903 403/172 |
| 4,835,932 A * | 6/1989 | Leete, II | E04B 1/1903 52/108 |
| 5,070,673 A | 12/1991 | Weisse | |
| 5,163,262 A | 11/1992 | Adams | |
| 5,165,214 A | 11/1992 | Codd | |
| 5,265,395 A | 11/1993 | Lalvani | |
| 5,661,942 A * | 9/1997 | Palmer | E04H 15/48 135/156 |
| 5,701,713 A | 12/1997 | Silver | |
| 6,076,324 A | 6/2000 | Daily | |
| 6,145,269 A | 11/2000 | Fisher | |
| 6,321,501 B1 | 11/2001 | Ignash | |
| D518,342 S * | 4/2006 | Hsien | D8/21 |
| 7,318,303 B1 | 1/2008 | Kling | |
| 7,678,440 B1 | 3/2010 | McKnight | |
| D630,263 S * | 1/2011 | Smith | D21/486 |
| 7,921,613 B2 | 4/2011 | Nii | |
| 7,954,296 B2 | 6/2011 | Newland | |
| 8,176,635 B2 | 5/2012 | Queheillalt et al. | |
| 8,286,392 B2 | 10/2012 | Noble et al. | |
| 8,627,612 B2 | 1/2014 | Wilsey | |
| 8,745,958 B2 | 6/2014 | Kang et al. | |
| 9,970,189 B2 * | 5/2018 | Szymberski | G09B 23/04 |
| 2003/0101663 A1 | 6/2003 | Boots | |
| 2005/0011318 A1 | 1/2005 | Tsai | |
| 2005/0144884 A1 | 7/2005 | Moriya | |
| 2005/0225172 A1 | 10/2005 | Brightwell | |
| 2010/0300010 A1 | 1/2010 | Vallejo | |
| 2010/0205892 A1 | 8/2010 | Lemyre | |
| 2012/0009010 A1 | 1/2012 | Wu | |
| 2013/0291476 A1 | 11/2013 | Broughton, Jr. et al. | |
| 2014/0130424 A1* | 5/2014 | Betts | A01K 1/00 52/81.3 |
| 2014/0158285 A1 | 6/2014 | Brockwell | |

FOREIGN PATENT DOCUMENTS

| | | |
|---|---|---|
| CN | 104831851 A | 8/2015 |
| DE | 202014002499 U1 | 5/2014 |
| EP | 0031804 A1 | 7/1981 |
| EP | 0453049 A1 | 10/1991 |
| FR | 2567990 | 1/1986 |
| WO | 9941466 | 8/1999 |

* cited by examiner

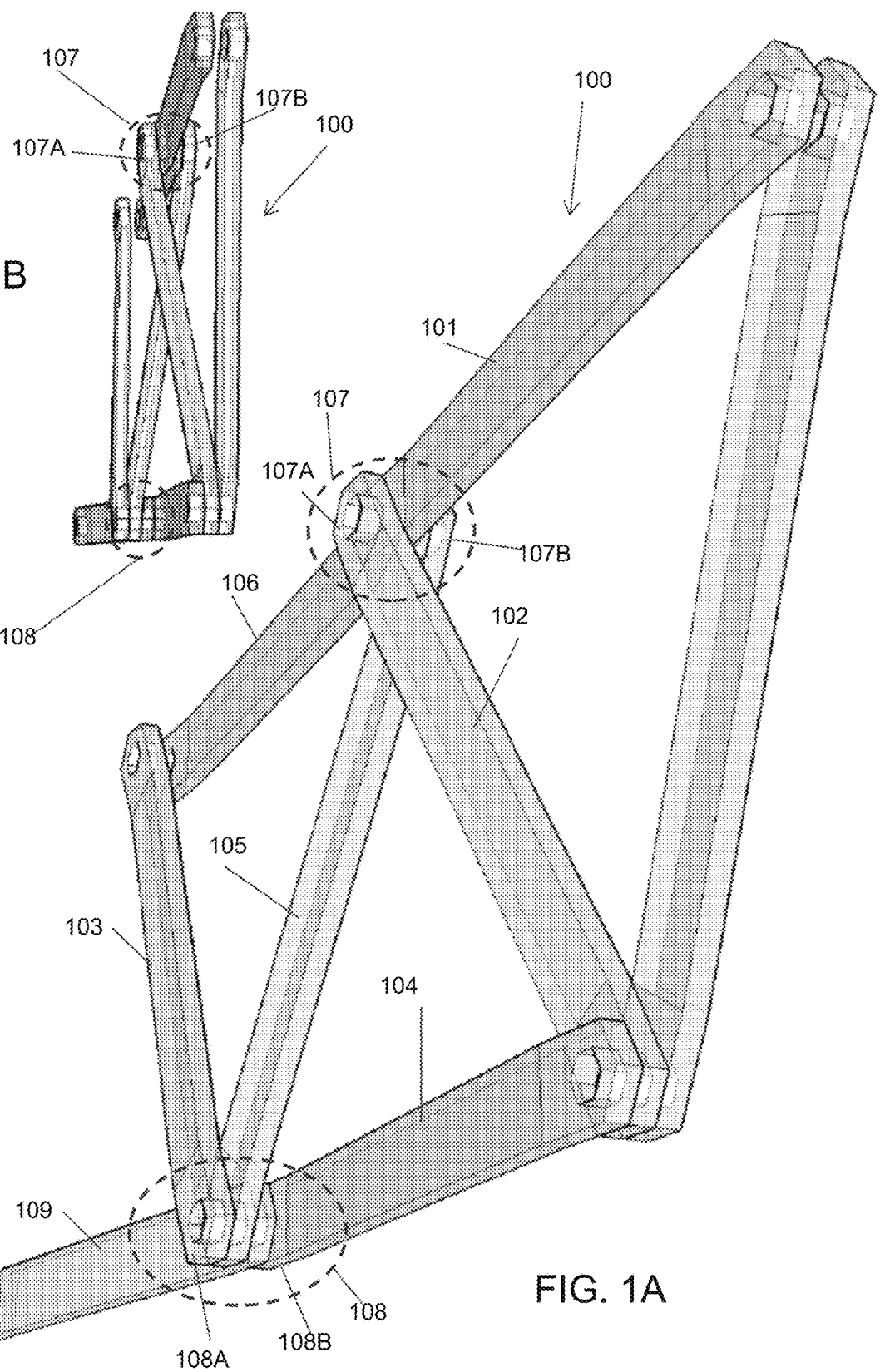

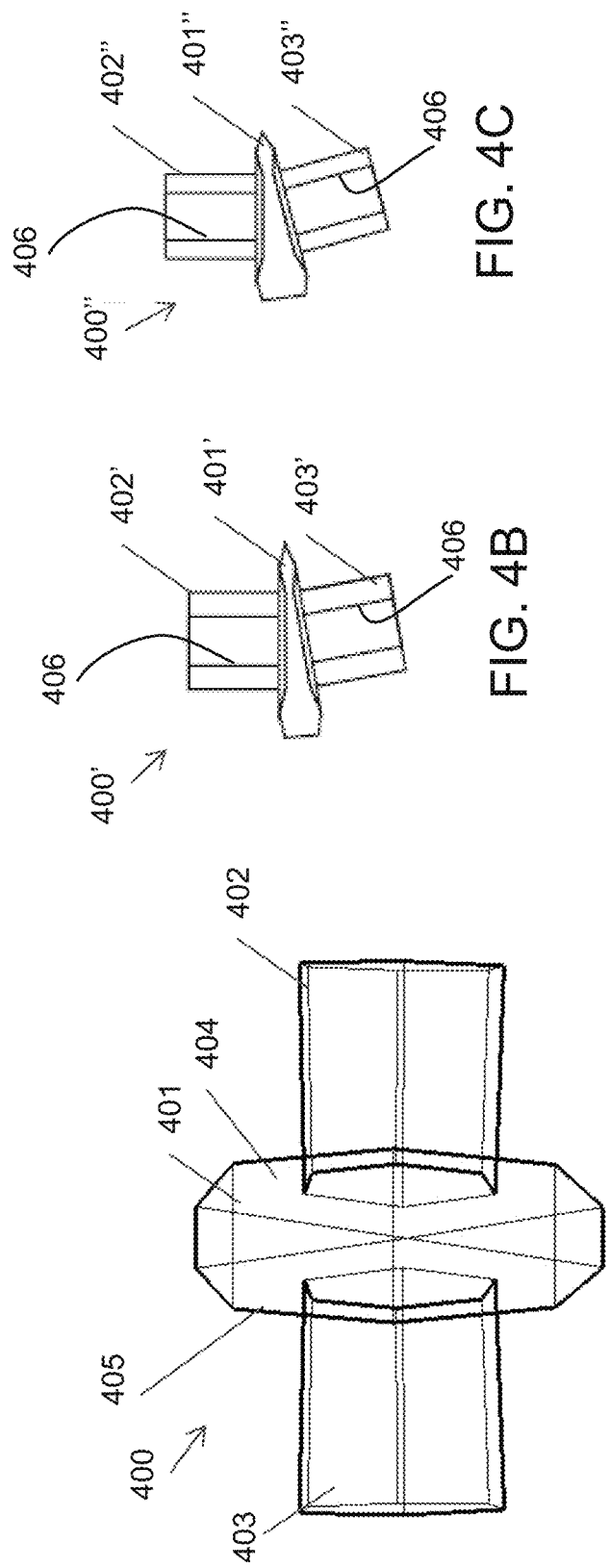

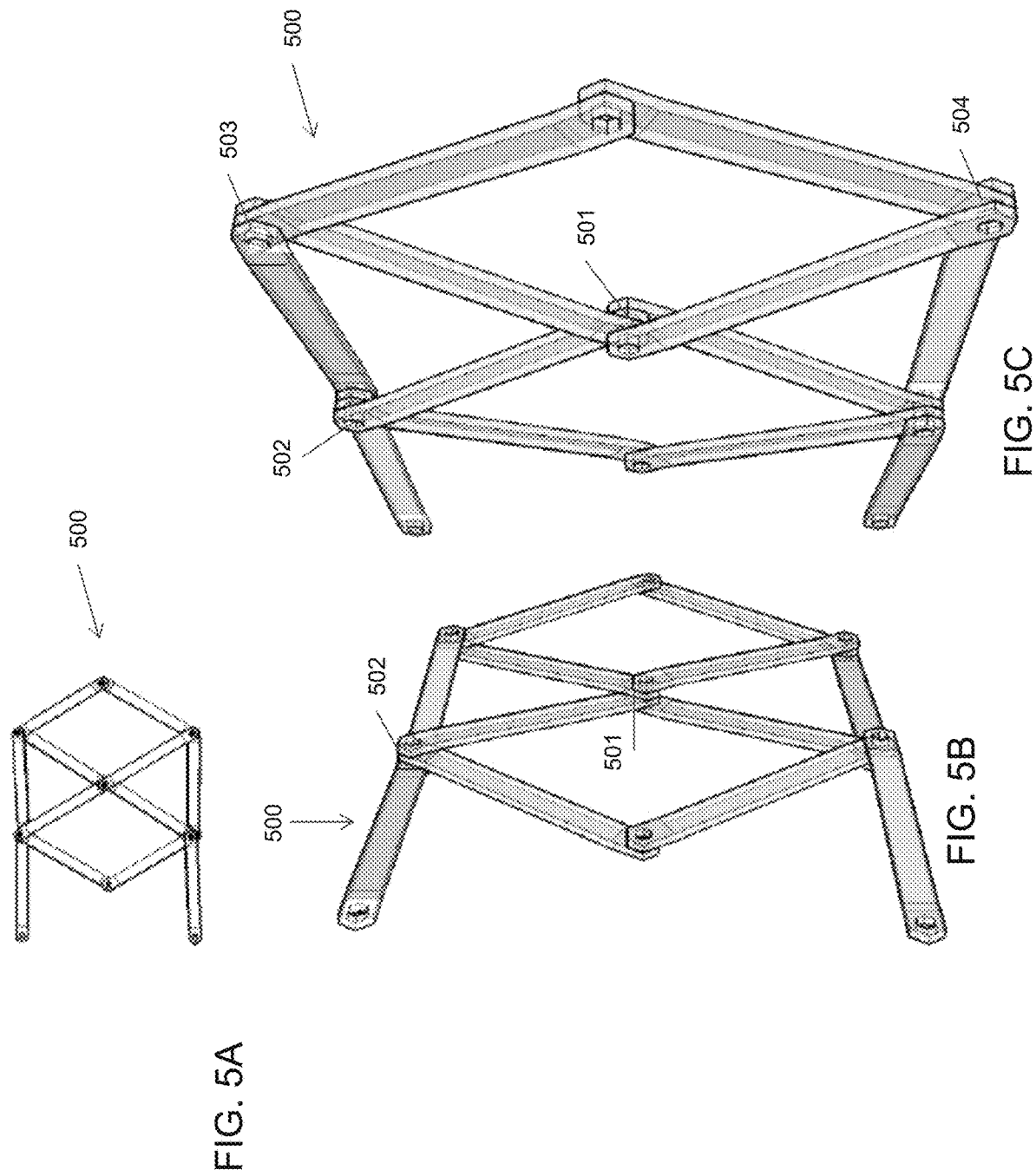

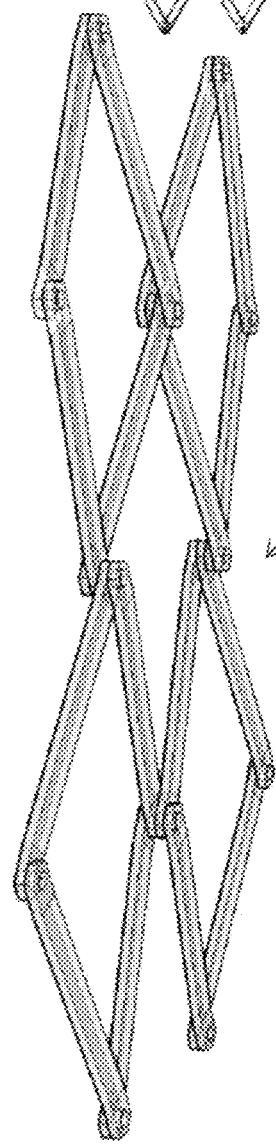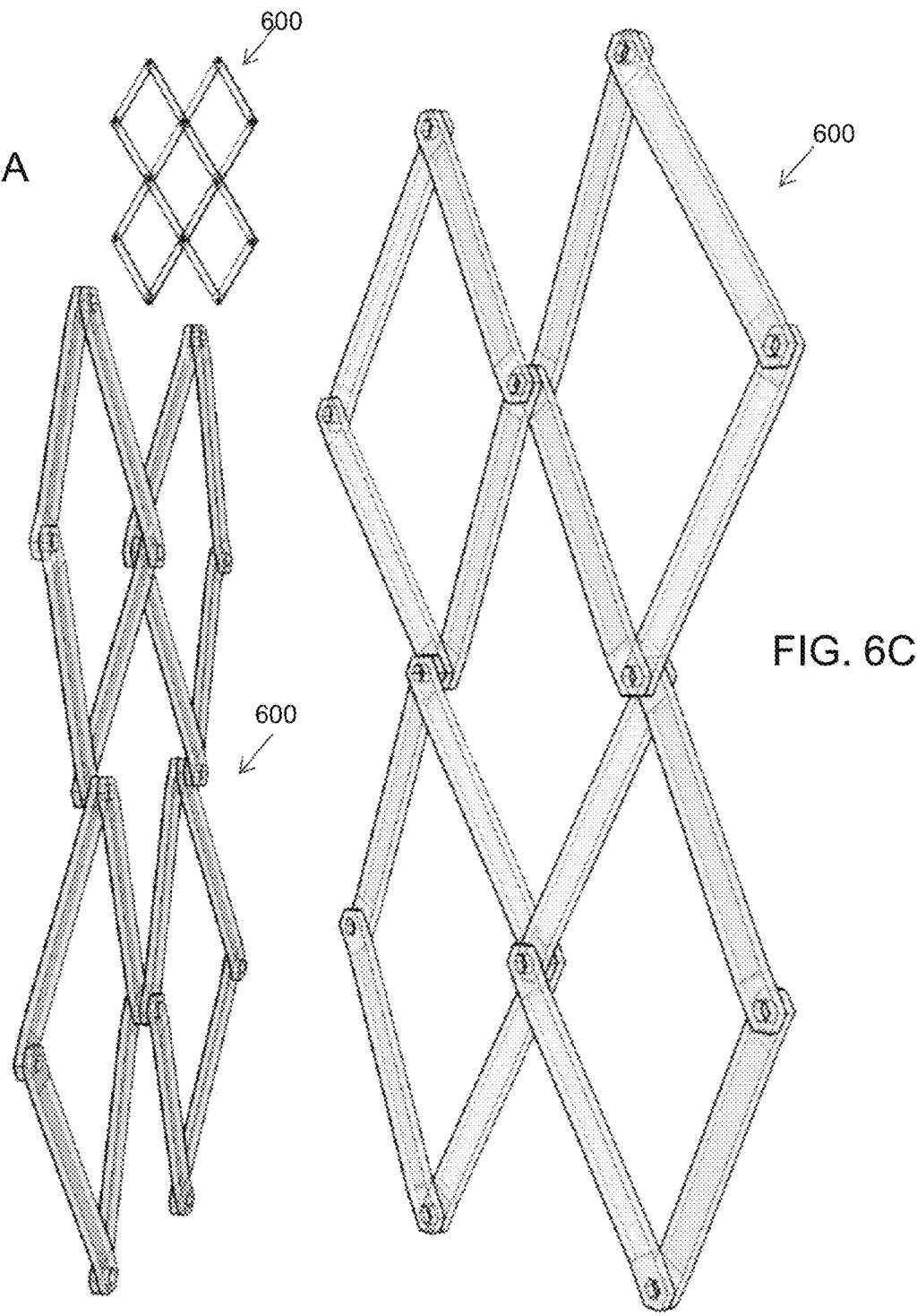

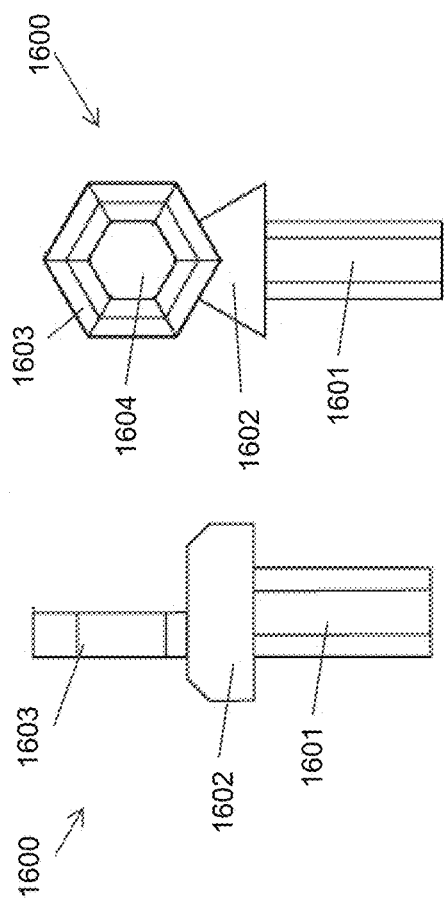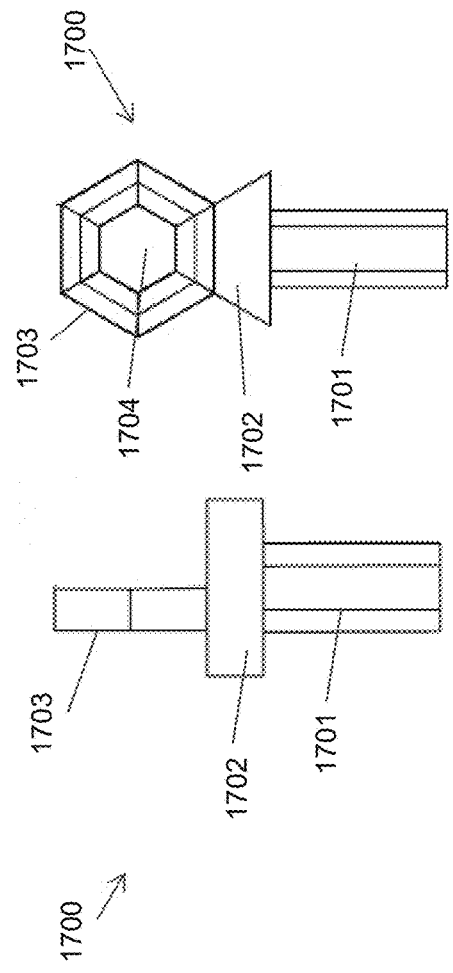

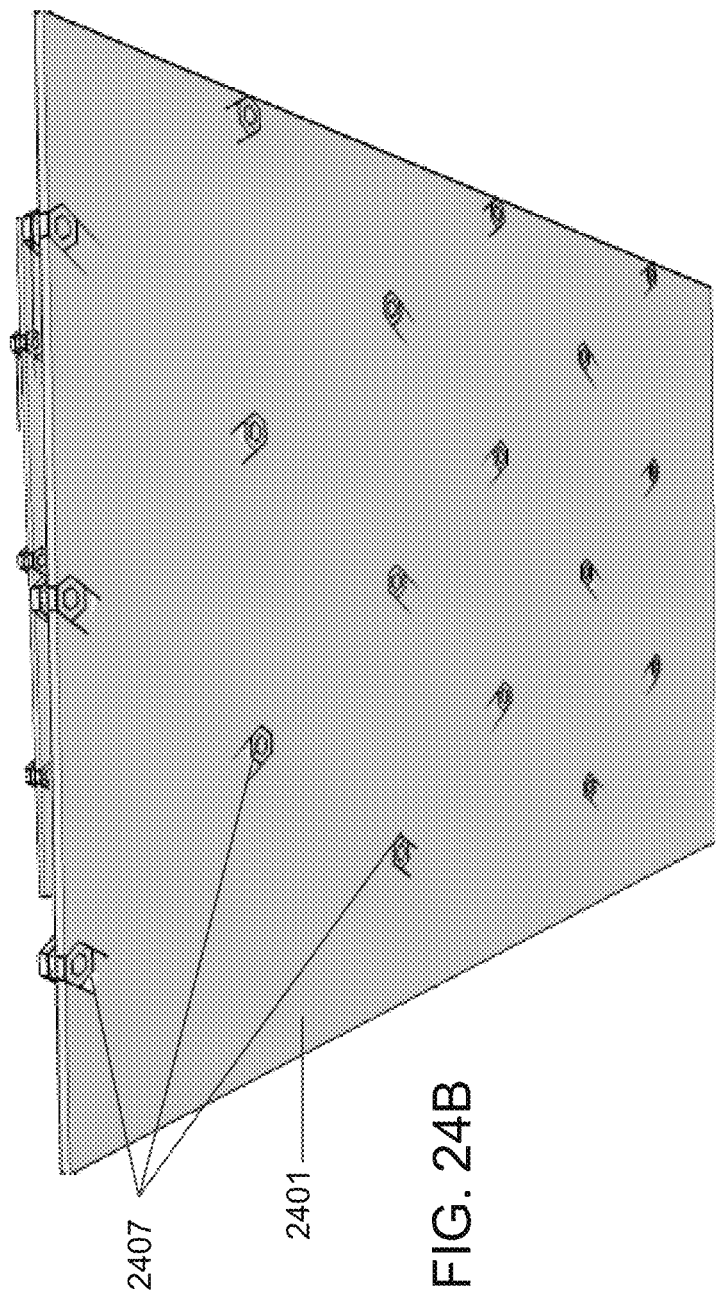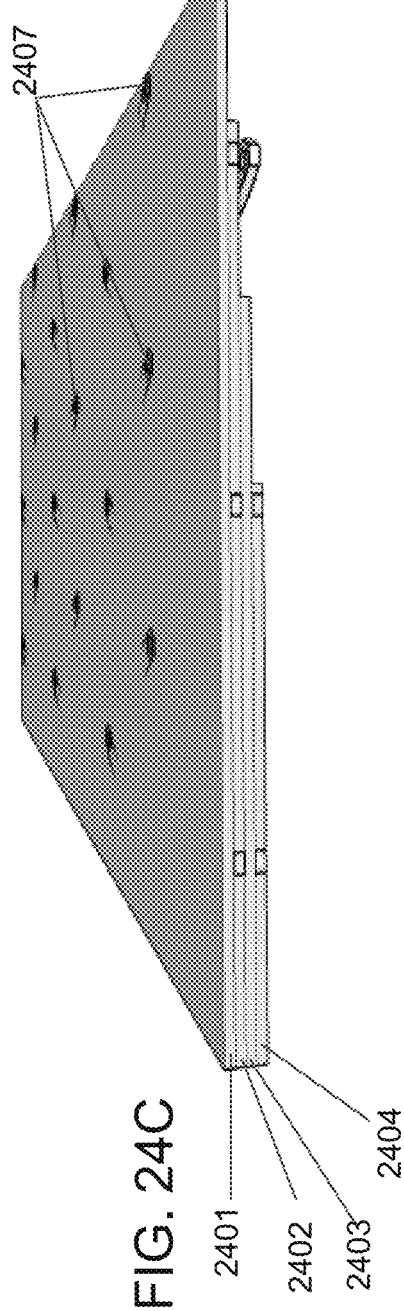
FIG. 24B
FIG. 24C

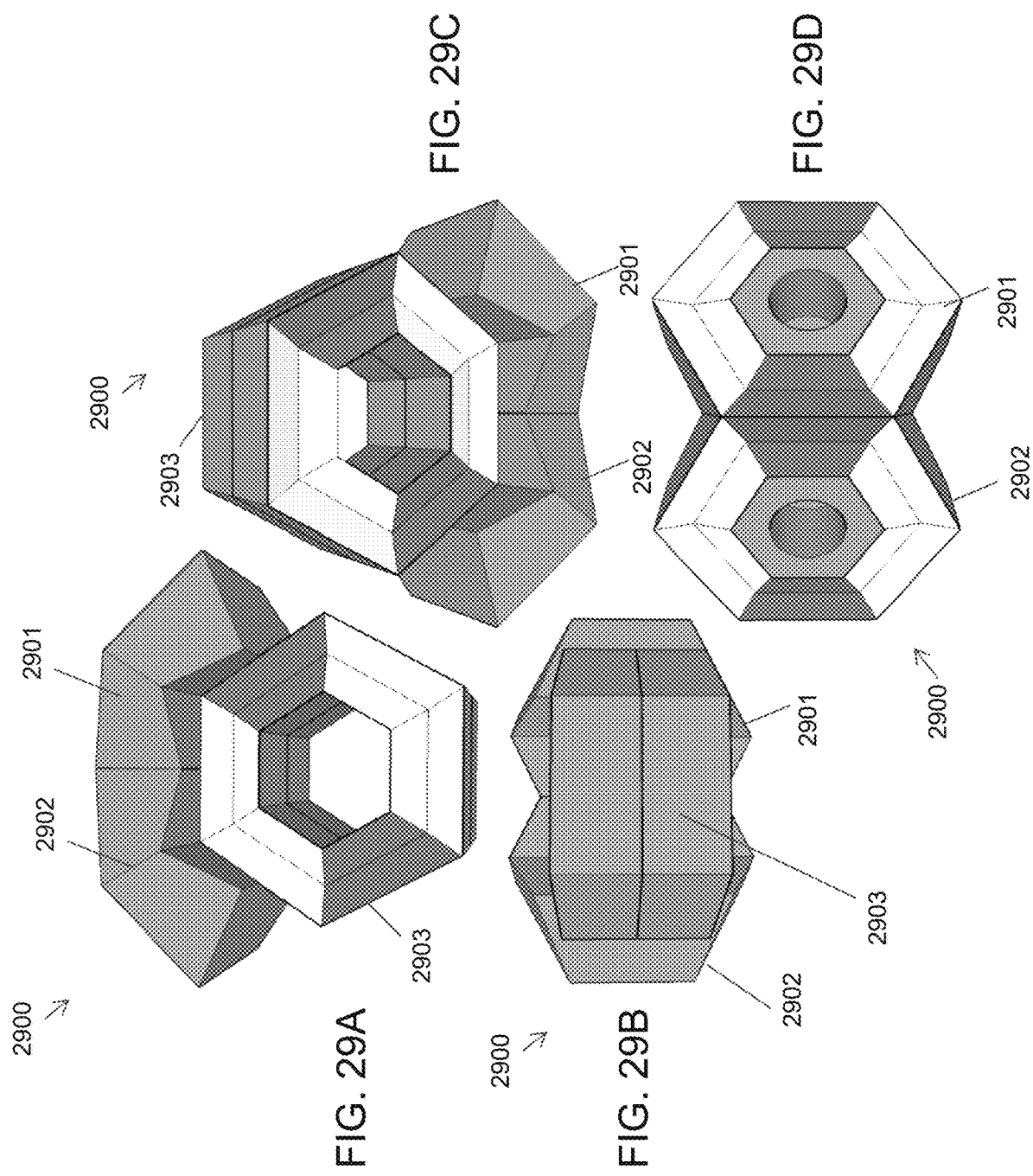

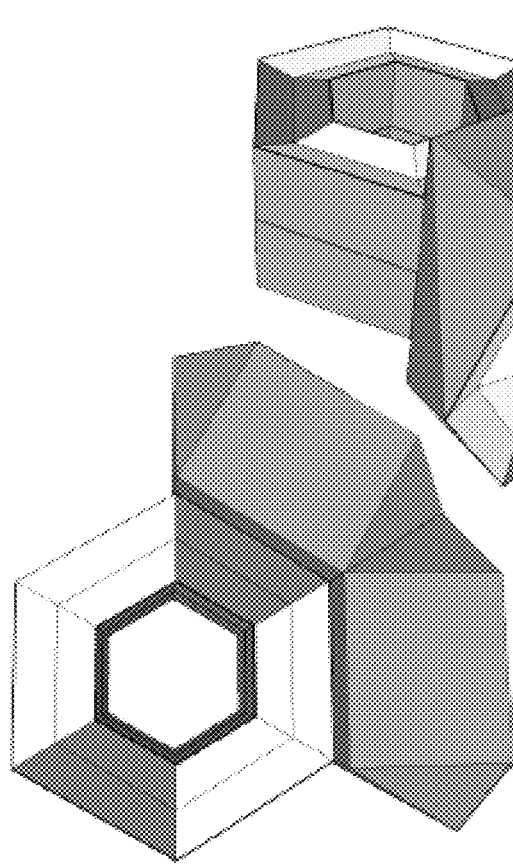
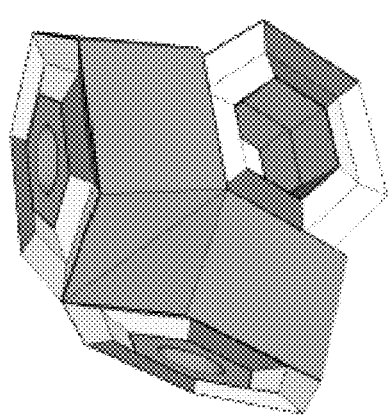
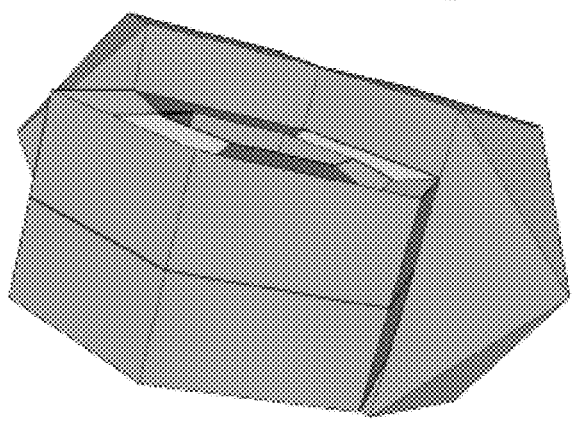
FIG. 30A
FIG. 30B
FIG. 30C
FIG. 30D

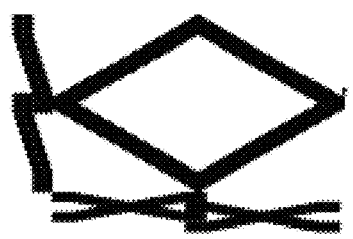
FIG. 31
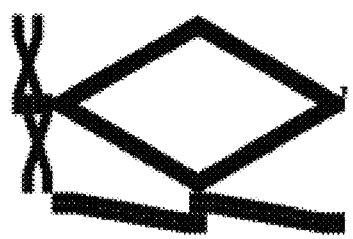
FIG. 32
FIG. 33
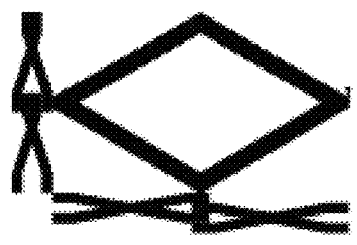
FIG. 34
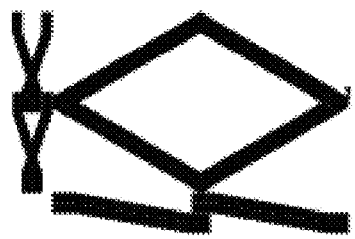
FIG. 35
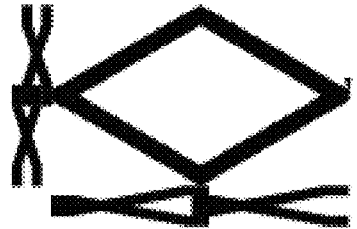
FIG. 36

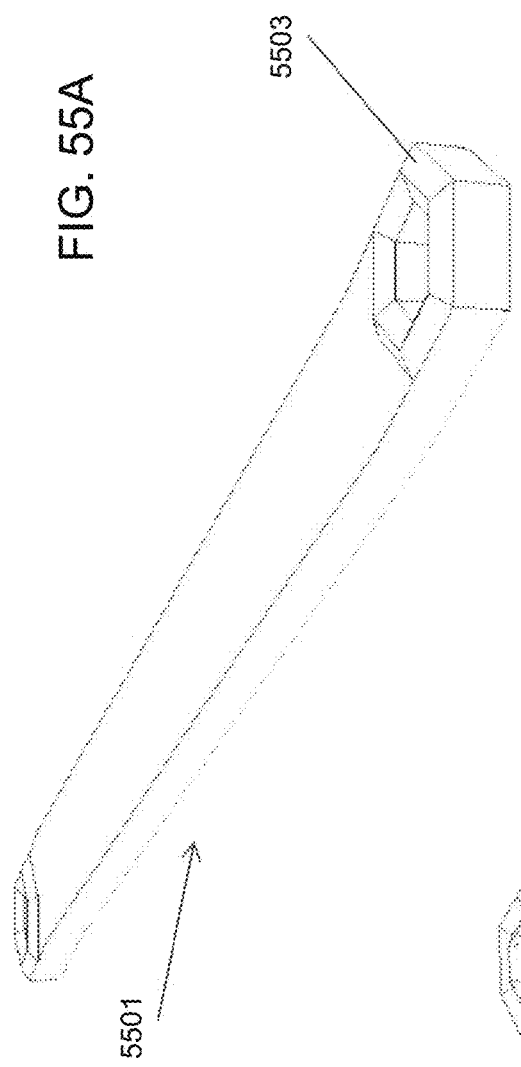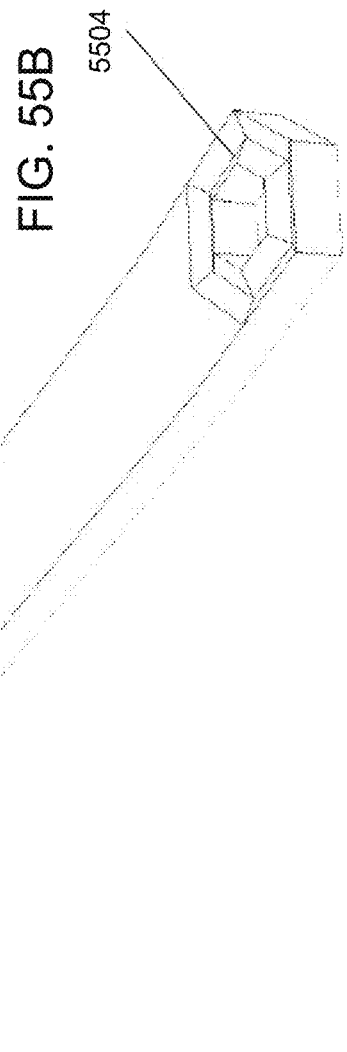

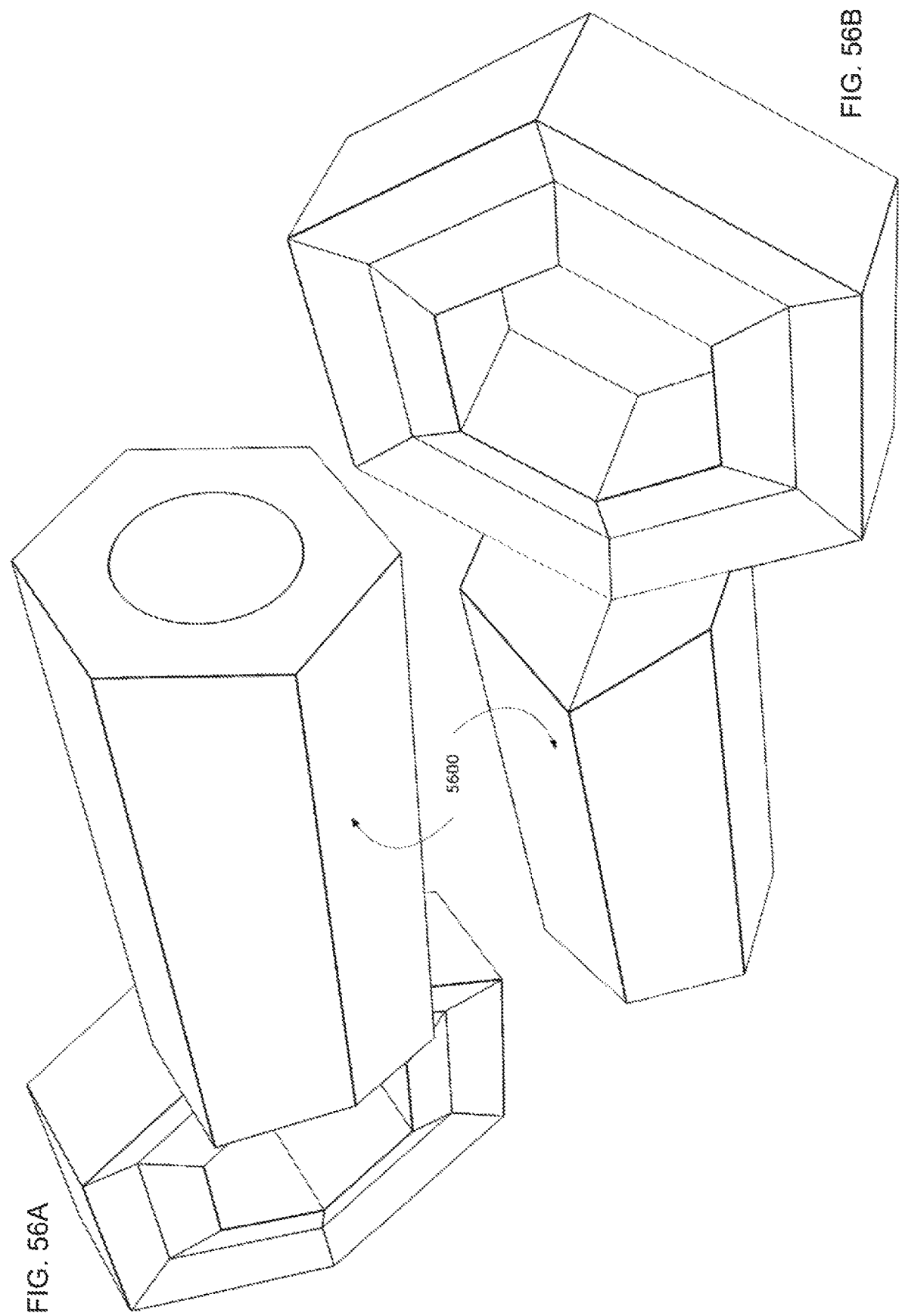

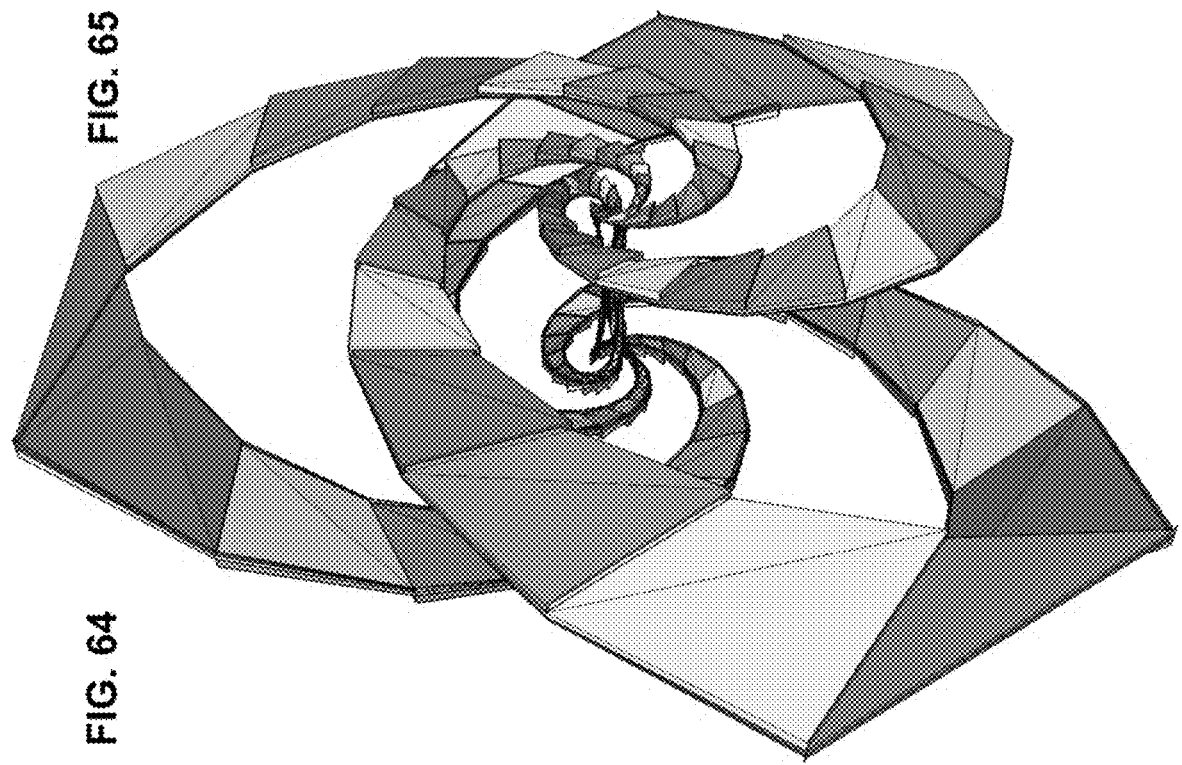
FIG. 65
FIG. 64
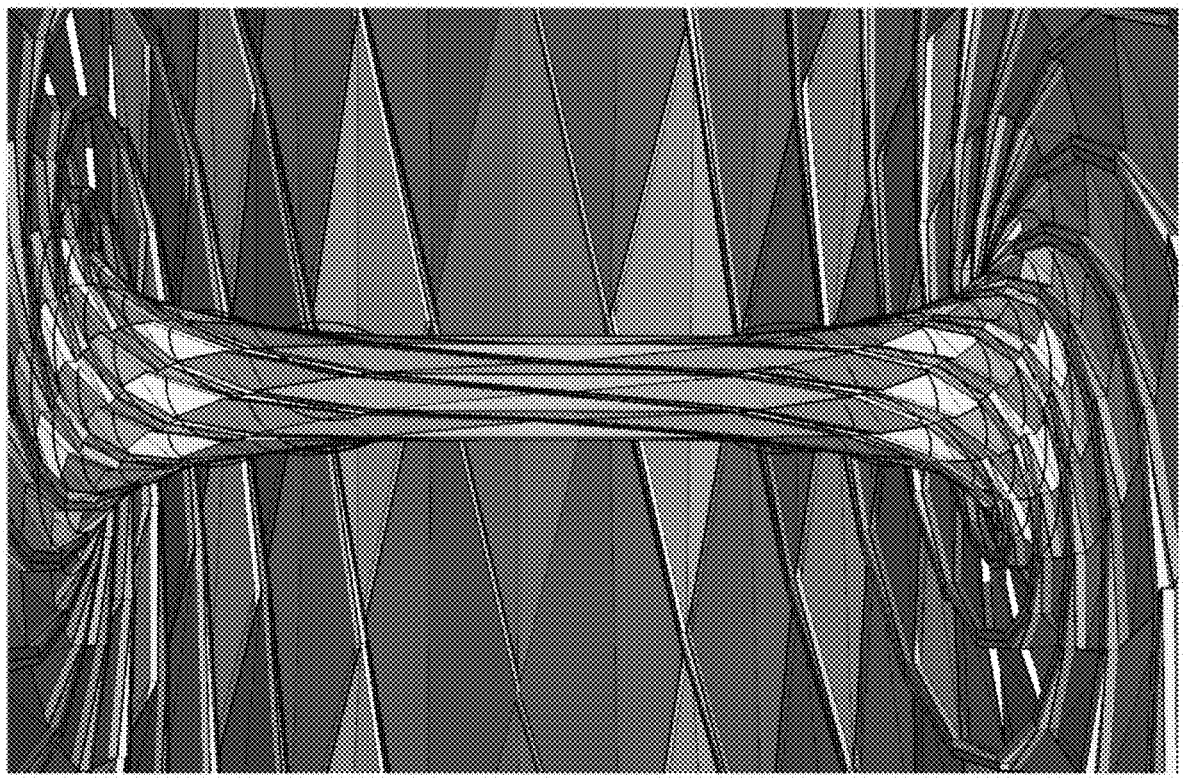

INTEGRATED STRUCTURAL MEMBER

CROSS-REFERENCE TO RELATED APPLICATION

This patent application claims priority to U.S. Patent Application No. 62/367,846, filed on Jul. 28, 2016 and titled "Structural Member for Lattice Assemblies", the entire contents of which are herein incorporated by reference.

TECHNICAL FIELD

The inventions relate generally to an integrated structural member, pin-spacer bracket, angled bracket, torque washer, torque spacer, lattice assembly, method of electrical transportation and generation.

DESCRIPTION OF THE RELATED ART

Many structures are typically made of a series of structural members. Structural members are typically known as beams and posts, walls, stairs, panels, columns and frames for buildings, vehicles, turbines and other types of structures and systems, include a set of structural members that are fixed together to form larger structures. The structural members may be made of wood or metal and may be fixed together in various ways. For example wood structural members may be nailed or screwed together. Metal structural members may be welded together or screwed together.

BRIEF DESCRIPTION OF THE DRAWINGS

Embodiments of the inventions are described, by way of example with reference to appended drawings. It will be appreciated that the terms "embodiment", "example", "assembly", "structure", "non-limiting example" and "non-limiting example embodiment" are herein used interchangeably.

It will be appreciated that the terms "elongate structural member", "integrated member", "integrated structural member", "elongate member", "unitary member", uniform member" and "member" are herein used interchangeably. Furthermore, "assembly", "woven assembly", "modular assembly", "lattice assembly", "modular structure", "lattice structure", "woven structure" and "structure" are herein used interchangeably.

Furthermore "torque washer", "integrated washer", "integrated electrical washer" and "structural washer" are herein used interchangeably.

FIGS. 1A and 1B are perspective views of an embodiment of a truss structure that included elongated structural members.

Figures 2A, 2B:
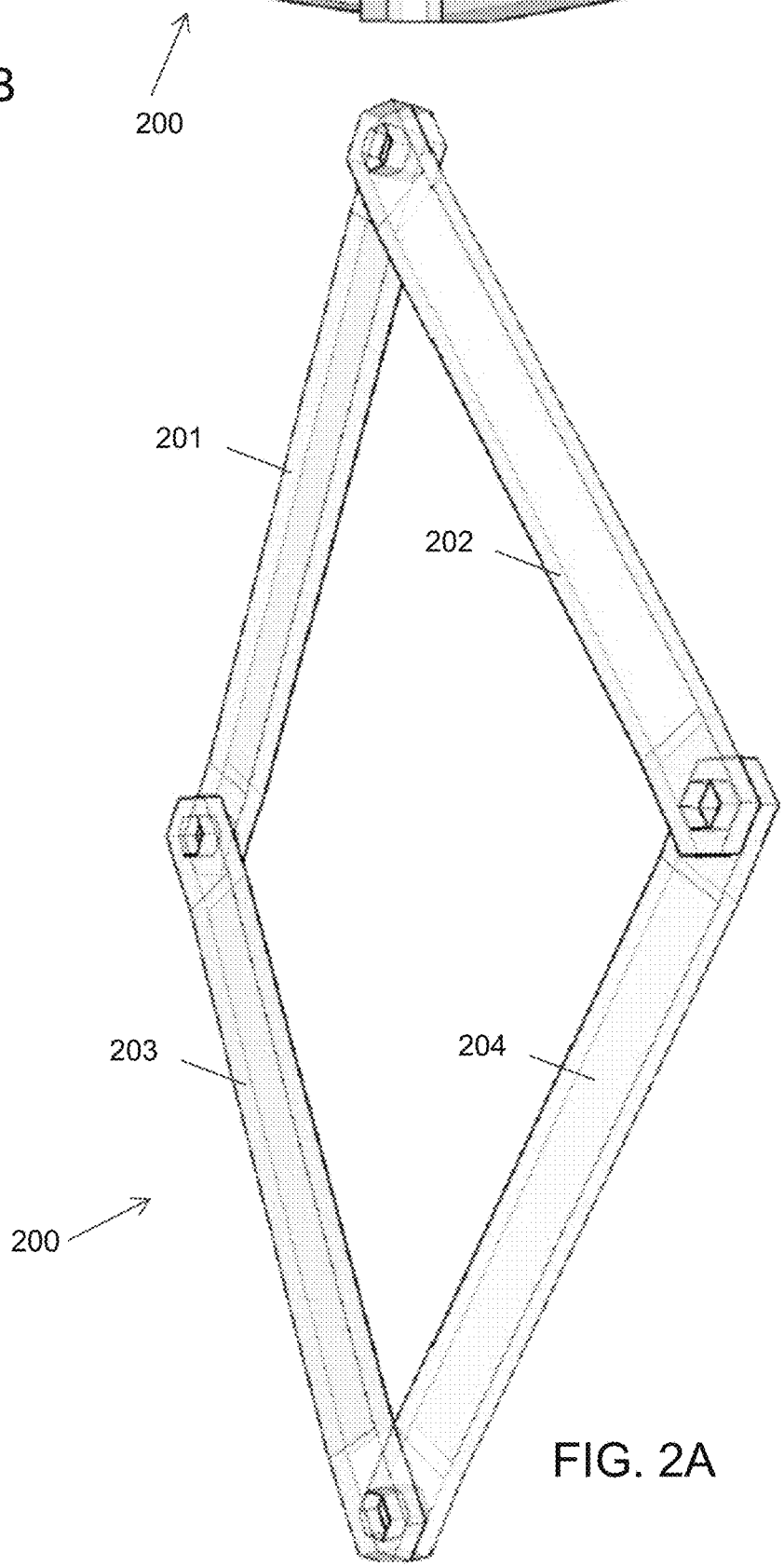

FIG. 2A and 2B are respectively a perspective view and a top view of a diamond shaped assembly.

Figure 3A:
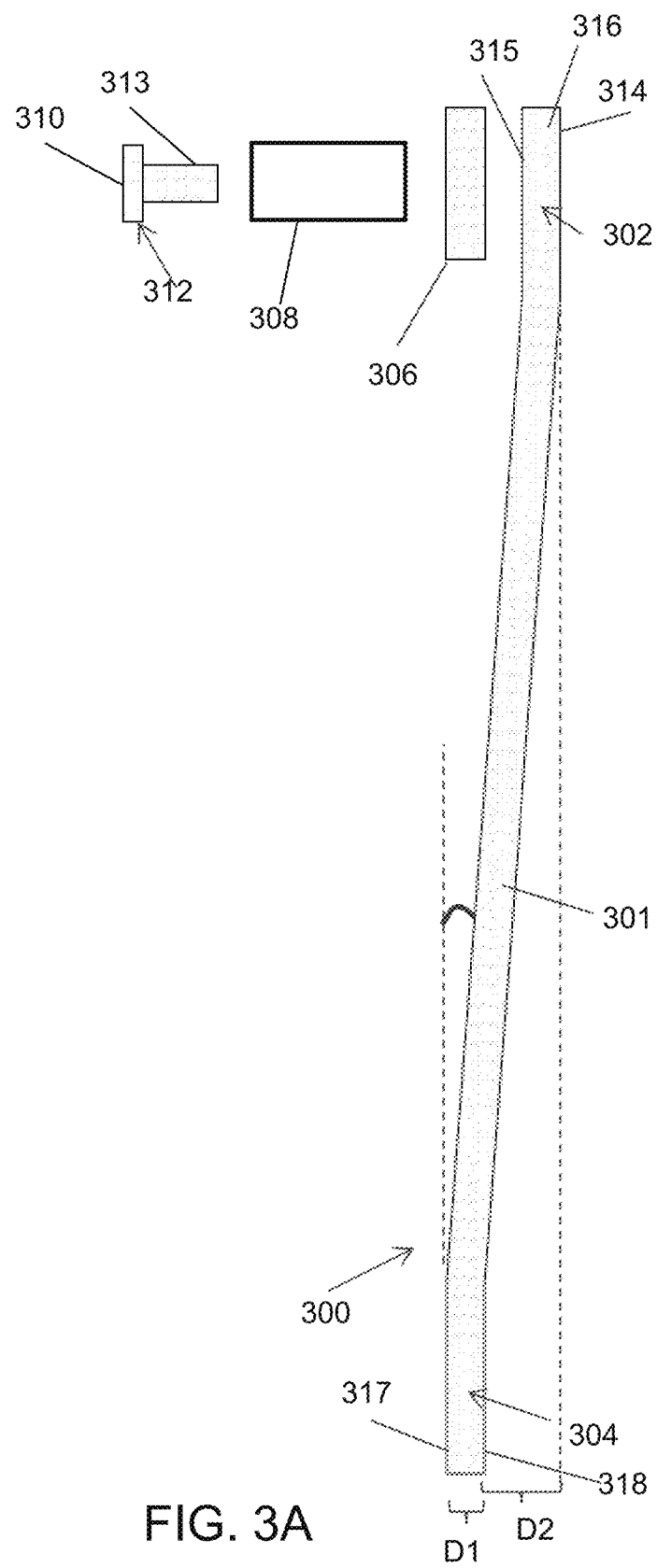
Figure 3B:
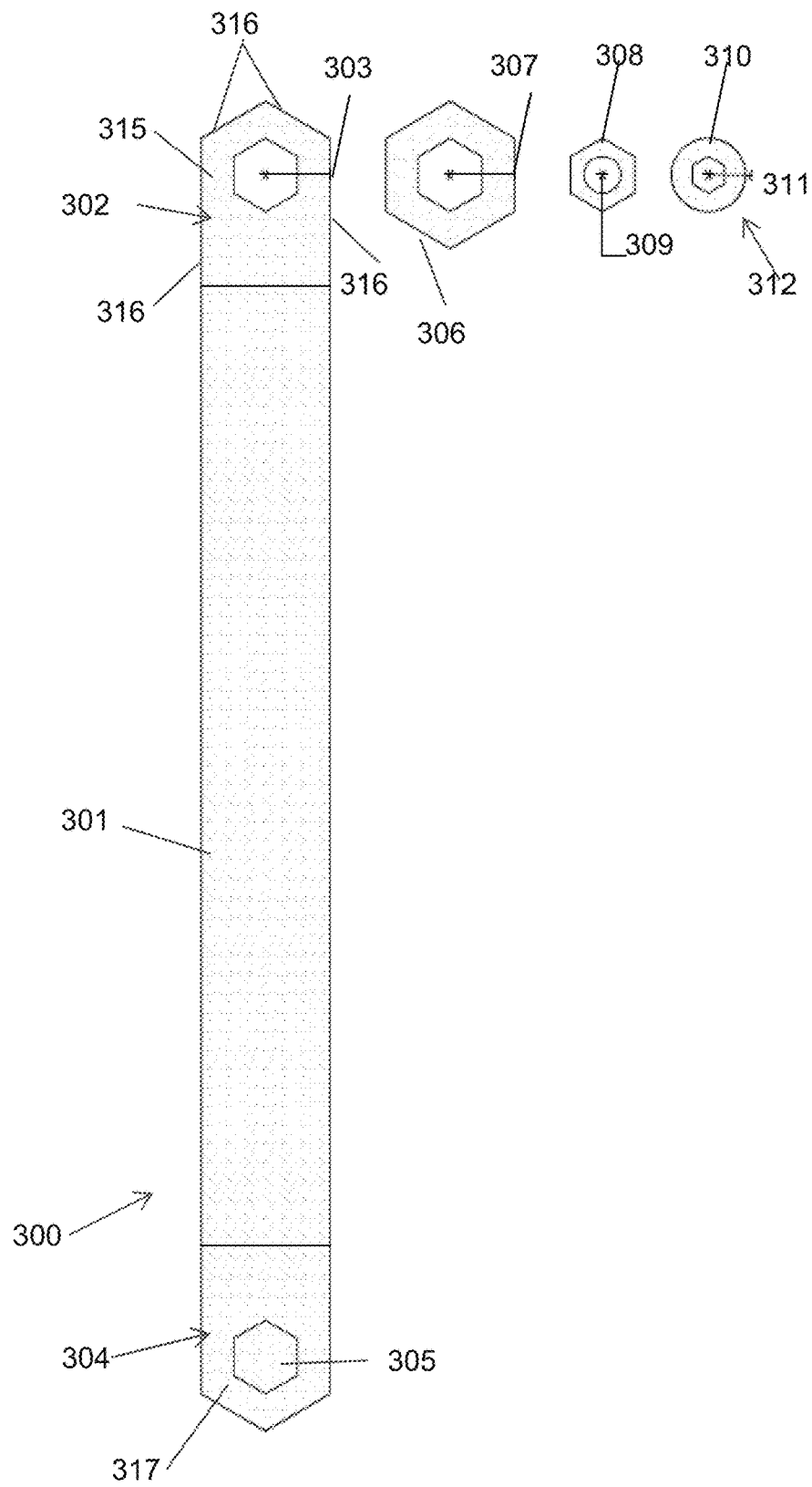

FIGS. 3A and 3B respectively show a side view and a front view of example components used to form an assembled structure.

FIGS. 4A, 4B, 4C and 4D are embodiments of an angled bracket.

FIGS. 5A, 5B, and 5C are different views of another example structure assembled from elongate members.

FIGS. 6A, 6B, and 6C are different views of an example lattice structure.

Figure 7:
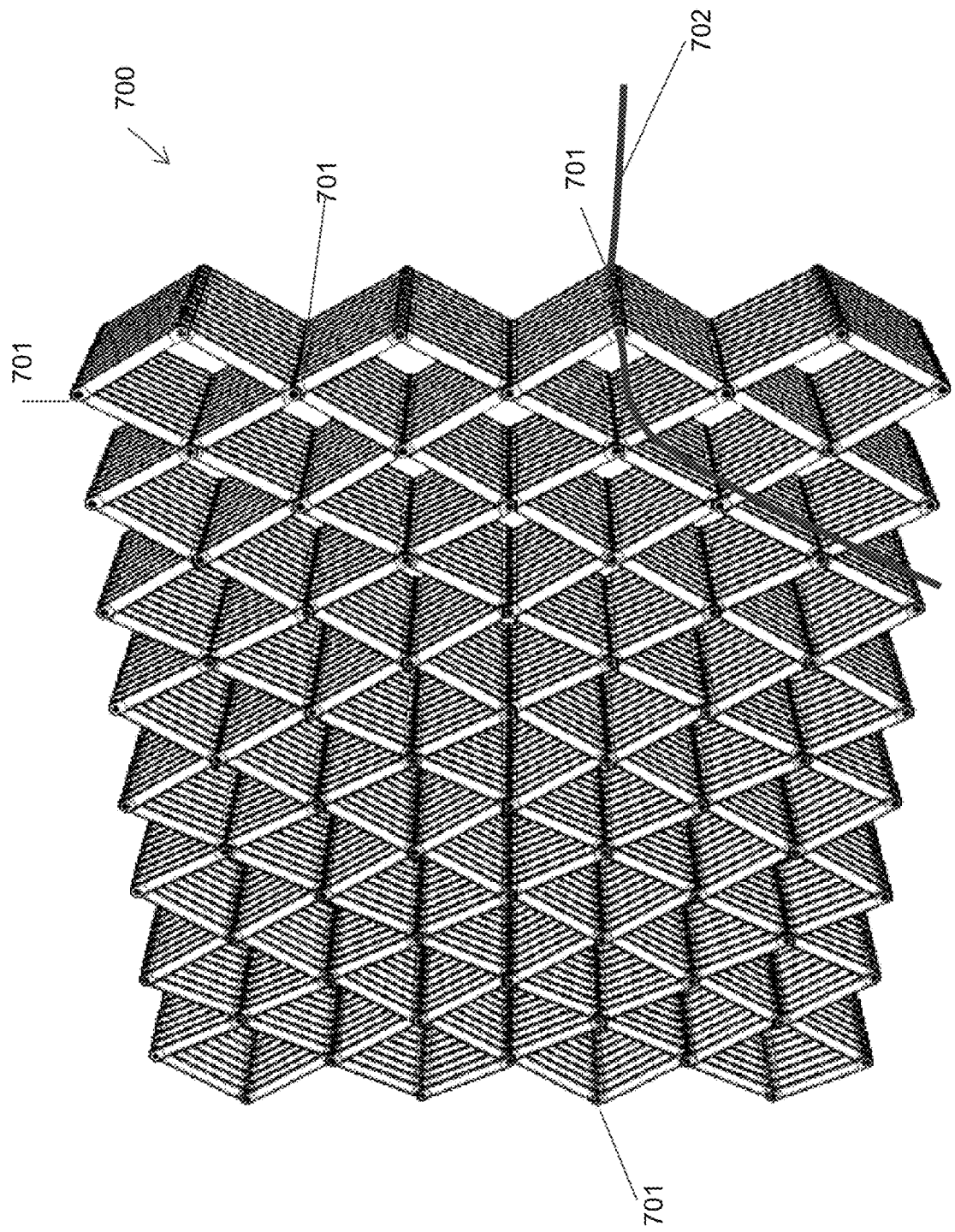

FIG. 7 is a perspective view of a structure assembled from interwoven elongate members.

Figure 8:
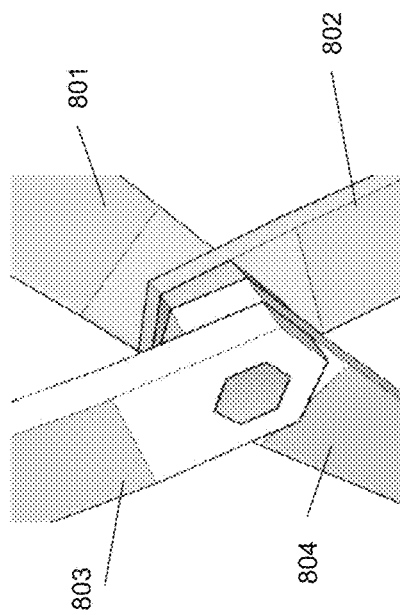

FIG. 8 is a perspective view of a joint that forms part of a curved surface that uses an angled bracket uniform members.

Figure 9:
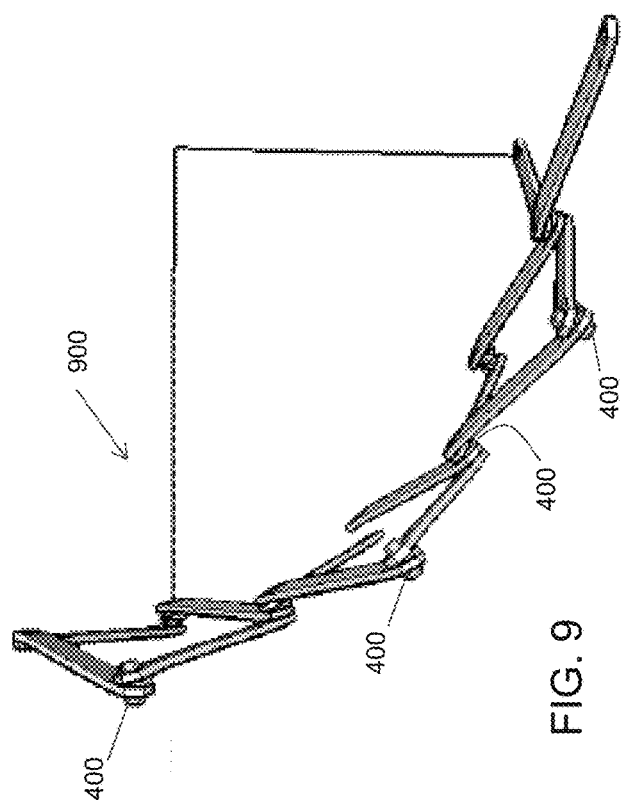

FIG. 9 is a perspective view of a curved structure that uses an angled bracket and uniform members.

Figure 10:
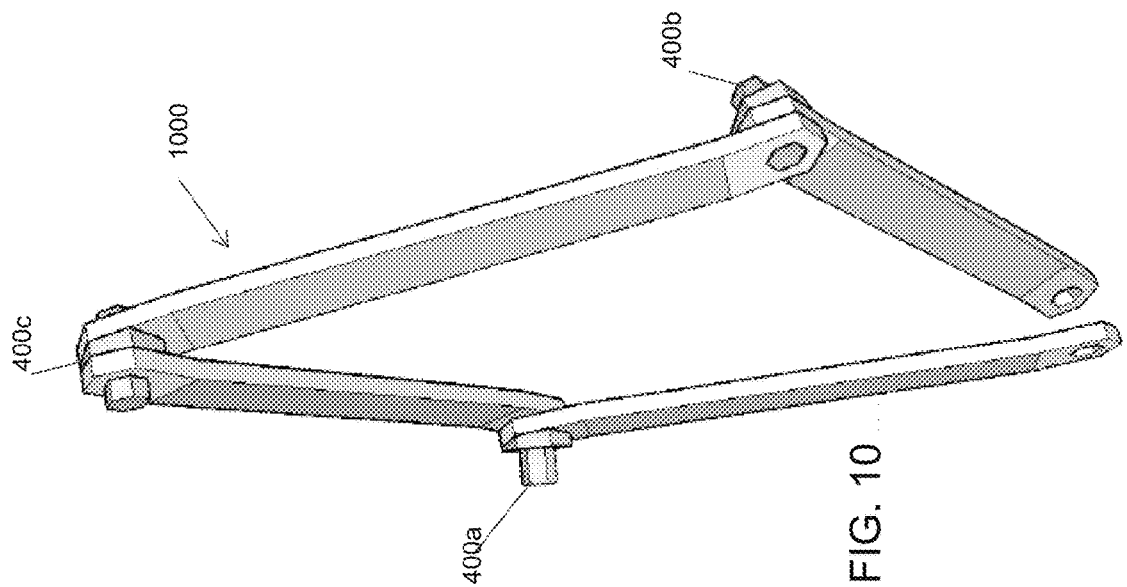

FIG. 10 is a perspective view of members connected together using multiple angled brackets and uniform members.

Figure 11:
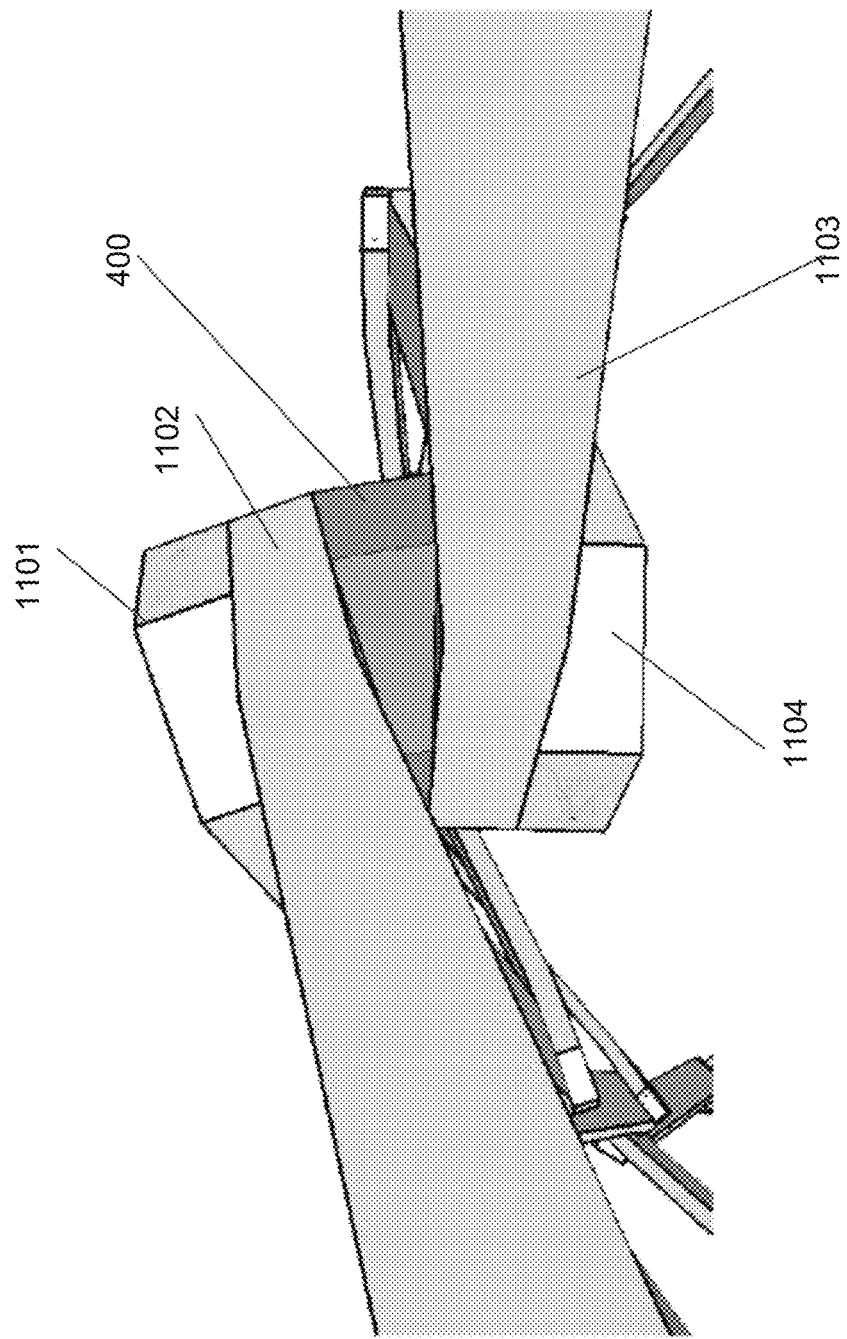

FIG. 11 is a close up view of a joint in a curved structure that uses an angled bracket and uniform members.

Figure 12A:
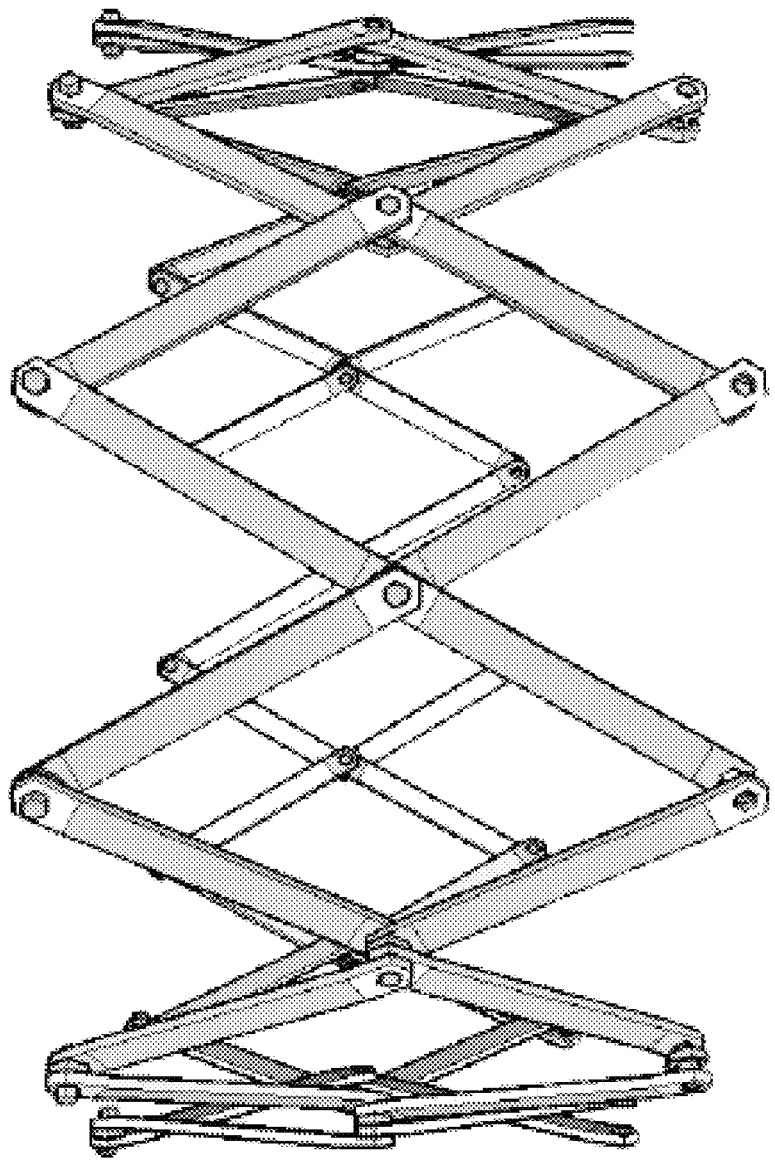
Figure 12B:
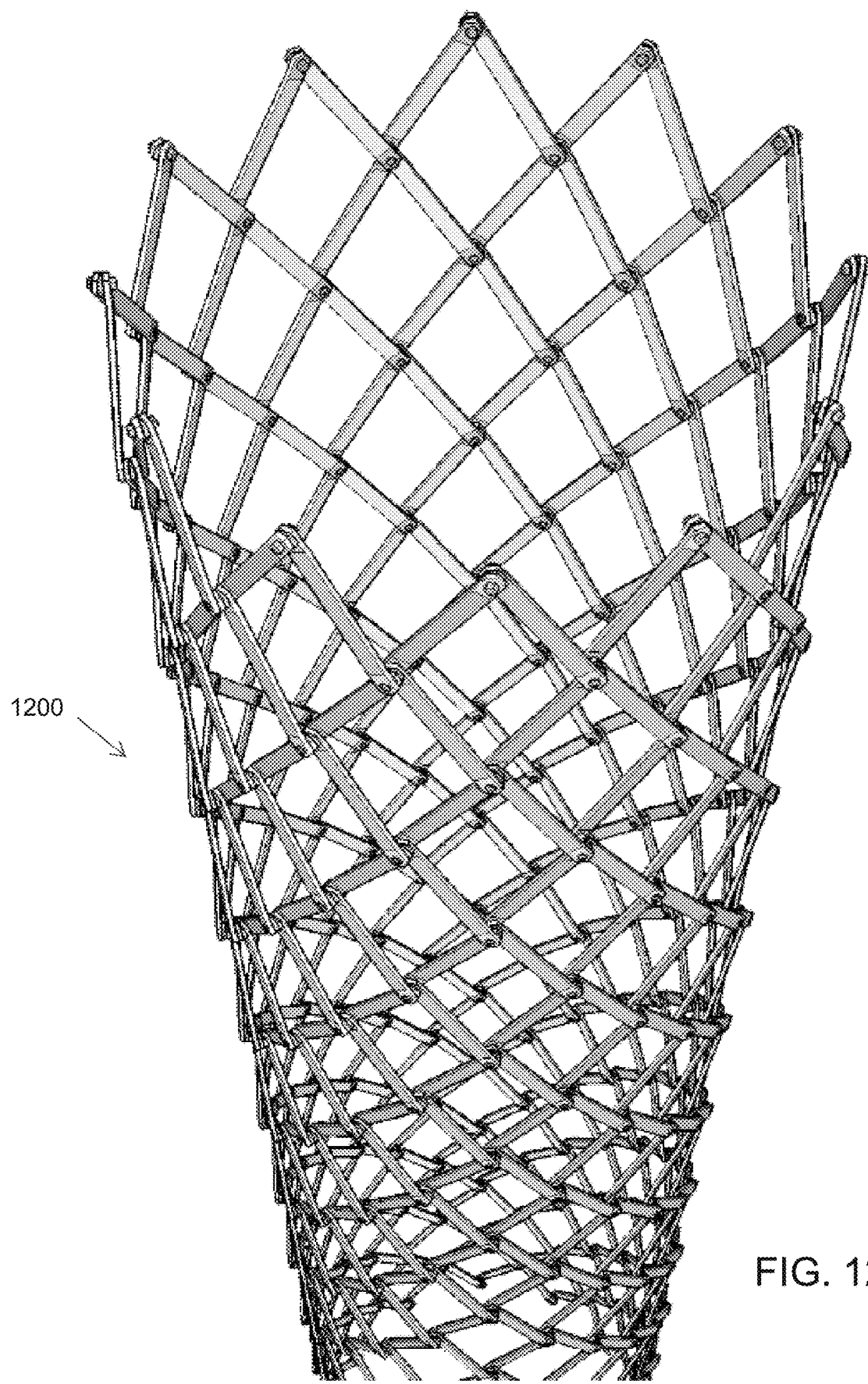

FIGS. 12A and 12B are perspective views of circular structures that use angled brackets and uniform members.

Figures 13A, 13B:
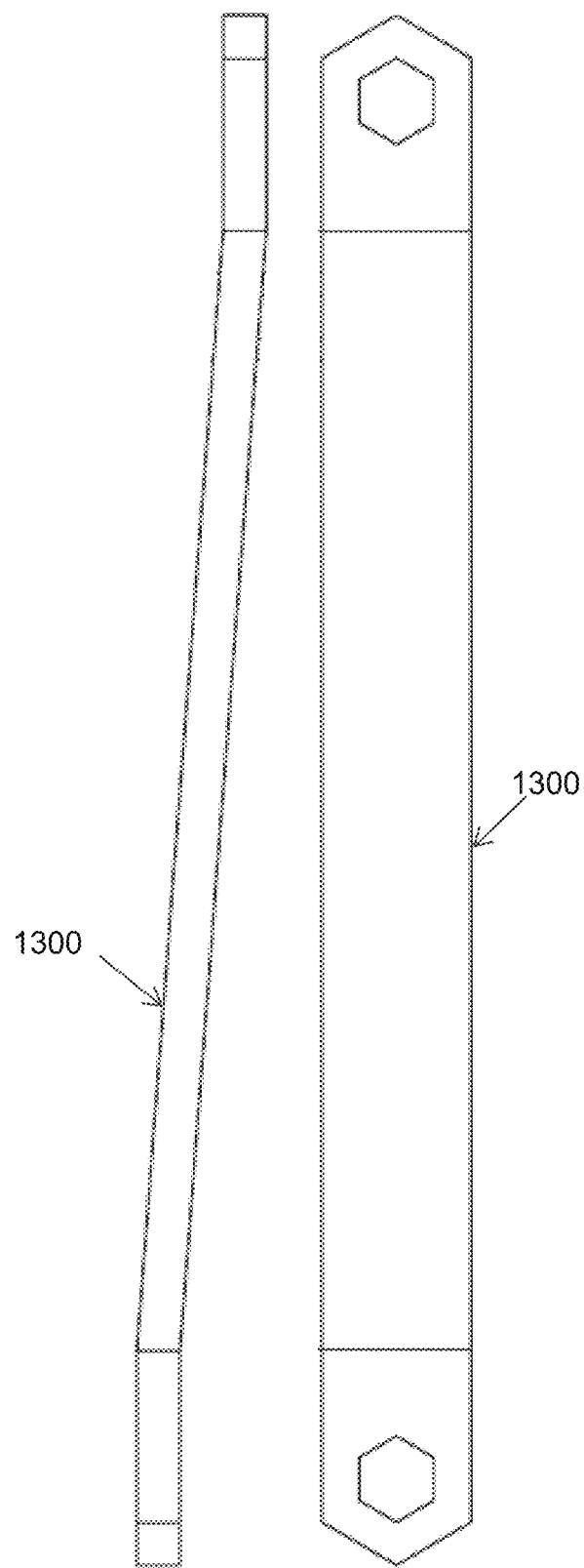

FIGS. 13A and 13B are respectively a side view and a front view of an embodiment of an elongate member.

FIGS. 14A-14D are different views of members and structural washers that include one or more channels to increase torque forces between elongate members at joints.

Figure 15A:
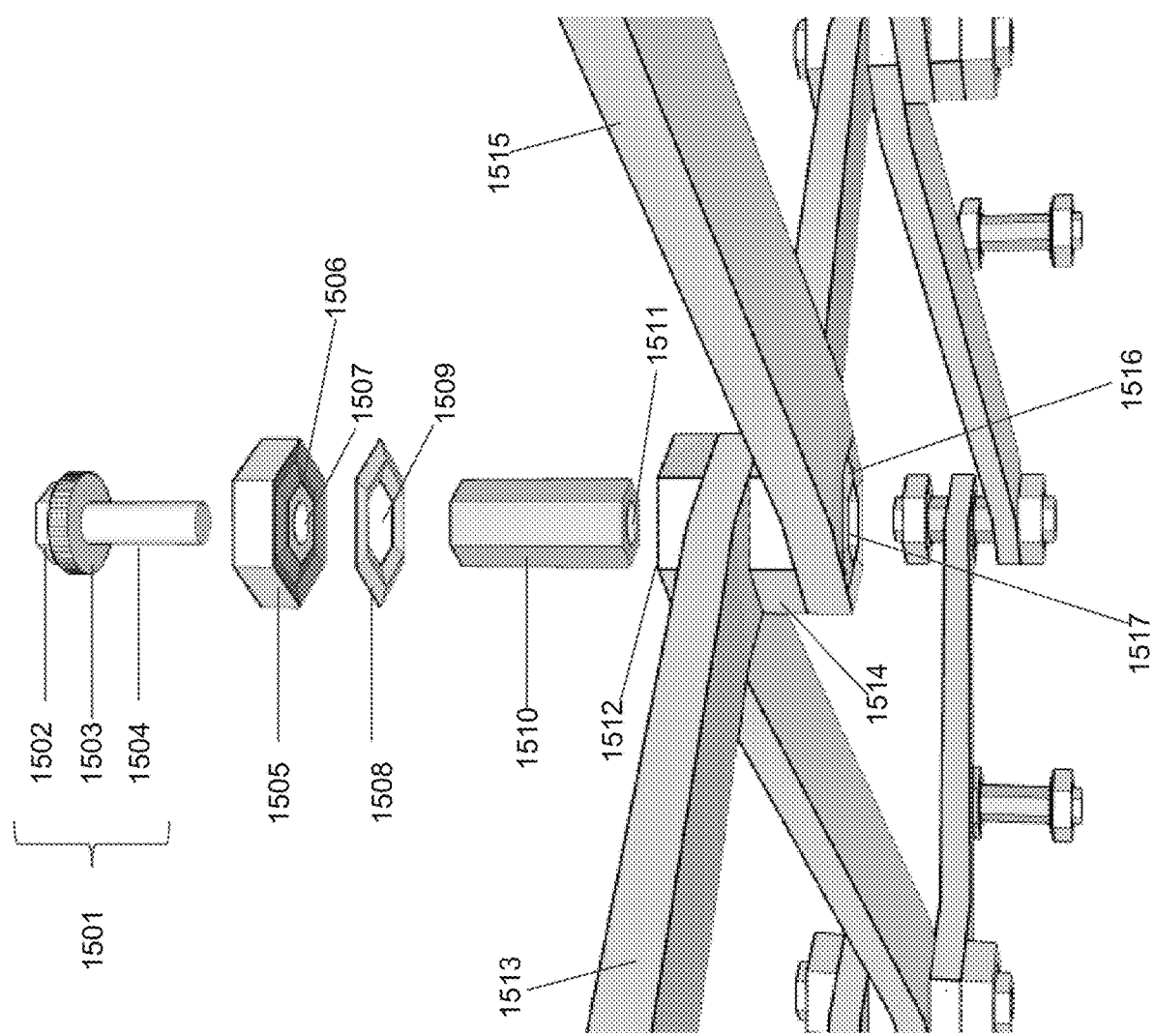
Figure 15B:
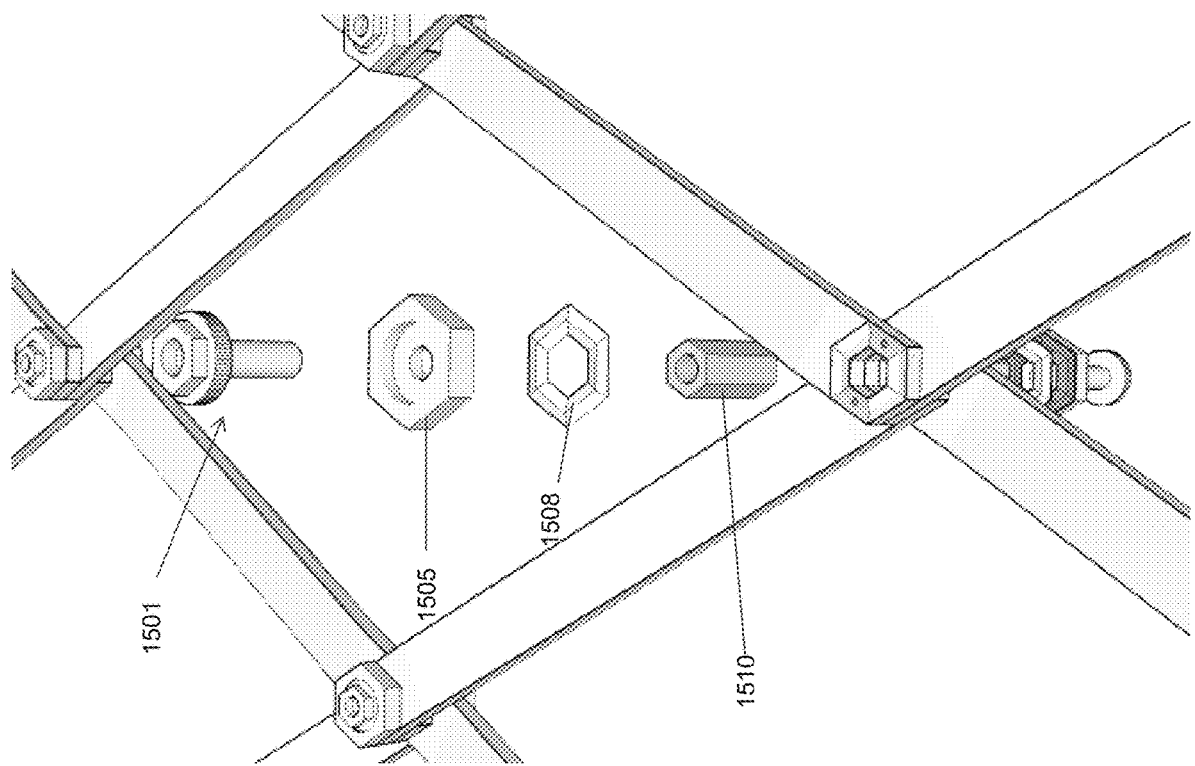

FIGS. 15A and 15B are different exploded perspective views showing a kit of parts of a joint including, torque washers, torque spacer, bolt and pins fastening uniform members together.

FIGS. 16A and 16B are different views of an embodiment of a pin-spacer bracket whose face of the spacer portion has a v-shaped indent to allow for the nested torque washer.

FIGS. 17A and 17B are different views of an embodiment of a pin-spacer bracket whose face of the spacer portion has a v-shaped indent to allow for the nested torque washer.

Figure 18:
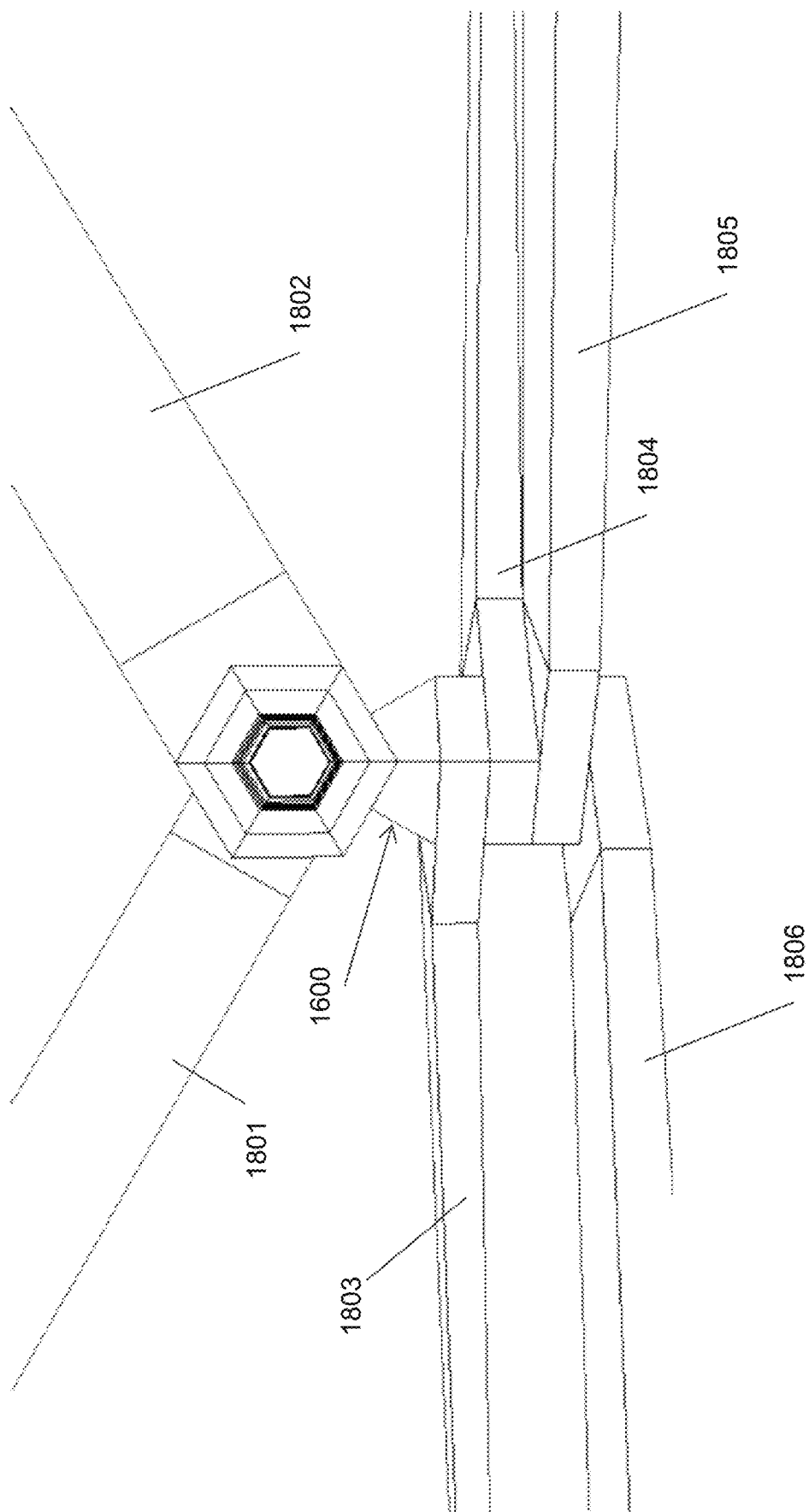

FIG. 18 is a perspective view of a pin-spacer bracket used to join multiple elongate members, torque washers and fasteners.

Figure 19:
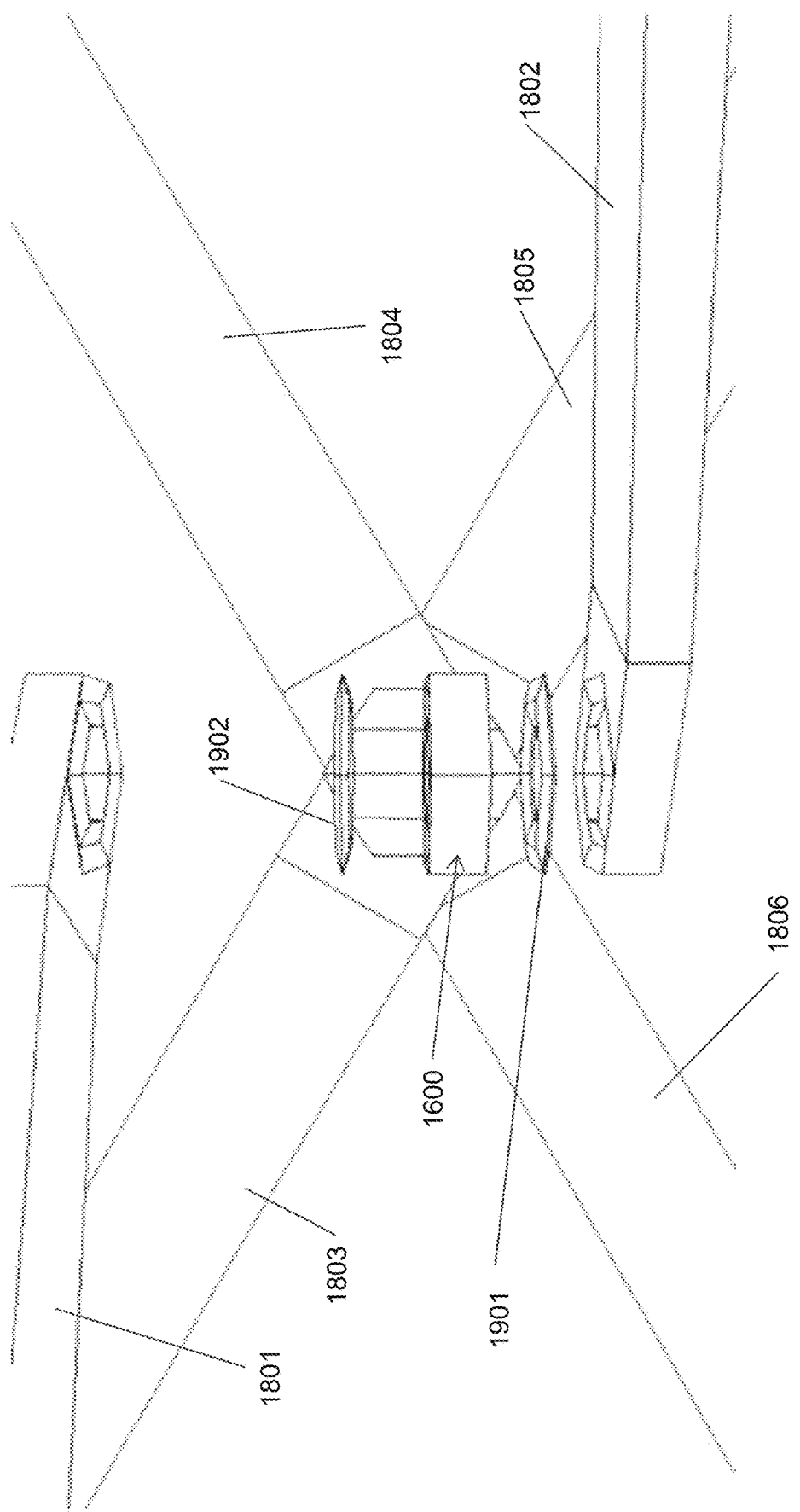

FIG. 19 is a top view of components in FIG. 18 but exploded to show the torque washers.

Figure 20:
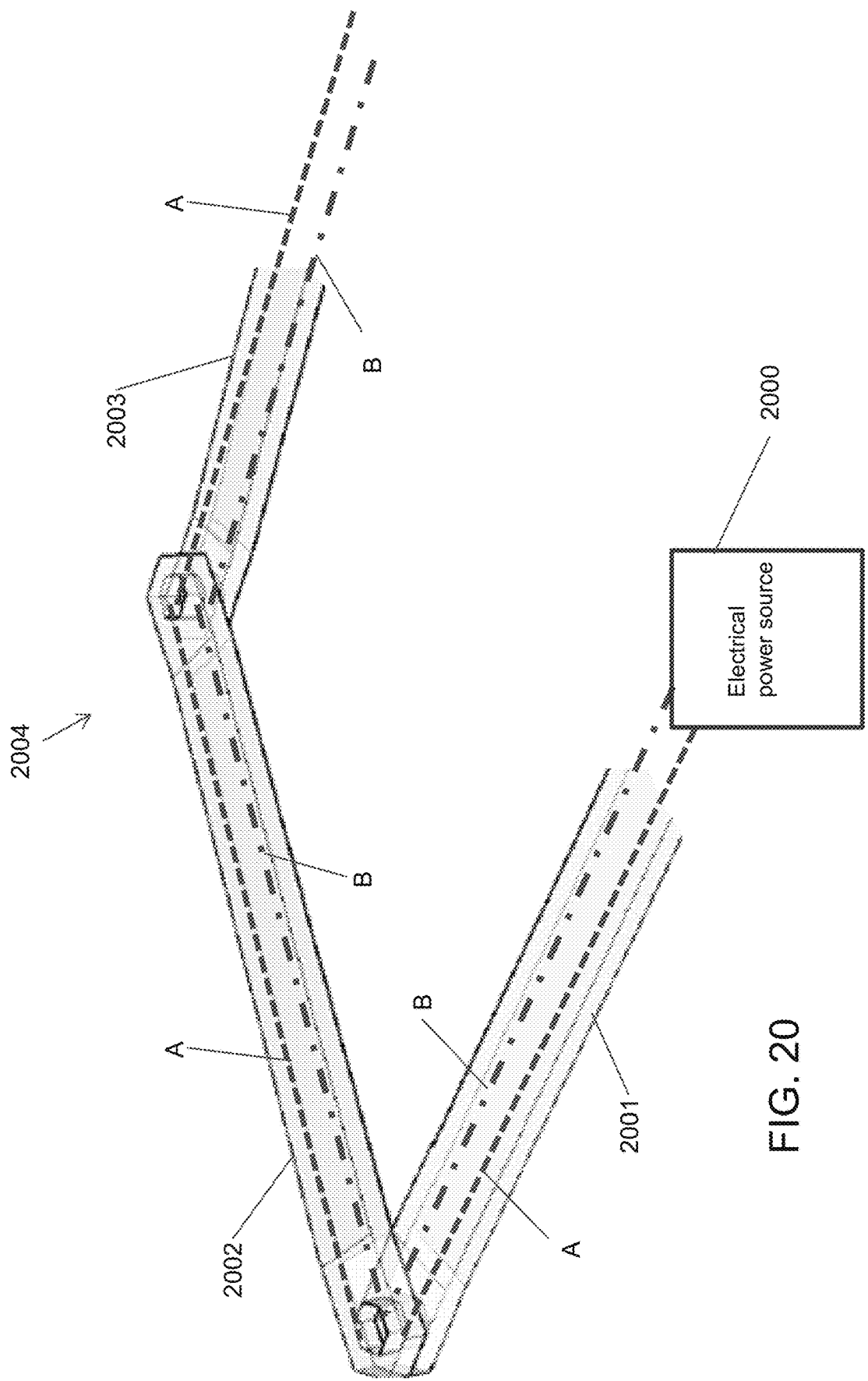

FIG. 20 is a schematic diagram showing electrical conductors imbedded within integrated members, whose surface may contain imbedded electrical functions or methods of electrical generation.

Figure 21:
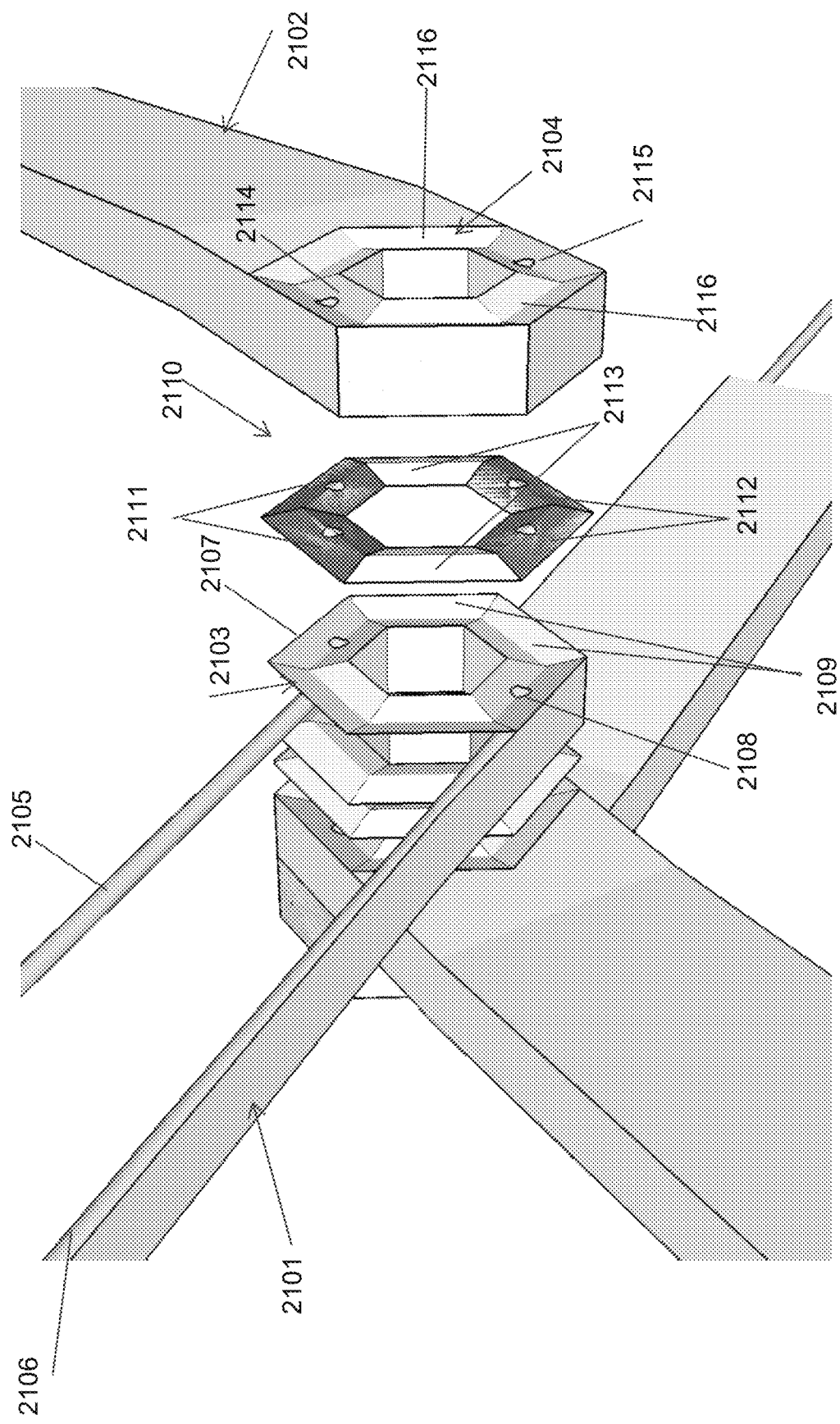
Figure 22:
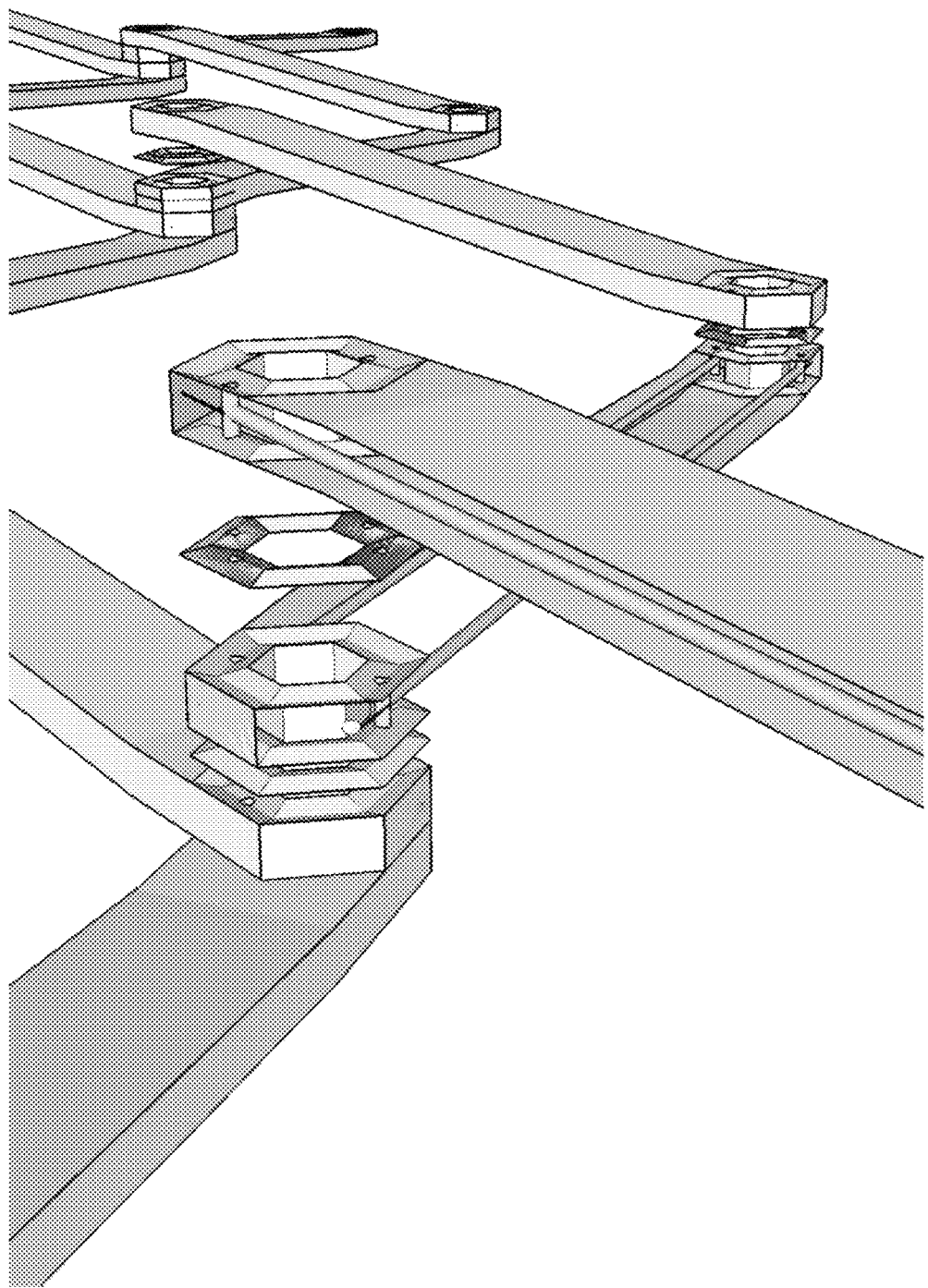
Figure 23:
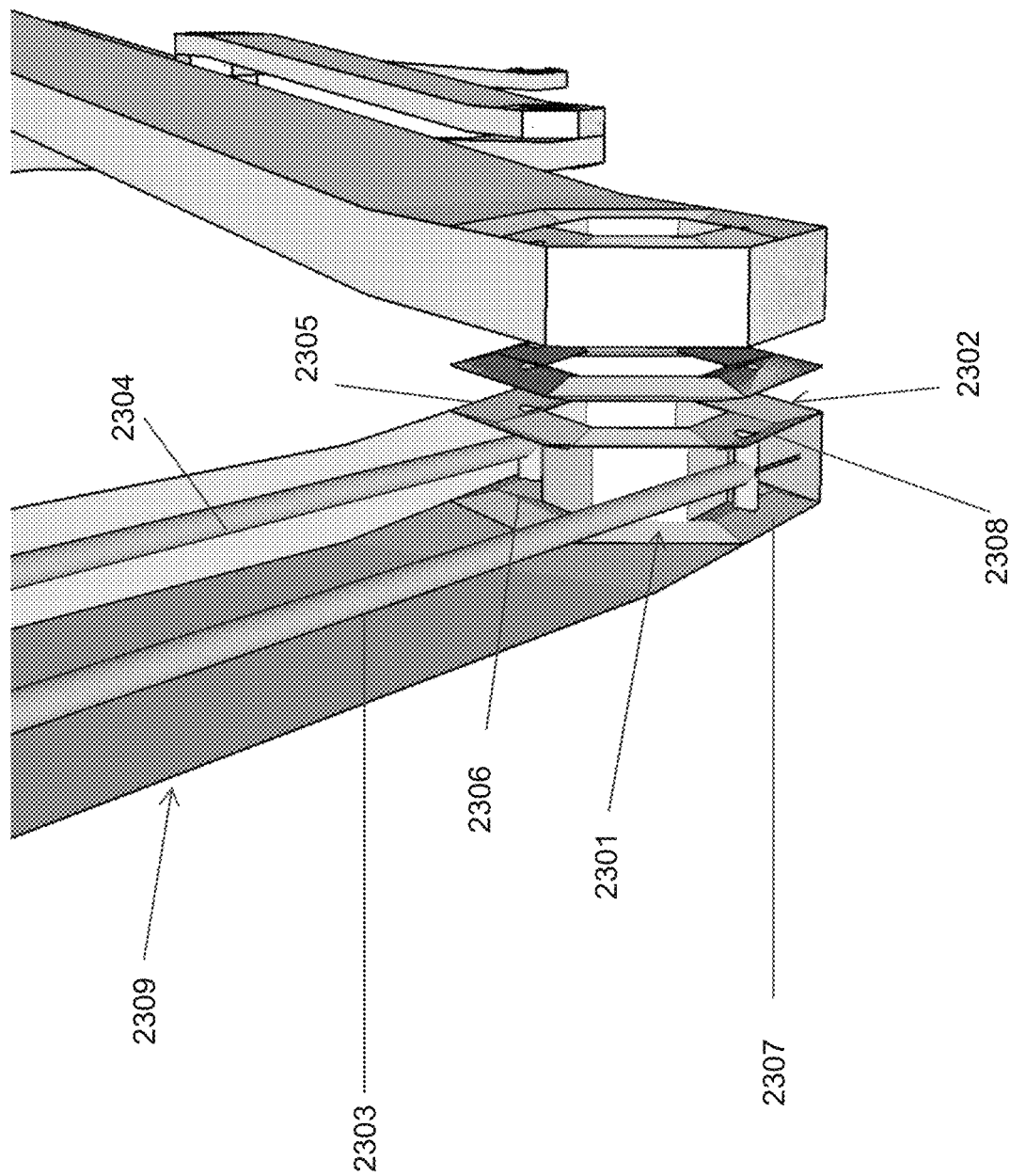

FIGS. 21, 22 and 23 are exploded perspective view of different example joints showing electrical conductors in different electrical washers and integrated member assemblies.

Figure 24A:
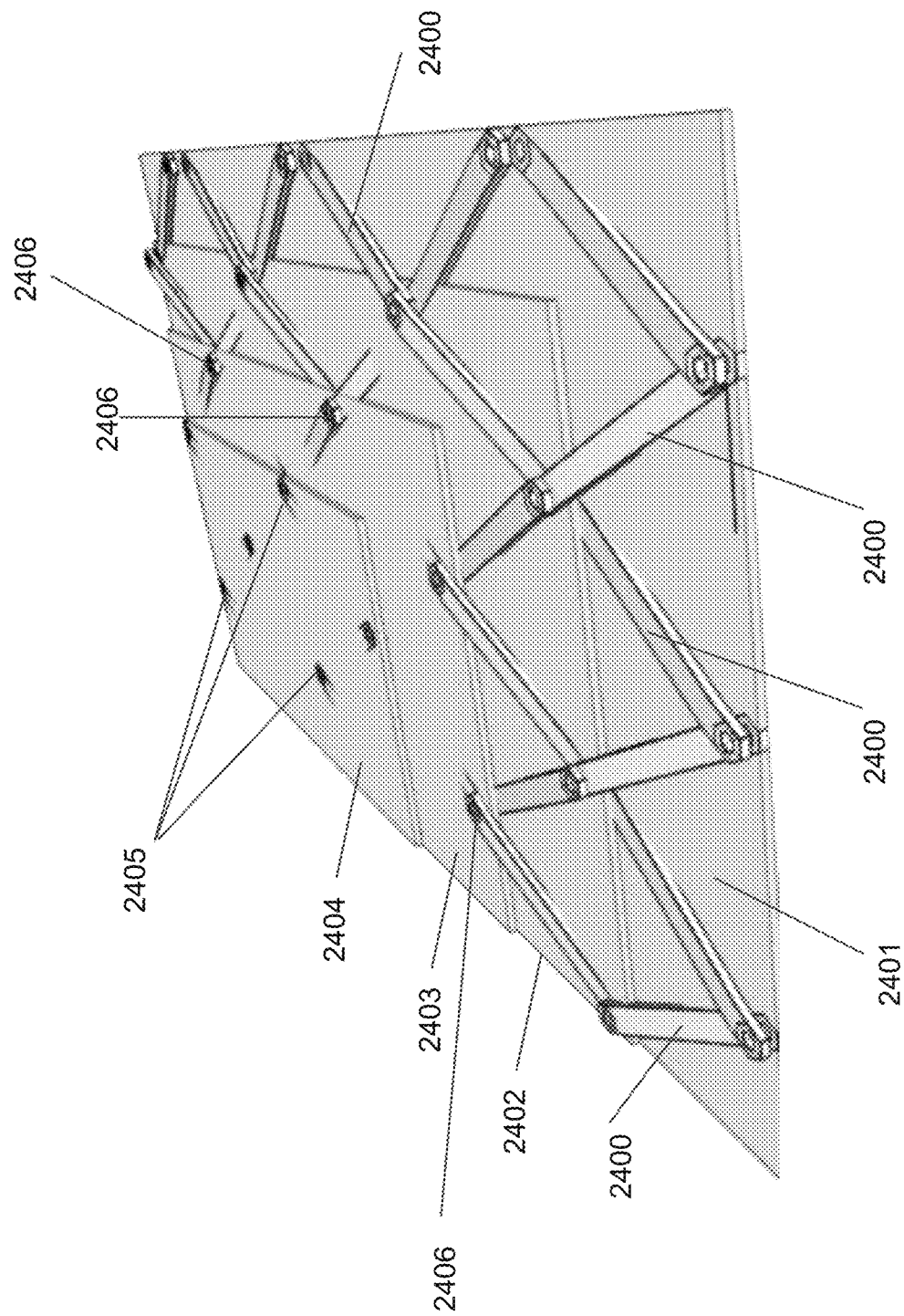

FIGS. 24A, 24B and 24C are different perspective views of multi tiered structure.

Figure 25:
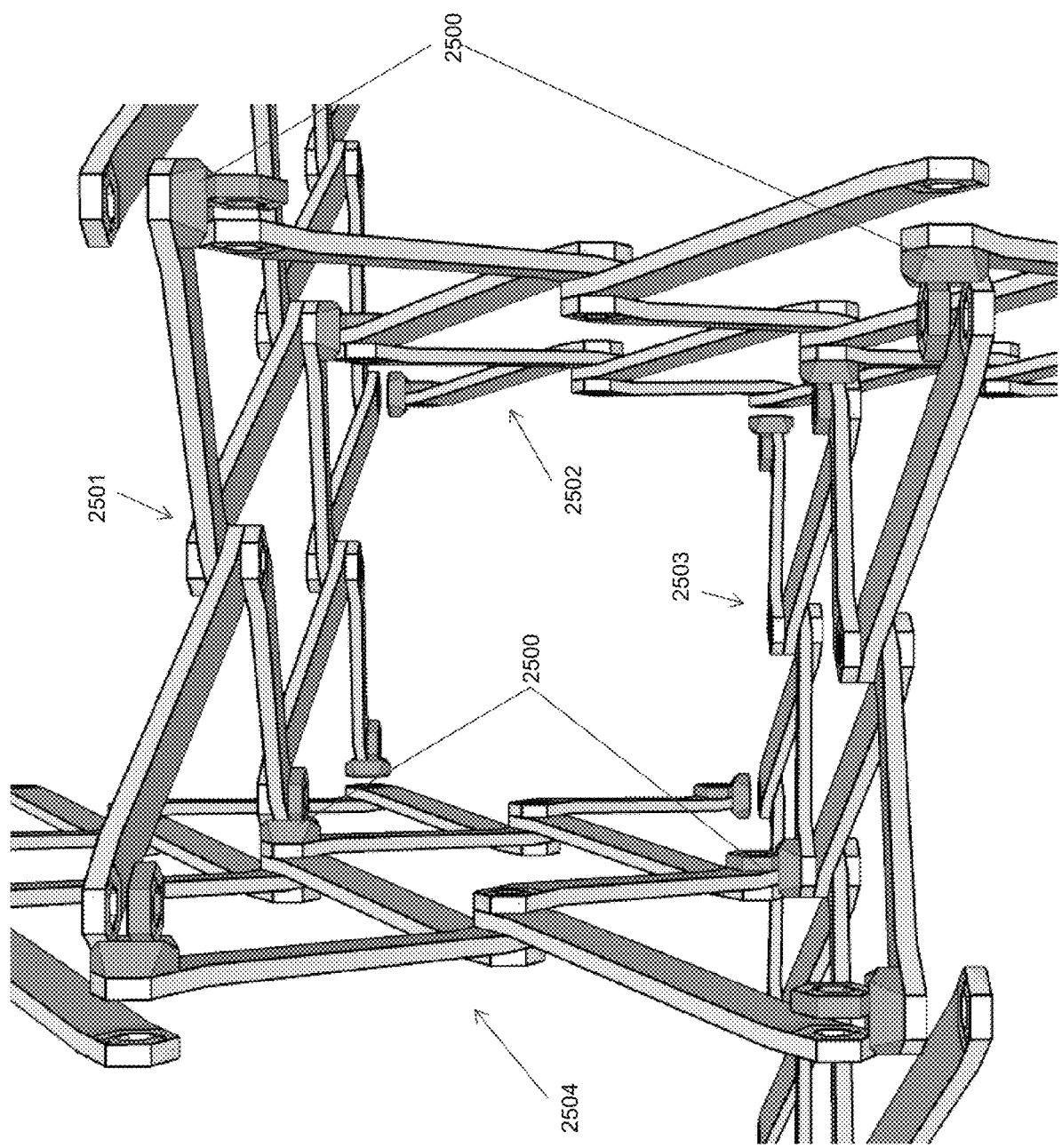

FIG. 25 is a perspective view of an example structure including walls at angles to each other.

Figure 26B:
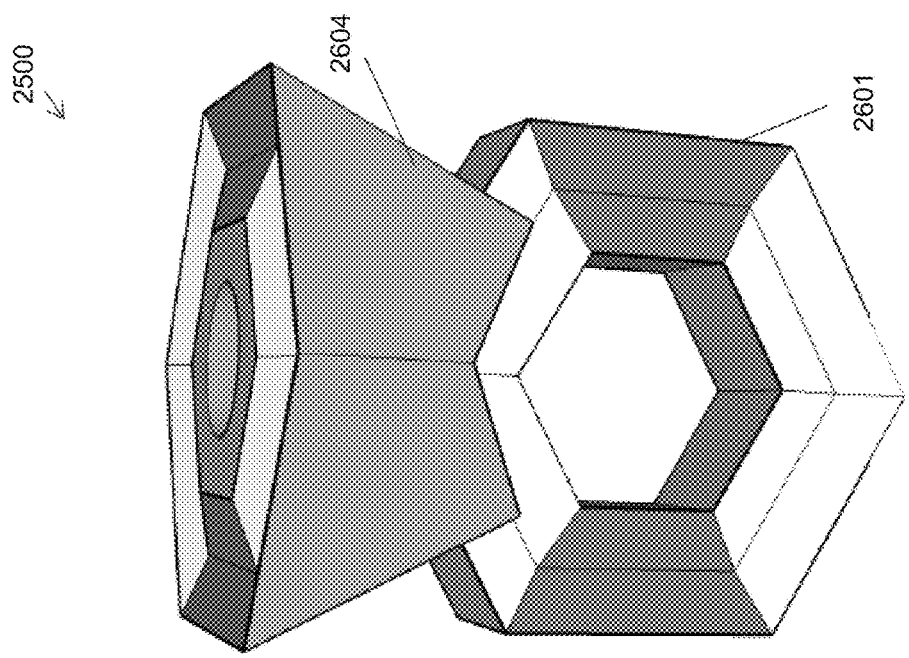
Figure 26A:
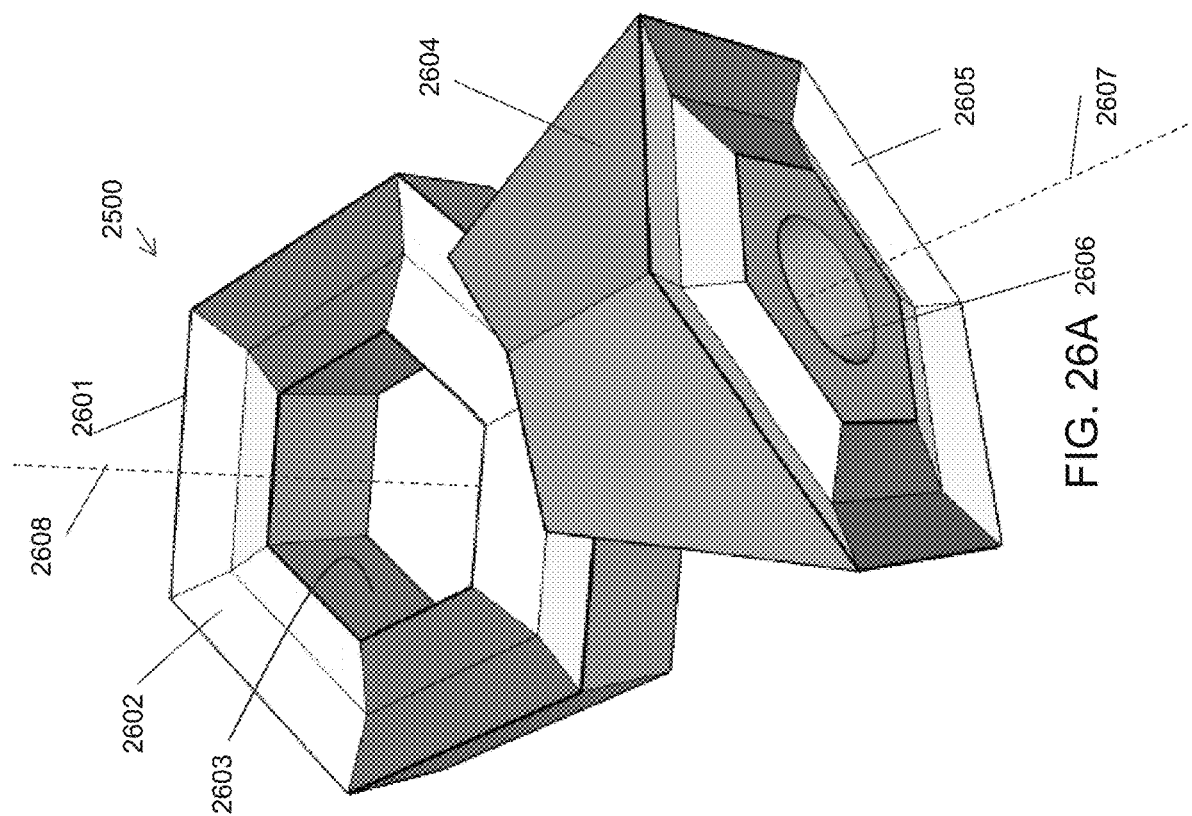

FIGS. 26A and 26B are different perspective views of ties used in the example structure shown in FIG. 25.

Figure 27:
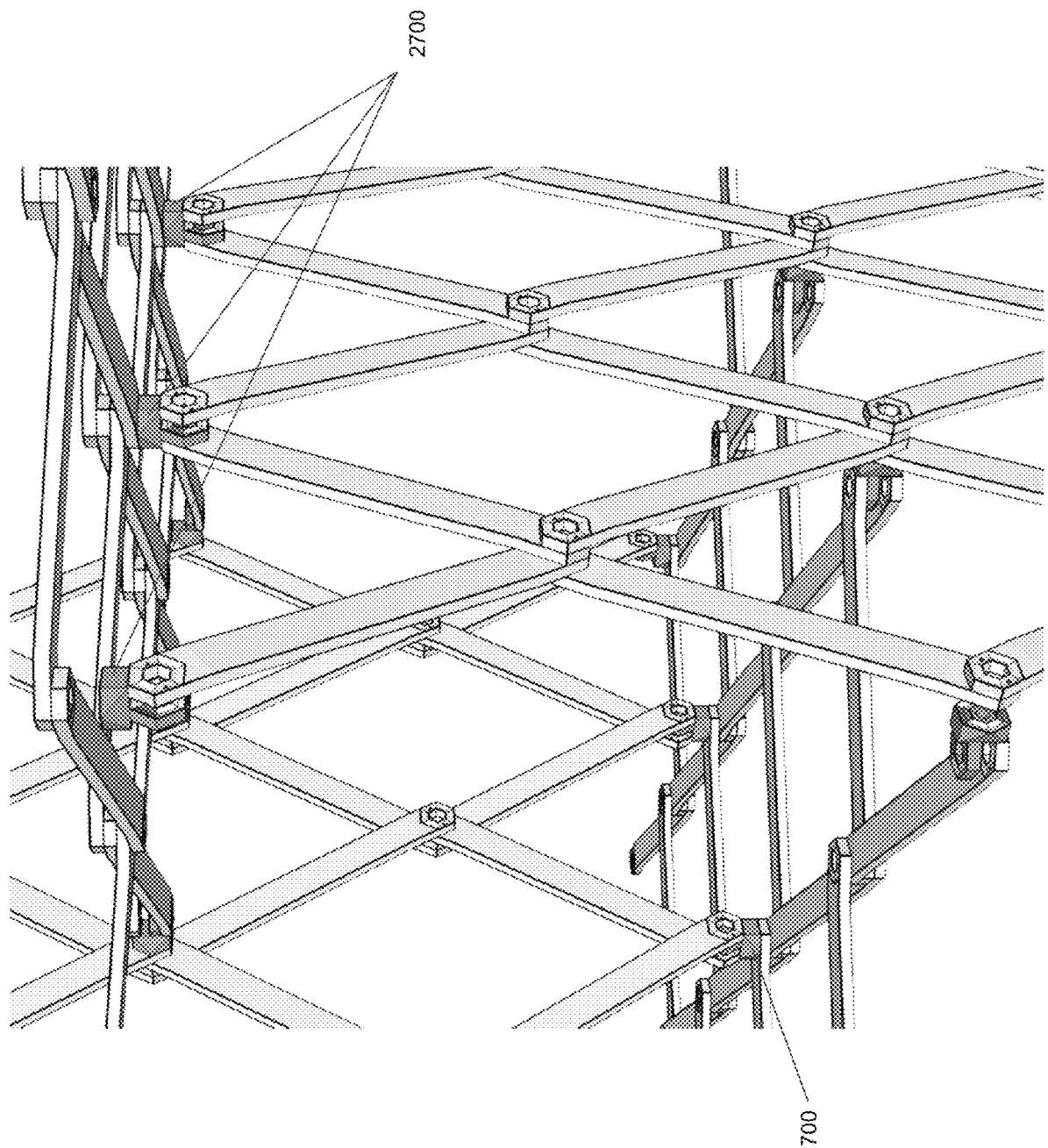
Figure 28A:
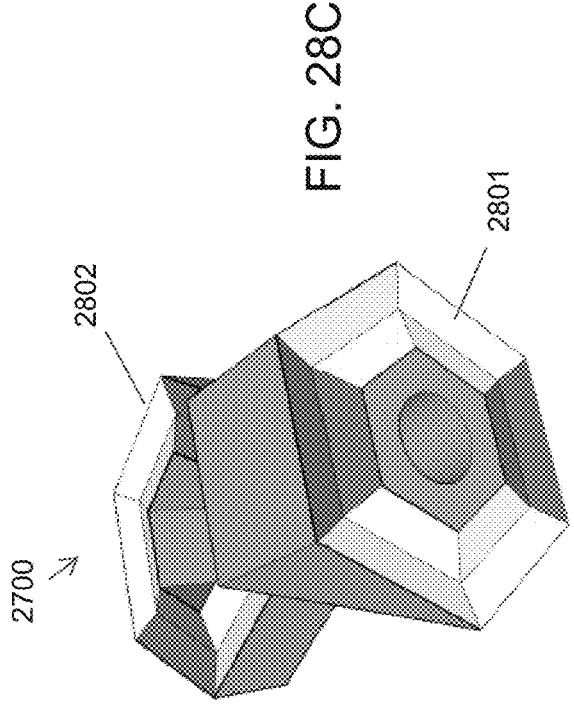
Figure 28C:
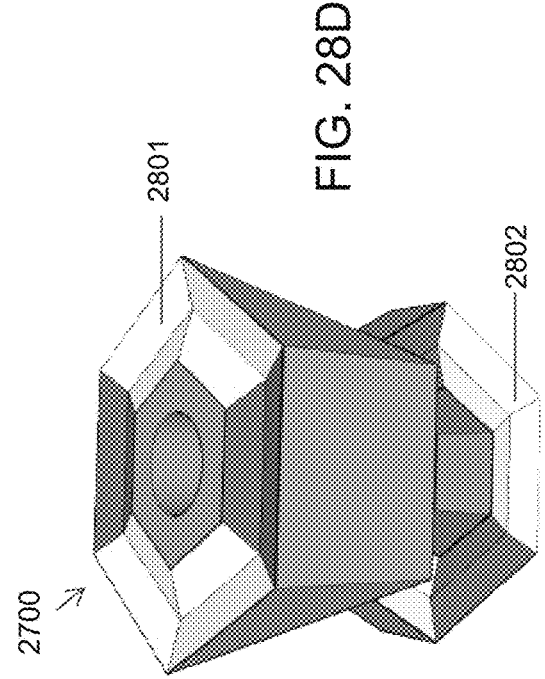
Figure 28B:
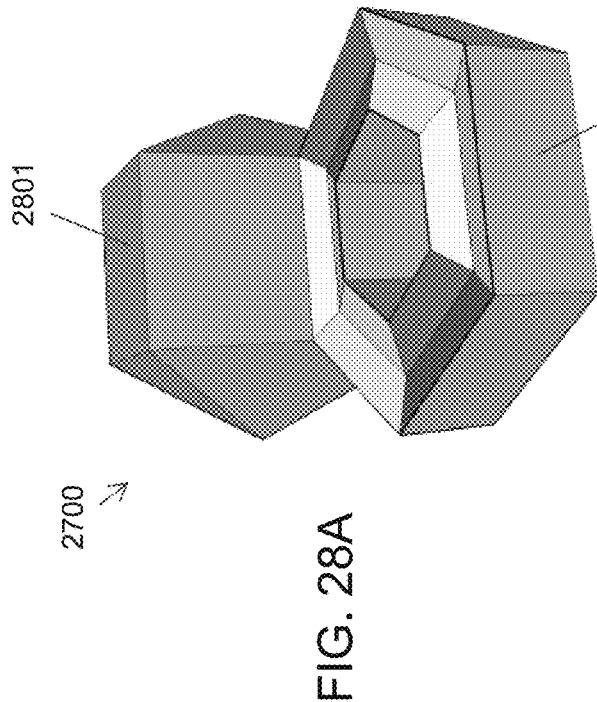
Figure 28D:
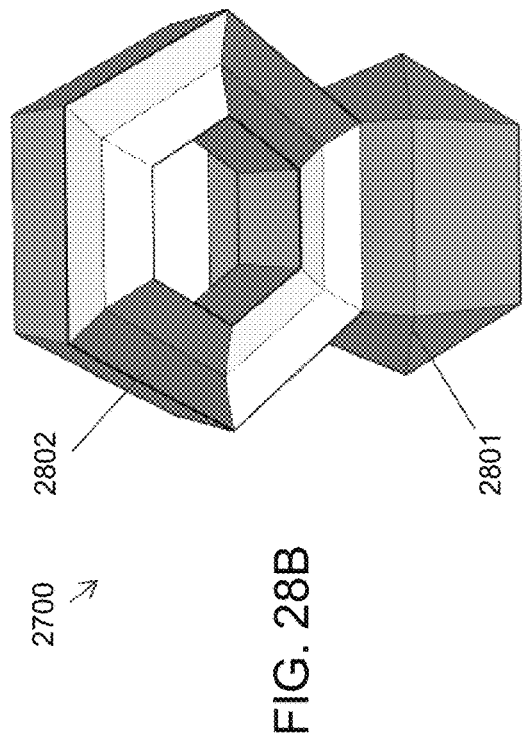
Figure 37:
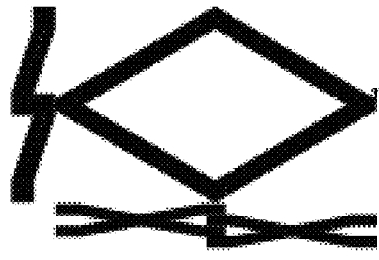
Figure 38:
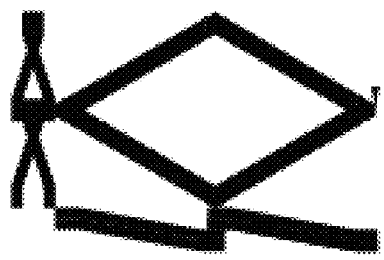
Figure 39:
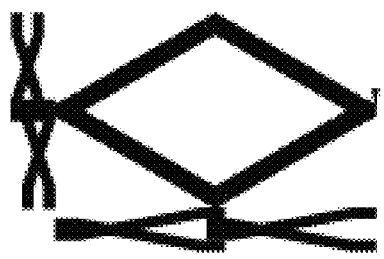
Figure 40:
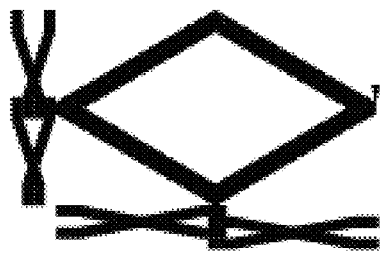
Figure 41:
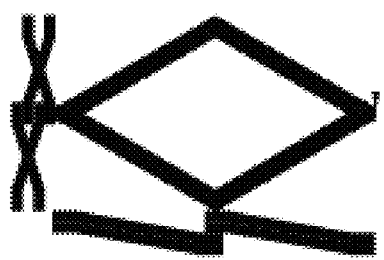
Figure 42:
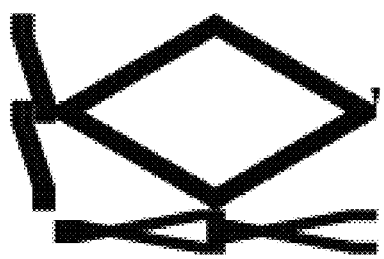

FIG. 27 is a perspective view of an example structure including walls at angles to each other.

FIGS. 28A, 28B, 28C and 28D are different perspective views of another example pin-spacer bracket used in the example structure shown in FIG. 27.

FIGS. 29A, 29B, 29C and 29D are different perspectives of another example pin-spacer bracket.

FIGS. 30A, 30B, 30C and 30D are different perspective views of another pin-spacer brackets.

FIGS. 31-52 each show a front view. a side view and a top view of an example assembly formed with elongated structural members and other components.

Figure 53:
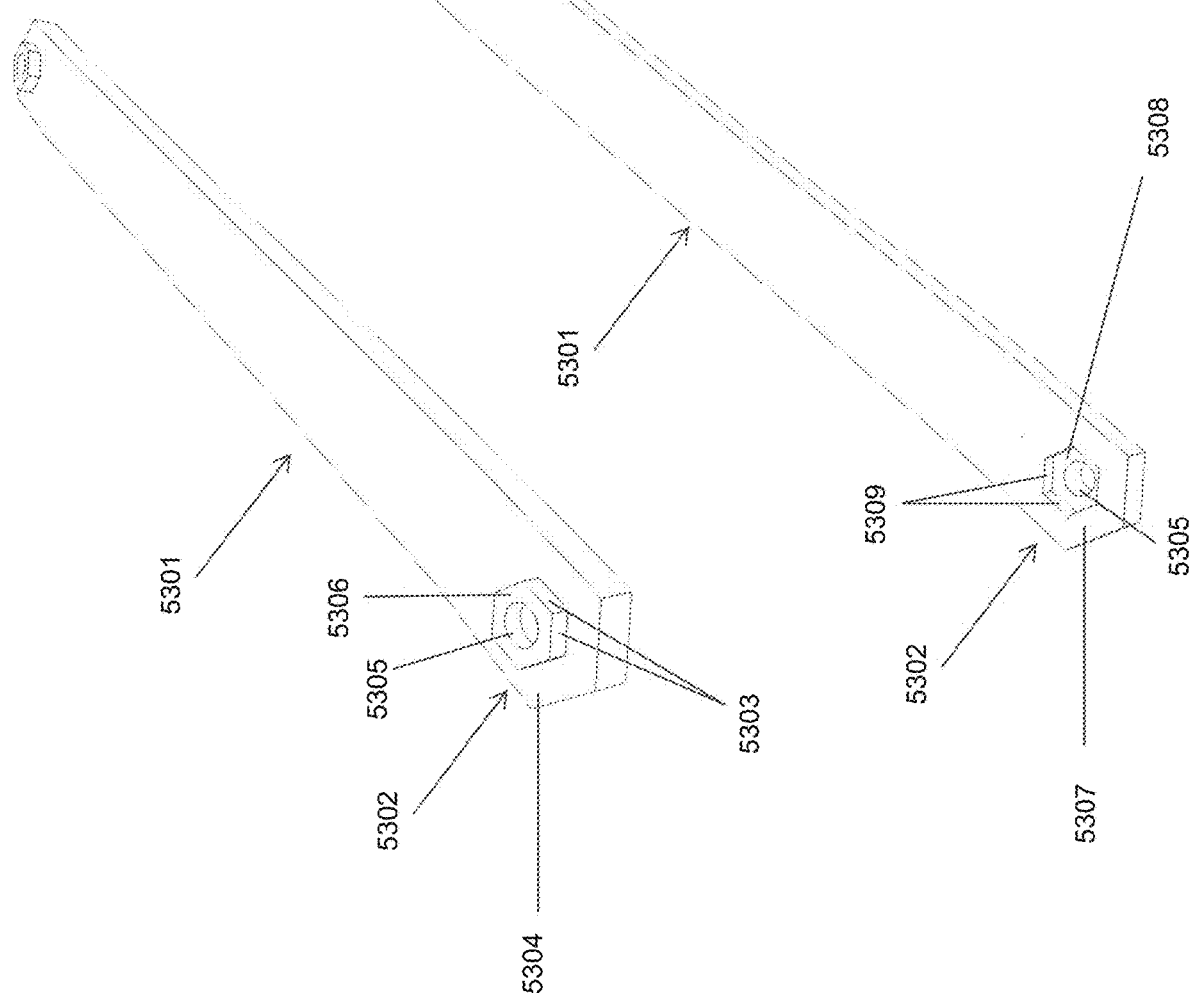

FIGS. 53A and 53B are perspective views of opposite sides of another example of an elongate structural member having a unitary attachment at each end of the end portion.

Figure 54:
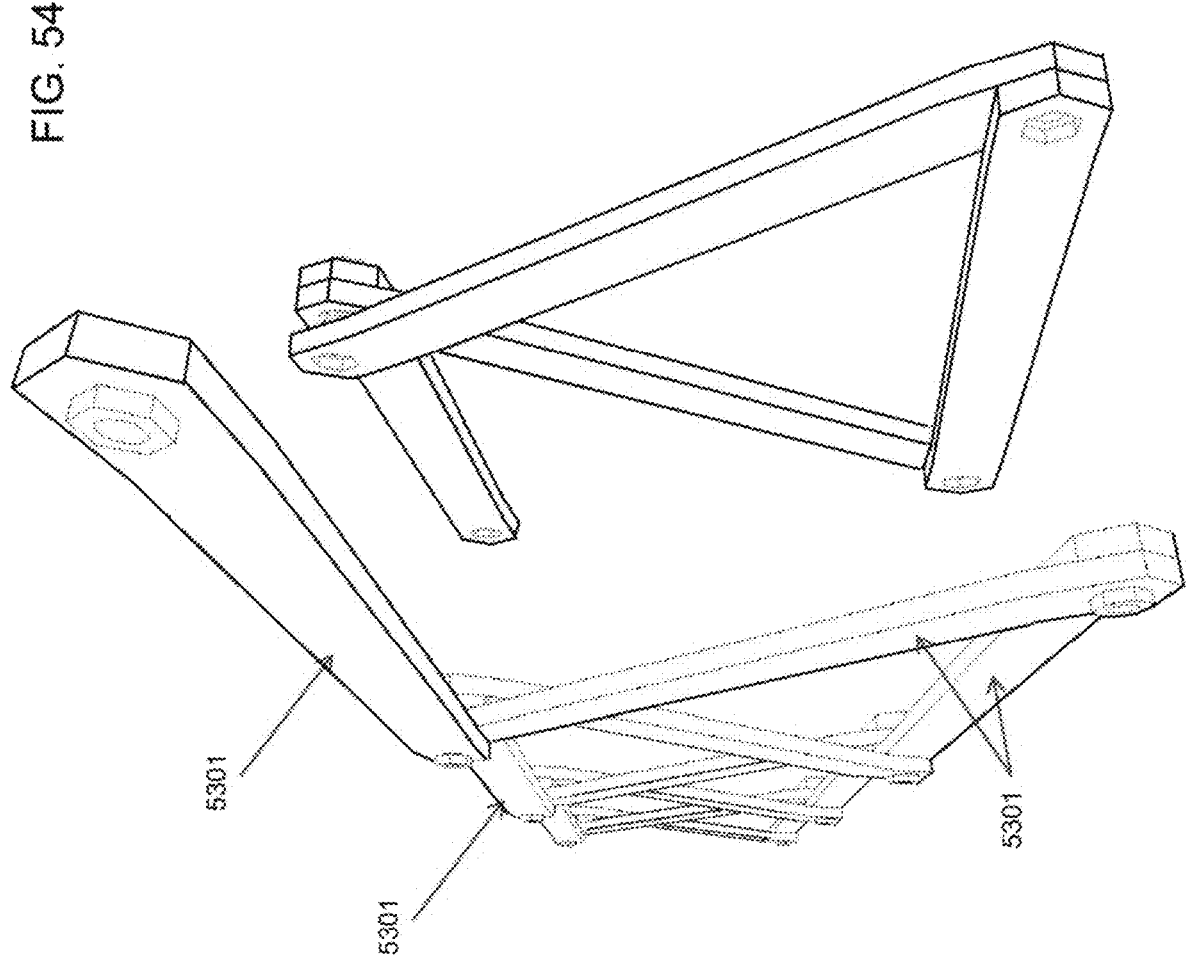

FIG. 54 is a perspective view of an example assembly using the elongated structural member shown in FIGS. 53A and 53B.

FIGS. 55A and 55B are opposite side views of another example member having a unitary attachment at each end portion.

FIGS. 56A and 56B are different perspective views of another example of a pin-spacer bracket.

Figure 57:
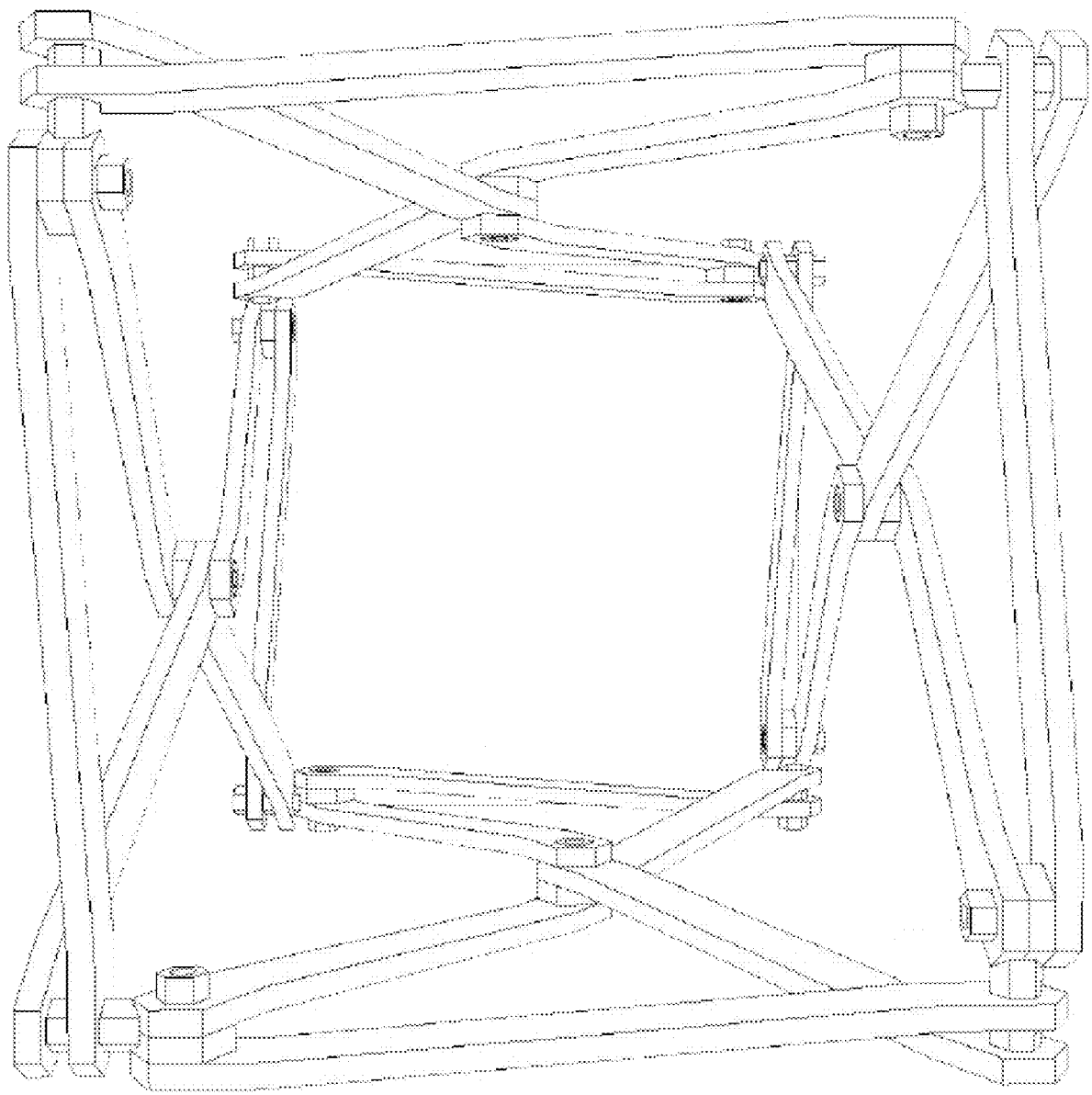

FIG. 57 is a perspective view of an example assembly using the pin-spacer bracket shown in FIGS. 56A and 56B.

Figure 58:
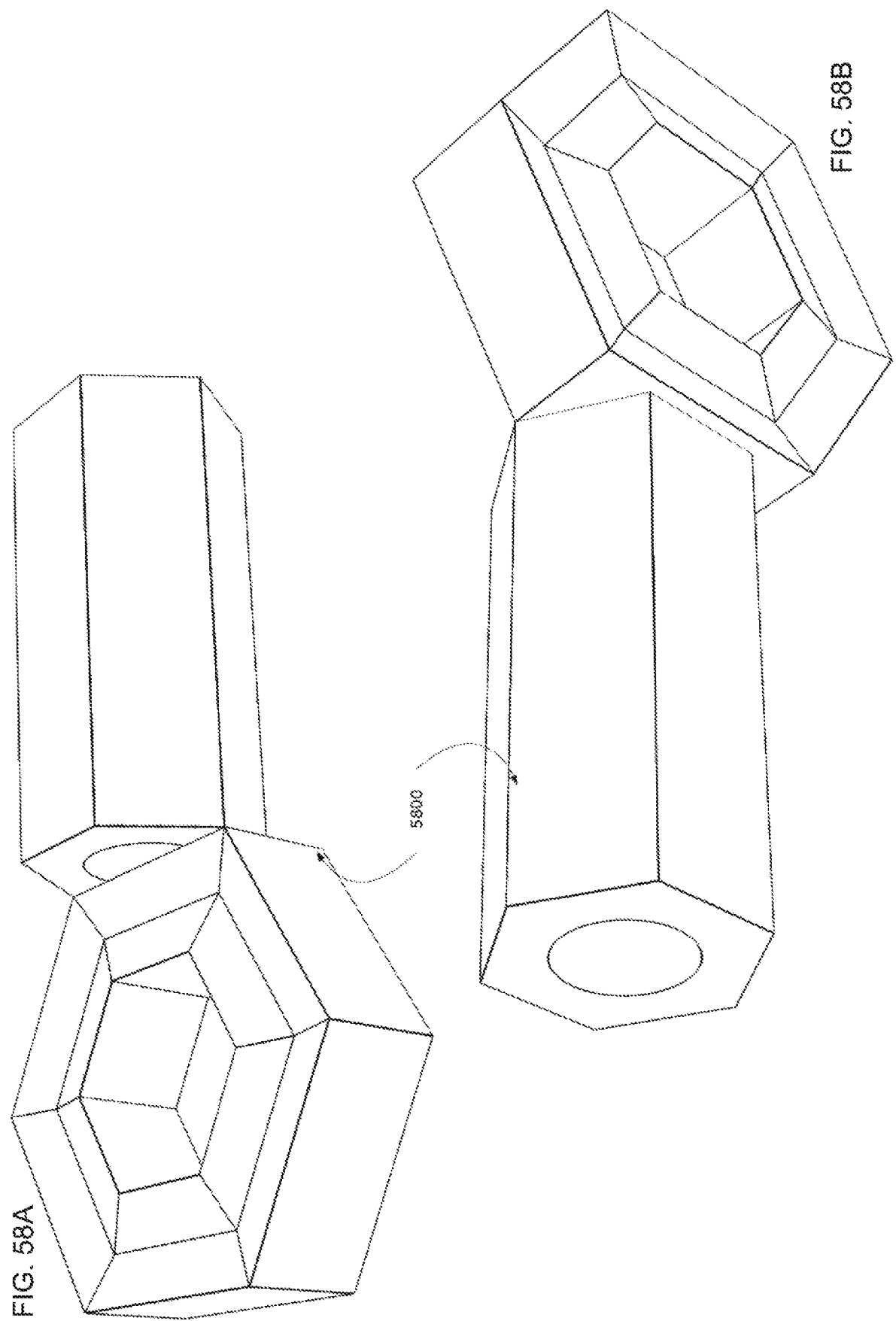

FIGS. 58A and 58B are different perspective views of another example of a pin-spacer bracket.

Figure 59:
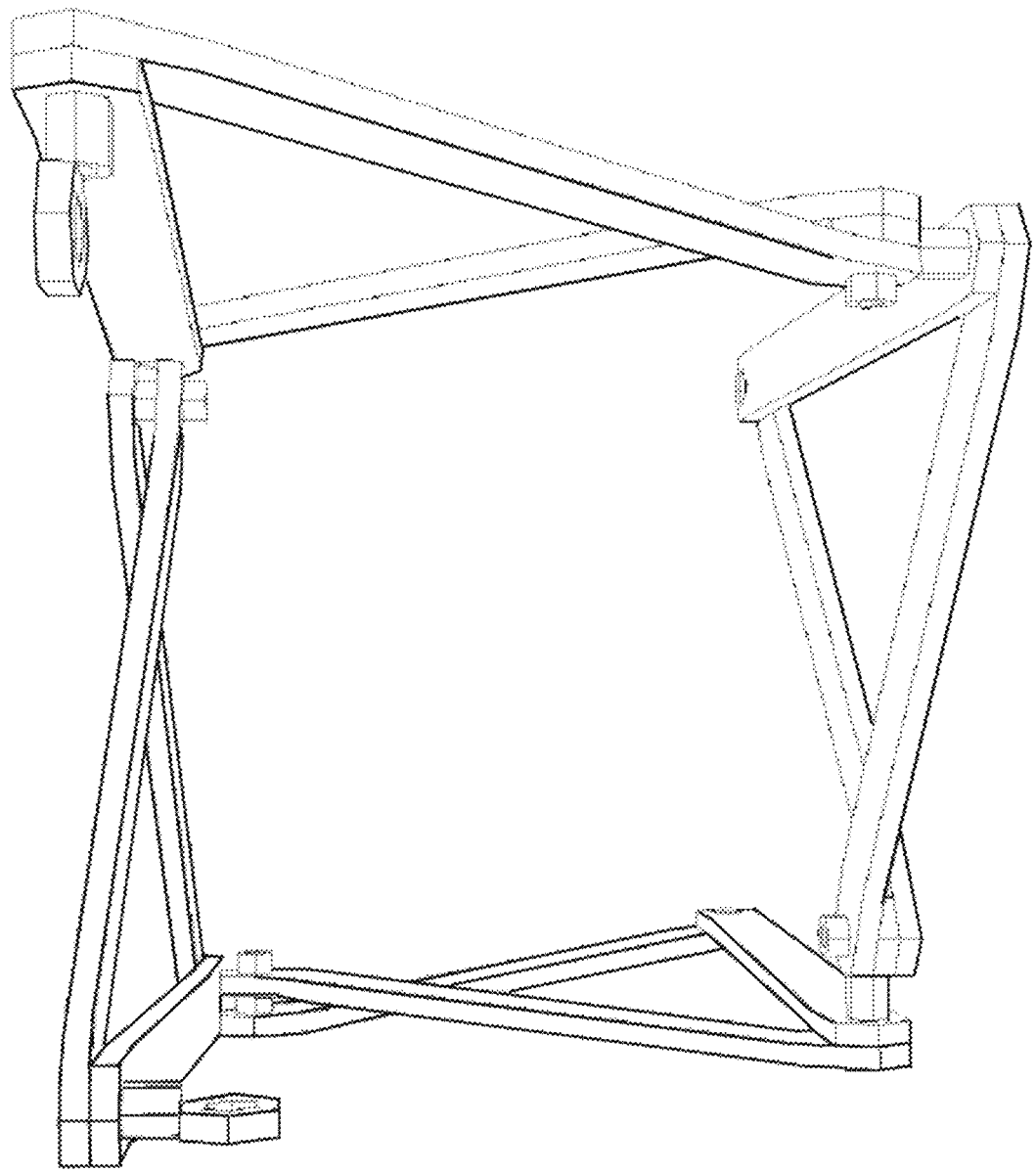
Figure 60:
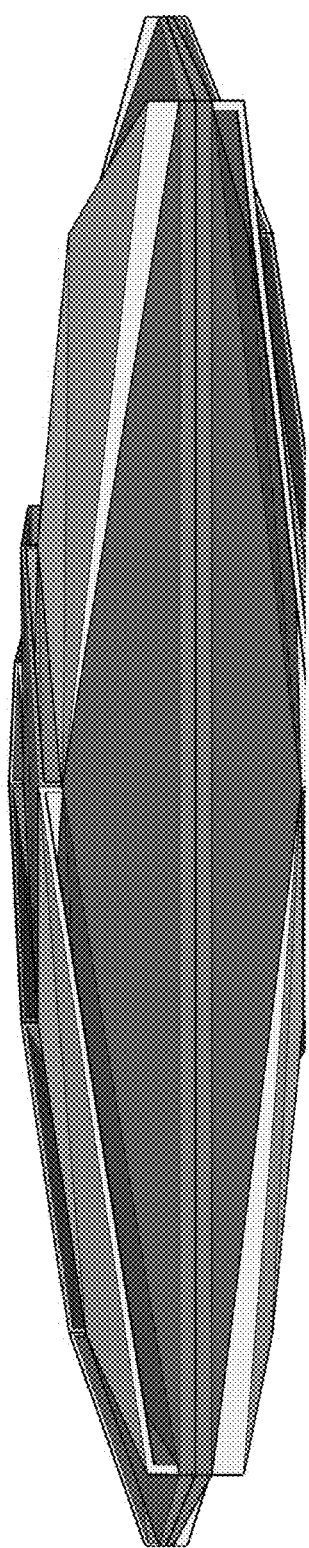
Figure 62:
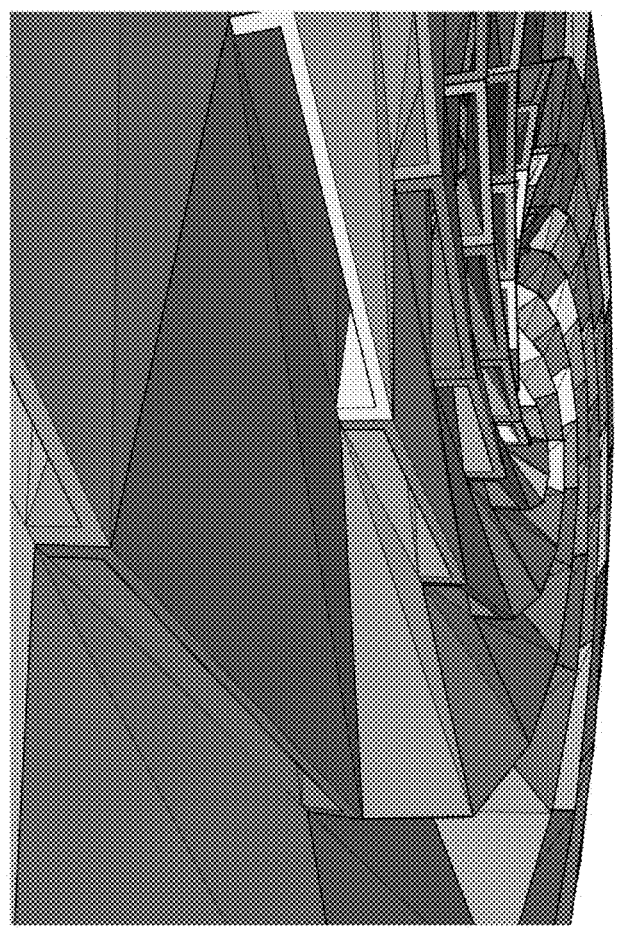
Figure 61:
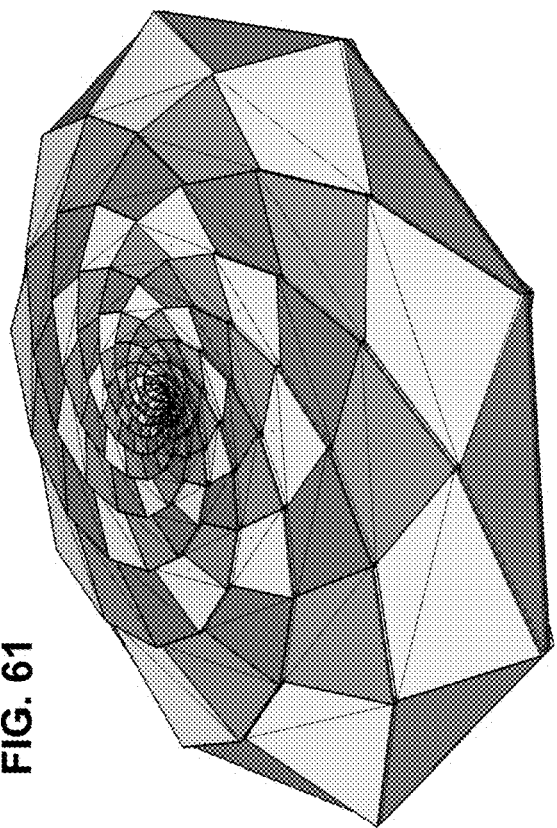
Figure 63:
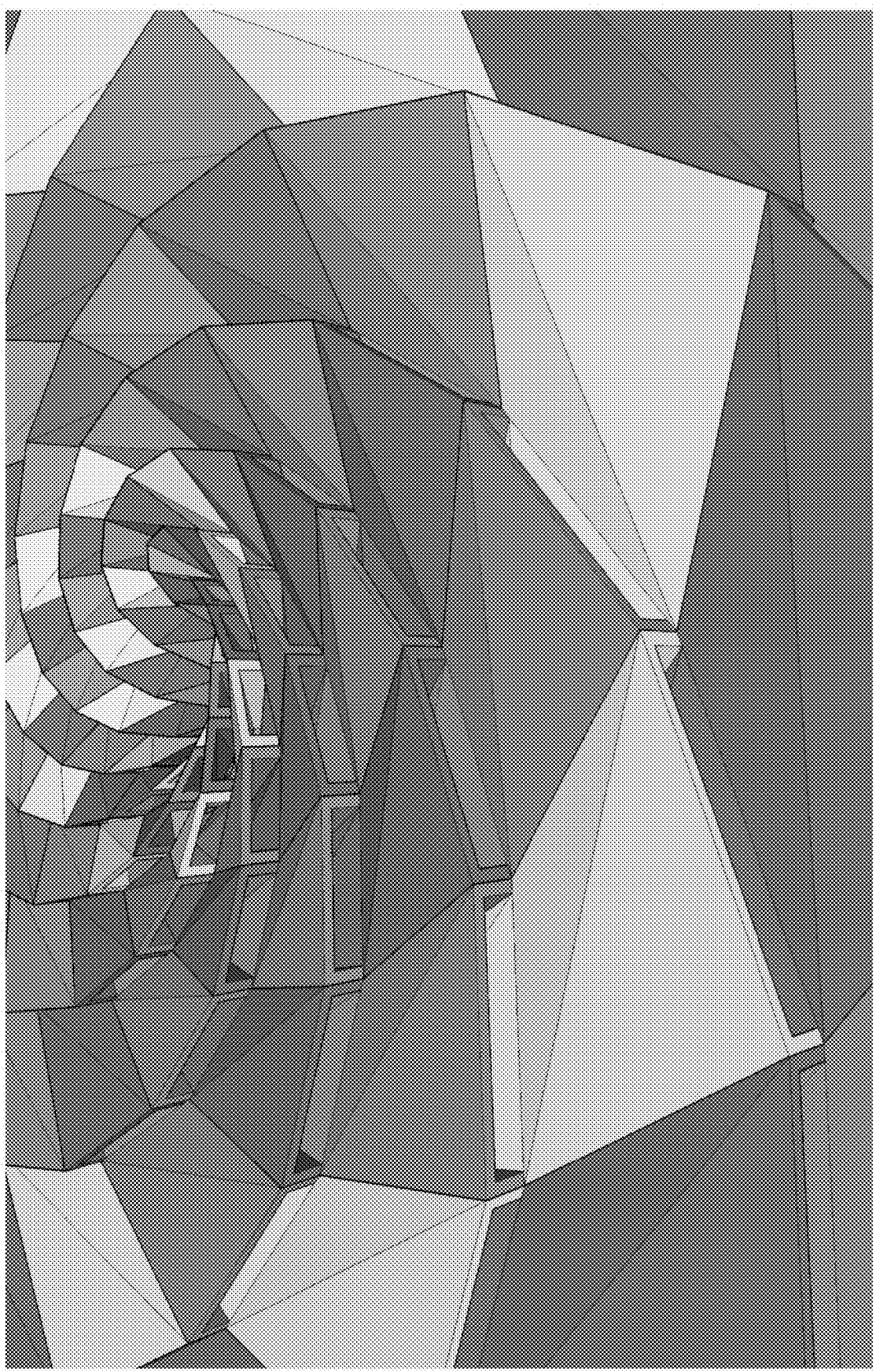

FIG. 59 is a perspective view of an example assembly using the pin spacer bracket shown in FIGS. 58A and 58B.

FIGS. 60-65 are perspective drawings of a novel vortex turbine, system and methodology that may be assembled using integrated members or other embodiments not described herein.

DETAILED DESCRIPTION

It will be appreciated that for simplicity and clarity of illustration, in some cases, reference numerals may be repeated among the figures to indicate corresponding or analogous elements. In addition, some details or features are set forth to provide a thorough understanding of the embodiments described herein. However, it will be understood by those of ordinary skill in the art that the embodiments described herein are illustrative example that may be practices without these details or features. In other instances, well-known methods, procedures and components have not been described in detail so as not to obscure the inventions illustrated in the examples described herein. Also, the description is not to be considered as limiting the scope of the embodiments described herein or illustrated in the drawings.

It is appreciated that an elongate structural member can refer to a post, beam, strut, tube, pipe, wire, conduit, chord, strut, solar panel or light panel and may be made of various individual materials or in materials used in combination with each other. Examples of materials include a log, concrete, metal, composites, or any other appropriate material.

It is herein recognized that using posts and beams to make walls or panels typically leads to thicker structures. In an example the walls may be thick. It is also recognized that a thinner structure may be less strong. Furthermore, walls and other structures typically cannot be made up of identical members and those same identical members cannot be used to create other structures or assemblies. (eg. A strut may not be used as a cap plate). Furthermore the free flow of material within and through the interior of a structural element is typically not possible. (e.g. cap plates restrict the movement of air between levels of a building within a the walls of each floor)

It is further herein recognized that typical structures are difficult to assemble. IN an example, welding may be required to assemble a metallic structure. Furthermore, typical structures include a variety of different components (e.g. having different shapes, functions, etc.) and this can further increase the difficulty in building a structure. Furthermore typical structural members and structural elements created by them, cannot integrate functions or uses other than structural. For example they cannot allow for the electrical transmission or movement of liquids or other materials through the interior of their structural members, nor do they allow for a structural member to be used as a tube, wire, circuit, etc. Furthermore the surfaces of structural elements and structural members are not functional. Examples of functional surfaces are integrated circuitry, solar panels, etc.

Furthermore, typically larger components are required to form larger structures, which can make transport of these larger components difficult. The variety of different components also makes transportation difficult, as the negative space within a typical truss cannot be utilized, causing a greater volume necessary to transport.

It is further herein recognized that structural components may only build a limited set of shapes or structures. Furthermore once a structure is built, modification of the shape of the structure is difficult. In other words, adding and removing components is difficult. Furthermore, components of a structure are not easily reusable and cannot be combined to form other structural elements or a variety of different shapes and structural elements. The components necessary to build a truss are not the same necessary to build a girder or a panel or joist. Furthermore adding to the height or side of a given assembly cannot be easily accomplished.

It is further herein recognized that structures are typically intended for one purpose and cannot be used for different applications once assembled. For example, a structure typically intended for a wall cannot be used for a floor panel.

A proposed integrated structural member, kit of parts and system is described herein to address one or more of the difficulties of the prior art. Different structures may be constructed and assembled using the novel member; using both identical elongate members or a combination of unique elongate members assembled together along with the kit of parts described herein.

FIGS. 1A and 1B show an embodiment of a truss structure 100 from different perspective views. The truss structure is formed from multiple uniform members that are connected to each other at their end portions. In this example, these structural members 101, 102, 103, 104, 105, 106, 109 are identical to each other. The truss structure shown in this example is formed by multiple triangular truss geometries. This example truss structure 100 may be incorporated into a larger structure using identical members or unique members combined together. In FIG. 1B, the resulting truss structure has a thin profile, but may be thick depending on the proportion of the member. The angled or offset elongate mid-portion of each structural member is used to form a thin profile. In an example, members 109, 104, 105 and 103 are connected together to form a common joint 108. Elongate members 102, 101, 105 and 106 are connected together to form a common joint 107.

FIGS. 2A and 2B show an embodiment of a diamond shaped structure 200, which may be used to form a larger woven lattice structure. There are four identical elongate members 201, 202, 203, 204 that are connected together at their ends using components described herein. As best seen in FIB. 2B, from the side view, the diamond shape structure is thin. The angled or off-set elongate midportion of each elongate structural member is used to form a thin profile, and gives structural integrity, with triangular geometries, perpendicular to the surface of joint 108, as the slope of the elongate member 105 differed from that of 102. The differing slope is achieved by the orientation and oration of uniform members in relation to on another. It will be appreciated that these multiple, contrasting and complimentary triangular geometries increase structural integrity regardless of the orientation of the completed structural element. IN other words the wall may also be used as a floor or roof panel.

It will be appreciated that the elongate structural member may be used to form a variety of structure and enable, a multitude of functions, not limited to the examples shown herein. The member or kit of parts, or both, can be used, for example, in construction, medicine agriculture, electrical generation, nano-technology, including walls, floors, roofs, stairs, lattices, trellis, greenhouses, shelving, power transmission, liquid or other material transportation, mechanical housings, solar arrays or panels, wind power supports, road tiles, rammed earth supports, masonry exoskeletons or any other use not disclosed herein.

In particular turning to FIGS. 3A and 3B, which respectively show side views and from views of example components used together, the elongate structural member 300 includes two end portions 304, 302 that are separated by elongate mid portions 301. The two end portions 302 are within two different planes that are offset from each other and are substantially parallel to each other, illustrated in FIG. 3A with the dotted lines. The elongate mid-portion 201 is sloped to connect the two end portions 304, 302 located in different planes. The two end portions have connectors that allow the elongate structural member to connect to one or more other elongate structural members. In an embodiment not shown here the end portions are not parallel to each other, achieving the same result as a kit of parts including the angled bracket, without use of the angled bracket, forming another unitary member.

In an embodiment, the angle of the elongate mid-portion relative to one of the end portions is approximately 10 degrees. In other embodiments, the angle of the elongate mid-portion relative to of of the end portions is less than or greater than 10 degrees.

In an embodiment the thickness of the end portion of D1 and the distance offset between the plane of surface 318 and the plane of surface 314 D2 are released for example.

D2 is a multiple of D1 by some factor n. In an embodiment, n is 2 and D2 is substantially twice the distance of D1. In another embodiment, n is 4. It will be appreciated that n my be a different value for different embodiments of the elongate structural member.

In another embodiment the amount of offset D2 is determined by the plane over which the member is applied. For example, a plane may be substantially vertical (eg. See the vertical lattices in FIGS. 43 and 44), or the plane may be angled (eg. See the sloped lattices in FIGS. 50-52). In other words, a plane of lattice may be parallel to the flat faces of the end portions of the elongate structural member. Or in another example a plane of a sloped lattice may be at an angle to the flat faces at the end portions of the elongate structural member. The offset D2 may be used to affect the plane.

Elongate members can also be used to allow for nonuniform surfaces to be covered (ed. Roads, curved surfaces, etc.) by, adjusting D1, D2 or any other proportion, value or angle of the elongate member.

The elongate structural member 300 for example is a unitary member.

In an embodiment, as shown in the figures, the elongate mid-portion has a rectangular cross-section with the same width and thickness as the end portions. In another embodiment, not shown in the figures, the elongate midportions has cross-section that has a different shape or different dimensions, or both, compared to the crosssection of each of the end portions. In another embodiment, the cross-section of the elongate mid portion is round, triangular, or any other shape. In other embodiments the dimensions may not correspond in any way to the end portions. Furthermore the mid-portion may have a cross-section being solid or not solid. Other embodiments have a hollow core, sponge like material or other interiors and exteriors individually or incombination.

As best seen in FIG. 3B the connector on each end of the end portions 302, 304 respectively includes holes 303, 305 that are defined within each end portion. The hole is a through hole that is configured to receive a pin 308. In another embodiment, the hole is defined by multiple interior walls or facets that together define a polygon, such as a triangle, star, a square, a pentagon, a hexagon, a heptagon, an octagon, etc. The pins used to connect the elongate members are shaped to have the same number of facets as the hole. In another embodiment, the holes and the pin are preferably polygonal so as to prevent rotation of the elongate member about the pins axis. IN other words, the polygonal pin and the polygonal hole resist torque forces about the pin. In another embodiment not shown here the pin is round or smooth to allow for motion of the members around the pins axis allowing the structure to move similar to a net made of rope. A round or smooth pin may be used in combination with a structural washer to allow more flow of material though the joint while maintain the structural integrity of the joint and structure.

In the future, the hole 303, 305 in each end portion is shaped as a hexagon. Complimentary the pins 308 have a hexagonal cross-section and are sized to fit within the hole of each end portion.

The end portion 302 includes flat surfaces 315 and 314 that are on opposite sides of a perimeter wall 316. The hole 303 extends between the flat surfaces 314, 315. A similar structure exists at the end portion 304, which has flat surfaces 317 and 318. In another embodiment, the flat surface 314, 315, 317 and 318 are substantially parallel to each other.

In another embodiment, the axis of the hole 303 is oriented to be substantially perpendicular to the flat surfaces 314 and 315. In another embodiment not shown here the surfaces like 315 and 314 are not parallel, instead are angled in relation to each other, to achieve the result shown in FIG. 11 effectively incorporating the angled bracket 400 into the member.

In another embodiment, a portion of the perimeter wall 316 is shaped to match a portion of the shape of hole 303. As shown in FIG. 3B, a portion of the perimeter wall 316 has angled surfaces that are similar to the interior wall that defines hole 303. In another embodiment, the perimeter wall of an end portion has a different shape compared to the shape of the hole at the end portion.

The polygonal hole and the polygonal pins are used to secure two or more elongate members at angles relative to each other. In other words, the polygonal holes and a pin with a complimentary shaped polygonal cross-section may be used to prevent the elongate members from rotating relative to each other, once the elongate members are secured to each other. The angles, in another example, are limited to the number of facets of the polygon. In another embodiment including hexagonal holes and a pin having a hexagonal cross-section, the relative angles between two or more members are varied by multiples of 60 degrees. in another embodiment having octagonal holes and a pin having octagonal cross-section the relative angles between two or more elongate members are varied by multiples of 45 degrees. The same methodology can be applied to other embodiments not shown here depending on the cross section of the pin.

The pin 308, which has a polygonal shaped outer perimeter, has defined therein a hole 309 to receive a shank 313 of a bolt 312. The bolt 312 also includes a bolt head 310. The shank 313 of the bolt 312 passes through hole 309 in the pin 308, and a nut and a torque washer 306 may be used to secure the pin and the two or more members together. In another embodiment, a part of the shank 313 is threaded to engage the threads of the nut. As shown in FIG. 3B, the torque washer 306 has defined therein a hole 307 with a polygonal perimeter that matches the perimeter of the pin 308. In the example shown, the hole 307 is shaped hexagonal.

it will be appreciated there may be various different lengths of the pin and the bolt, in another example, to accommodate the depth of a joint between multiple end portions of members. In another example joining two elongate structural members will require a shorter bolt and pin compared to joining six members. The depth of the pin and bait can be as deep or deeper on the total number of members that are joined together. In another embodiment, as shown in the figures, the bolt 310 defines therein a hollow core 311 passing through the entire length of the bolt. In this way, another object (e.g. wire, tubing, another structure, turbine etc.) or a fluid, may pass through the hollow core of the bolt. In another embodiment not shown here the entire hole in the end portion can be used for the aforementioned uses with a torque washer taking the stress of the structure. In another embodiment not shown here a method for capturing the energy of the material flowing through the hollow core or hold in the end portion is used. This can be inserted into the space within 305, 307, 309 or else where. (e.g. a small turbine affixed at the end of the joint).

In another embodiment, a round-shaped hole defines in each end portion of the member and a bolt with a round cross-section is used to secure two or more elongate members together.

It will be appreciated that the elongate member may be constructed from any different material or combination there of, whose internal structure may differ to other members or within a single given member, depending on the application. (e.g. the mid-portion may be pores while the end portions are solid). IN another embodiment, the member is constructed from metal material including metal alloys. In another non-limiting example, the elongate structural member is formed from a polymer material. In another embodiment the member is formed from a combination of different materials and processes. It will be appreciated that the attributes of any given member can and may be applied to any other embodiment described here or not.

Turning to FIG. 4A, an embodiment of an angled bracket 400 is shown, which includes two pins 402, 403 that protrude outwardly and at an angle from each other. The two pins 402, 403 that protrude outwardly and at an angle from each other. The pins 402, 403 protrude from a shim body 401. It will be appreciated that this shim body can be integrated into the integrated member to form a unitary member. A hole defined in the end portion of a first member receives one pin 402, and a hole defined in an end portion of a second member receiving another pin 403. As a result, the first and second elongate structural members are connected to each other via the angled bracket 400, at an angle. The shim body 401 includes a flat face 404 and a flat face 405, which are respectively facing an end portion of the first elongate structure and an end portion of a second elongate portion. The flat faces 404 and 405 are angled away from each other. In another embodiment not shown here faces 404 and 405 are v-shaped to allow for a torque washer to be used. It will be appreciated that the core of the bolt extending from the angled bracket may be hollow or have the same features attributed to the elongate mid-portion.

FIGS. 4*b* and 4C show other embodiments of the angled bracket 400' and 400", from a side view and showing a partial cut-away view of the pins 402', 403', 402", and 403". The angled bracket 400' has a shim body 401". The partial cut-away view of the pins show that there is an inner wall 406 that defines therein a void to receive a bolt. The inner walls 406 of the pins can be partially threaded, or in another embodiment, are fully threaded in order to interface with the threaded portion of a bolts shank. It will be appreciated that the interior walls of the angled bracket may be connect to one another by way of tubing in order to allow for the flow of material through the angled bracket.

FIG. 4D shows an embodiment of an angles bracket 400''', but from a perspective view. It also includes two pins that protrude outwardly from a shim body, and at an angle to each other.

FIGS. 5A-5C show different views of another embodiment of a structure formed by multiple ones of the members connected to each other. In this example, some of the joints 501, 502 show four elongate members connected together with a pin passing through the aligned holes of their end portions. Some of the joints 503, 504 show three elongate structural members connect together with a pin passing though the aligned holes of their end portions. Thus structure 500 is used, in an example to form a thin wall or panel that is substantially vertically oriented. In another example, the structure has a different orientation such as horizontal.

Turning to FIGS. 6A, 6B and 6C, different views of another structure 600 is shown which is made of multiple identical members. Thus structure 600 is used in an example, to form a thin wall or panel that is substantially vertically oriented, or horizontally as a floor, or diagonally i.e. on a 60 degree angle with the used of a pin-spacer bracket assembly to form a roof panel. In other examples the structure is used with orientations not mentioned above.

In the structures 100, 200, 500 and 600 and other structures herein a load force is applied along the length of a structural member. IN other words the substantially parallel planes defined by the end portion are in an embodiment, partially vertically oriented and a load force is applied to the example structure in a direction substantially parallel to the planes defined by the end portion. The elongate mid-portions extend at an angle between these parallel planes of the end portions, and the load is transferred along the elongate midportions. There are multiple opposing and complimentary triangular geometries determined by the angle of the member in relation to one-another and the depth of the member, which determines the angle of the elongate mid portion in relation to the end pieces, or otherwise depending on the shape of the given member.

The example structures, 100, 200, 500 and 600 have a thin side profile because the identical elongate member are arranged in alternating orientations. In particular, the offsetting angles of the mid-portions are arranged to alternate from each other to produce a thin woven structure which supports and opposes forces applied to the structure from any angle, whether the assembly is substantially horizontal, vertical or other orientation.

Consider the structure in 100 in FIGS. 1A and 1B. A separate joint structure is not used to form the joint between multiple elongate members. Instead, in an example, each of the end portions of the elongate members 109, 103, 105, 104 are positioned to form a joint 108 so that their respective holes are aligned for a pin to pass therethrough. In relation to the joint 108. the midportion of the elongate member 104 slopes inwards towards the joint 108; the mid-portion of the elongate member 109 slopes inwards towards the joint 108; the mid-portion of the elongate member 105 slopes outwards toward the joint 108; and the mid-portion of the elongate member 103 slopes outwards towards the joint 108. In relation to the joint 107, the mid-portion of the elongate member 102 slopes outwards towards the joint 107; the mid-portion of the elongate member 101 slopes inwards towards the joint 107; the mid-portion of the elongate member 106 slopes outwards towards the joint 107; and the midportion of the elongate member 105 slopes inwards towards the joint 107. As can be seen, the most outer surface 108A of the joint 108 is in substantially the same plane as the most outer surface 107A of the joint 107. The most outer surface 108A is the outward facing flat face of the end portion of the elongate member 103. The most outer surface 107A is the outward facing flat face of the end portion of the elongate member 102. As the flat surfaces 107A and 108A, amongst others when the pattern of the structure 100 is repeated, are substantially on the same plane, then another structure (e.g. an enveloping wall or a panel) may be used to sit flush with that same plane and will be supported by the multiple flat surfaces. In an embodiment, the common plane is established because of the distances D1 and D2 being related to each other, as discussed with respect to FIG. 3A. As can also be seen, by positioning the elongate members in with alternating slopes, the thickness of the overall structure remains thin. In particular, the thickest portion of the overall structure 100 is the thickness of a joint (e.g. joints 107, 108).

The features described with respect to structure 100 are also present in the structures 200, 500 and 600. 700, 900, 1000 and other structures described herein. These structures can be assembled using by multiple identical members, differing from each other only in orientation and rotation.

Turning to FIG. 7, an example lattice structure 700 is shown that is made of multiples ones of the elongate members. The structure 700 includes multiple layers of lattices that connected together with multiple joints 701. A joint 701 includes holes of multiple end portions of different ones of elongate members aligned with each other, so that a pin is able to pass through the joint. The pin is polygonal (e.g. hexagonal) in order to apply a torque holding force, to resist rotation of an elongate member about the pin. As each elongate member has an elongate mid-portion that is sloped to form an offset between the end portions, the resulting structure 700 is formed from elongate members that form an interweave or woven structure.

In an embodiment, the lattice structure 700 has holes in one or more of the joints 701 to allow for air to flow through or any other purpose as described in FIG. 3A. The hole in a joint is provided by a hole in a pin, where the pin extends along the length of the joint. In an embodiment, a hollow core in the pin positioned in a joint 701 allows for tubing 702 to pass through the pin and, thus, the joint. In an example, the tubing may transmit a liquid, such as in irrigation or green house application. In another non-limiting example, the tubing include cables (e.g. electrical cables). In another embodiment not shown here the depth of the joint is substantially great enough to create temperature differentials at either end of the hollow core of the joint, causing material, i.e. air, to flow through the core as a result of natural forces. This flow of material can be influenced by other forces generated by the member; an example being the heat generated from electrical distribution. It will be appreciated that this motion can be captured by attaching a turbine to the end of the tube to capture this energy.

Turning to FIG. 8, an enlarged perspective view of a joint is shown, having the holes of four identical members 801, 802, 803 and 804 aligned with each other and a pin passing there through to prevent rotation about the pin. Elongate members 801 and 804 are aligned with each other, and elongate members 803 and 802 are aligned with each other. Elongate members 803 and 804 are sloped outwards toward the joint, while elongate members 801 and 802 are sloped inwards toward the joint.

Turning to FIG. 9, an example of a curved structure 900 is shown. The curved structure 900 is formed from multiple identical elongate members that are joined using the angled brackets 400. The angle of the bolts protruding from the shim body of the angle brackets 400 determine the curvature of the structure 900. It will be appreciated that the angle of the shim can take any angle so that the total number of sides of the resulting polygon is determined by the angle of the shim.

FIG. 10 shows some the angled brackets 400a, 400b, 400c used to connect elongate members together, a structure 1000 that is part of a curved structure. In particular, each one of angled brackets 400a and 400b have one of the pins securing two elongate members, while the other one of the pins is unused. Angled bracket 400c has one elongate member positioned on each one of the two pins.

FIG. 11 shows a joint using the angled bracket 400. On one pin, there are positioned two elongate members 1101, 1102. On the second pin of the angled bracket, there are positioned two elongate members 1103, 1104.

Using the principles described in FIGS. 9,10 and 11, more elaborate curved structures can be formed. The structures shown in FIGS. 12A and 12B show examples of more elaborate curved structures. The pillar 1200 in FIG. 12B may, In a non-limiting example, be used to form a skeleton to form a concrete pillar.

it will be appreciated that the curvature effect may also be achieved by incorporating certain features shapes into and that are unitary with, an elongate member. For example the relative angle of the end portions to the mid portions my be further adjusted or affect the curvature. In other embodiment of an elongate member, turning briefly to FIGS. 53A and 53B an extruded unitary attachment that extends from the flat face (although shown substantially perpendicular to a flat surface in FIG. 53A) is angled relative to the flat surface (eg. By 10 degrees from perpendicular, or some other angle from perpendicular to provide a curving effect when multiple instances of an elongate member are assembled together. Therefore, in some embodiments angled brackets are not required to create a curved surface or any other nonuniform surface or structure.

In another embodiment one side of the integrated member may capture energy eg. Solar panels furthermore in another embodiment the opposite side of the member uses the energy generated by its opposite side. eg. LED lights Turning to FIGS. 13A and 13B, an embodiment of an elongate member 1300 is shown. The length of the elongate member 1300 is different from the embodiment 300. It will be appreciated that the dimensions and proportions of the elongate member may vary from what is shown in the examples provided herein.

FIGS. 14A, 14B, 14C 14D show an embodiment of different components for building structures with elongate members.

Figures 14A, 14B:
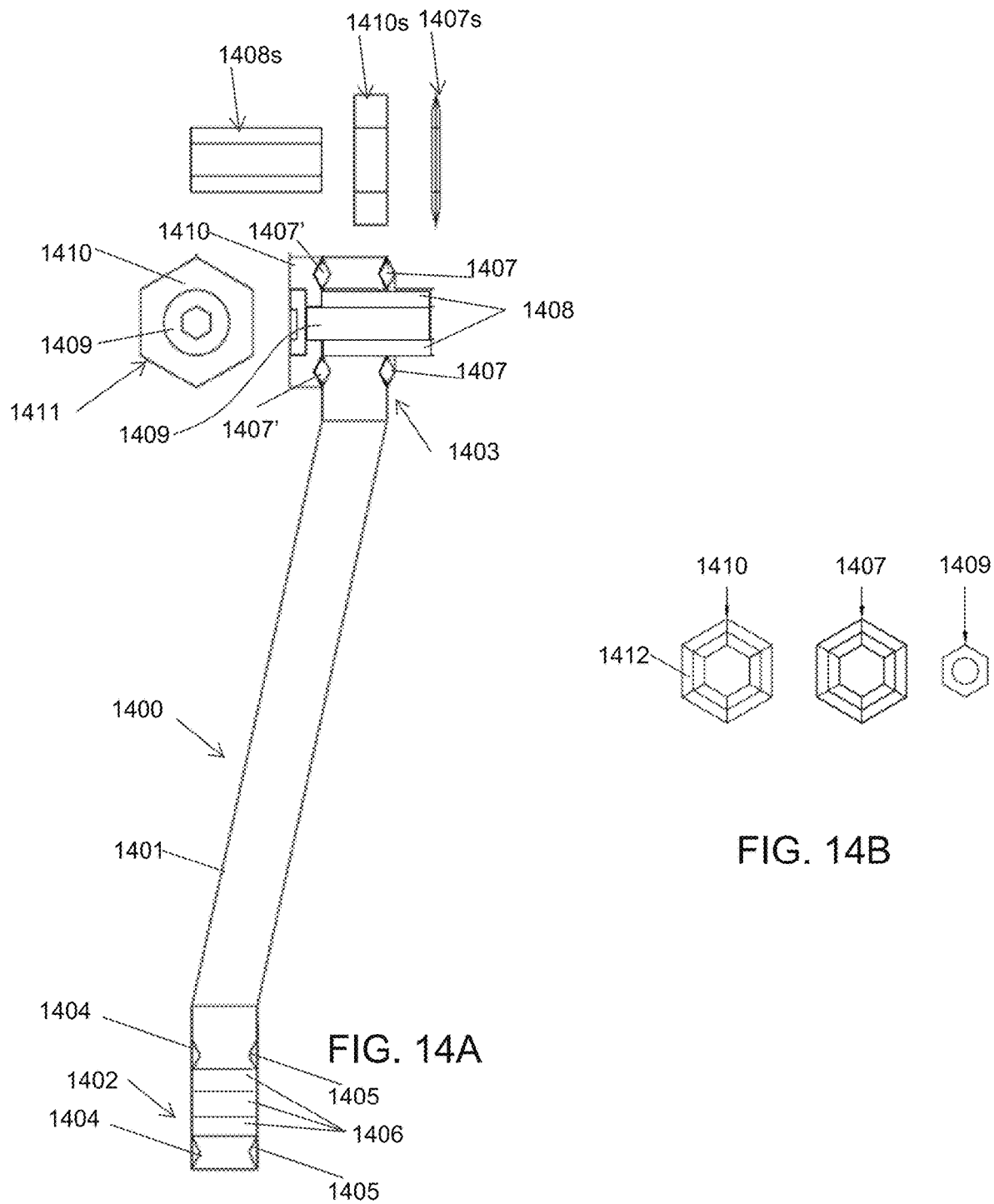

FIG. 14A shows a cross-section view of an elongate member 1400 having an elongate mid-portion 1401 that is sloped and two end portions 1402 and 1403. The end portion 1402 does not have a bolt or other components passing through a hole in the end portion 1402. In particular, the end portion 1402 has inner walls 1406 that define a hole that extends through the end portion 1402. The hole, In an example, is hexagonal shaped. Other polygons may be used in other embodiments. The end portion 1402 also includes a channel 1404 on one face of the end portion, and another channel 1405 on the opposite face of the end portion. As better shown in FIG. 14C, the channels 1404 and 1405 are hexagonal shaped as well. A channel is embedded in the face of an end portion and forms a perimeter around the hole. As can be seen in FIG. 14A, the channels 1404 and 1405 have a V-shaped cross-section profile. Each of the channels 1404 and 1405 are configured to receive a hexagonal shaped torque washer 1407, which is beveled and shaped to match the crosssection profile of the channel.

As shown at the end portion 1403 in FIG. 14A, torque washers 1407, a pin 1408, a spacer 1409 are shown assembled together in a cross-section view. In particular, nested within of the channels at the end portion 1403 respectively are the torque washers 1407 and 1407'. The pin 1408 is placed in the hole of the end portion 1403. A spacer 1410 sits on top of the torque washer 1407' and the pin 1408. A bottom surface of the spacer 1410 also includes a hexagonal channel with a V-shaped cross-section. Therefore, the torque washer 1407', which has a diamond shaped cross-section, is sandwiched or nested by the V-shaped cross-section channel defined within the face of the end portion 1403, and by the Vshaped cross-section channel defined within the underside of the spacer 1410. It will be appreciated that any end portion of any member herein can be adjusted to utilize the torque washer.

The spacer 1410 also defines therein a circular space with a shoulder, which surrounds a narrower opening that extends through the spacer 1410. In this way, a bolt 1409 sits in the spacer. In particular, the circular head of the bolt 1409 sits within the circular space and is braced against the shoulder of the spacer 1410, while the shank of the bolt 1409 extends through the narrower opening of the spacer 1410. The shank of the bolt 1409 extends through the hollow core of the pin 1408. Although not shown, the shank of the bolt may extend beyond the length of the pin, and may be threaded to allow for a nut to secure and compress the contents located between the head of the bolt and the nut. In an embodiment, the top of the circular head of the bolt 1409 is substantially flush with the top of the spacer 1410.

A face-on view 1411 of a spacer 1410 having a bolt 1409 embedded therein is shown in isolation.

Side views, denoted by the suffix 's', of other components in isolation are also shown. In an example, a side view of the pin 1408s, a side view of the spacer 1410s, and a side view of a torque washer 1407s are provided.

Turning to FIG. 14B, bottom views of several components are shown. In particular, a bottom view of the spacer 1410 shows the channel 1412 defined within the underside of the spacer 1410, and configured to receive a torque washer 1407. The V-shaped channel 1412, which is indented into the spacer, compliments the V-shaped bevelling (e.g. protruding shape) of the torque washer 1407. The bottom view of the pin 1409 shows the hollow circular core defined within the pin.

Figure 14D:
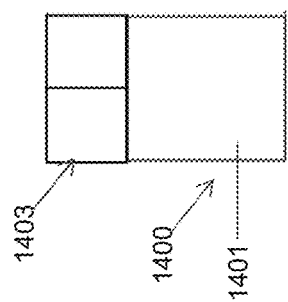
Figure 14C:
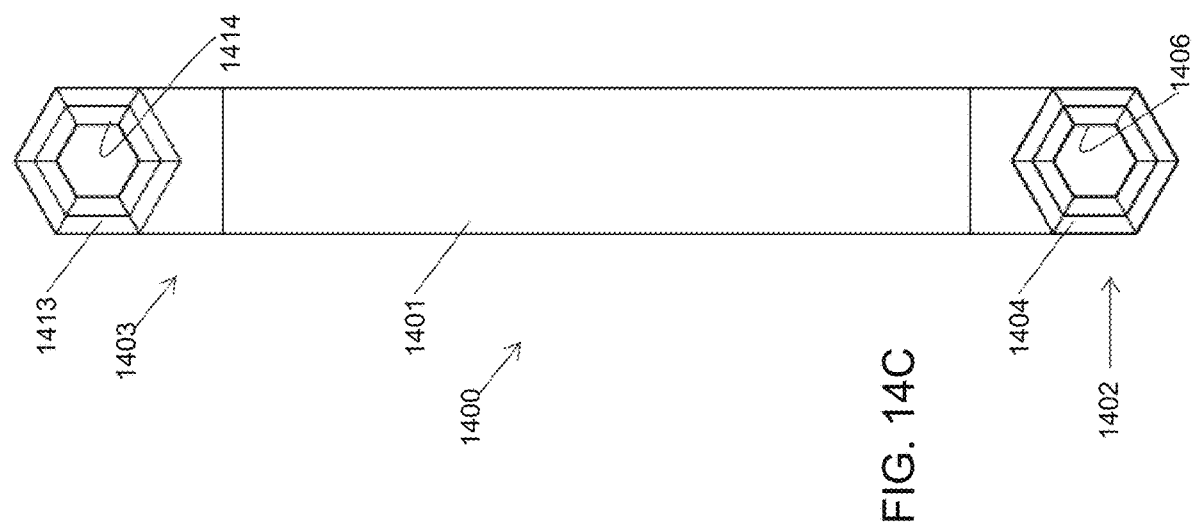

Turning to FIG. 14C, the elongate member 1400 is shown in isolation from a face-on view. The channels 1404 and 1413 are shown at each respective end portions 1402, 1403. The interior walls 1406 define a hole extending through the end portion 1402. The interior walls 1414 define a hole extending through the end portion 1403. FIG. 14D shows a top view of the elongate structural member 1400.

FIGS. 15A and 15B show an exploded view of an example assembly, showing components of a joint. A bolt 1501 includes a bolt head 1502, a circular base 1503 which is used to secure the assembly at the joint as the form of a bolt. For example, there are vertical threads around the perimeter of this circular base, and a shank 1504. The shank 1504 passes through the hole 1507 defined within the spacer 1505. The underside of the spacer 1505 includes an indented channel 1506 that forms a perimeter around the hole 1507. It will be appreciated that the channel 1506 is hexagonal shaped and the outer walls of the spacer is also hexagonal shaped. However, the hole 1507 is circular shaped.

The torque washer 1508 is beveled upwards and downwards and defines therein a hexagonal shaped hole 1407 for the pin 1510 to pass there through. This bevel generates torque that can support the joint of an assembly should the central pin of the end of the elongate member and that of the torque washer be circular, or any other shape.

The pin 1510 is hexagonal shaped and defines therein a circular hole 1511 that extends through the length of the pin. The shank 1504 passes through the hole 1511.

The pin 1510, and the shank 1504 positioned within the pin, pass through a hole created by aligning elongate members 1512, 1513, 1514 and 1515 with each other. The underside of the elongate member 1515 shows a channel 1516 that surrounds an opening of the hole 1517, through which the pin 1510 extends.

FIGS. 16A and 16B respectively show a side view and a front view of a pin-spacer bracket 1600. The bracket 1600 includes an intermediate body 1602 that is positioned between a pin 1601 and a spacer 1603. The bracket 1600 is a unitary component. The pin 1601 and the spacer 1603 are oriented to connect elongate members together, In an example, at angles of substantially 90 degrees. In particular, although not shown in FIGS. 16A and 16B, a flat face of an end portion of a first elongate member that is connected to the pin 1601 will be in a plane that is perpendicular to a plane of a flat face of an end portion of a second elongate member that is connected to the spacer 1603. The first elongate member has a hole through which the pin 1601 may pass through. The second elongate member may be aligned with and connected to the spacer 1603 using a torque washer and a pin (both not shown here). The pin (not shown here) would pass through the hole 1604 defined by the spacer 1603 and the hole of the second elongate member.

FIGS. 17A and 17B respectively show a side view and a front view of an embodiment of a pin-spacer bracket 1700. The bracket 1700 includes an intermediate body 1702 that is positioned between a pin 1701 and a spacer 1703. The spacer 1703 has a hole 1704 for receiving a pin (not shown here). The spacer 1703 is at a different rotation compared to the spacer 1603, thereby allow for different geometries to be created using the elongate members.

FIG. 18 shows an embodiment of an assembly that includes the pin-spacer bracket 1600. In particular, elongate members 1801 and 1802 are connected to the spacer of the bracket 1600, via a pin that is ancillary to the bracket 1600. The elongate members 1803, 1804, 1805 and 1806 are connected together to the pin of the bracket 1600.

FIG. 19 show the assembly of FIG. 18, but from a top-down view and an exploded view. From FIG. 19, the torque washers 1902 and 1901 are shown respectively between the spacer of the bracket 1600 and the elongate member 1801, and between the spacer of the bracket 1600 and the elongate member 1802.

In an embodiment, the elongate members may include electrical conductors (e.g. wires, printed conductive strips, conductive material). In an embodiment, the electrical conductors are embedded within the elongate members. In an embodiment, there are at least two electrical conductors running the length of an elongate member, so as to allow for a circuit to be completed. In an embodiment, there is at least one electrical conductor running the length of an elongate member and, to complete a circuit, two electrical paths along separate elongate members are used. In an embodiment, there are three or more electrical conductors running the length of an elongate member, with one of the conductors being a neutral or ground wire. It is recognized that all channels running through the elongate member can transport any material ie. water, air, etc.

The examples discussed below show two electrical conductors running the length of an elongate member. However, the principles described below apply to the other electrical configurations noted above.

Turning to FIG. 20, elongate members 2001, 2002, 2003 are mechanically fixed to each other at their end portions. Each of these elongate members includes two electrical conductors A and B that run along length of the respective elongate member. The electrical conductor A in the elongate member 2001 in electrically connected to the electrical conductor A in the elongate member 2002, and the electrical conductor A in the elongate member 2002 is electrically connected to the electrical conductor A in the elongate member 2003. Similarly, the electrical conductors B in the different elongate members are electrically connected to each other. Therefore, electrical power from a power source 2000 is able to be transmitted through the structure 2004 that is made from these elongate members. It will be appreciated that the electrical conductors A and B are electrically isolated from each other. It will be appreciated that the methodology for the transmission of electricity in FIG. 20 can be used in any embodiment herein.

Turning to FIG. 21, an exploded view of an assembly is shown, including elongate members 2101, 2102 having electrical conductors. Some of the surfaces of the elongate member 2101 are "invisible" to show the electrical conductors 2105 and 2106 embedded therein. The elongate member 2101 has at one of its end portions a channel 2103 that is able to mechanically interface with one side of the torque washer 2110. The other side of the torque washer 2110 mechanically interfaces with a channel (not shown) on the end portion of the elongate member 2102. Another channel 2104 on the same end portion of the elongate member 2102 is shown.

The electrical conductor 2016 is electrically connected to a conductive surface 2108 on the channel 2103. The electrical conductor 2105 is electrically connected to a separate conductive surface 2107 on the channel 2103. Other surfaces 2109 (or facets) on the channel 2103 separate and electrically isolate the conductive surfaces 2107, 2018. In a particular example, in the hexagon shaped channel, two of the sides of the channel are electrically conductive, while the other sides are not conductive.

The torque washer 2110 includes two conductive portions 2111 and 2109 that are separated from each other and electrically isolated from each other by non-conductive portions 2113 of the torque washer. In the particular example shown, the hexagonal shaped torque washer 2110 includes two adjacent portions 2111 that are conductive. At least one of these portions 2111 will be in mechanical and electrical contact with the conductive surface 2107. Two other adjacent portions 2112 are conductive, and at least one of these portions will be in mechanical and electrical contact with the conductive surface 2108. The two adjacent portions 2111 are electrically connected to each other; and the two adjacent portions 2112 are electrically connected to each other.

One of the portions 2112 is also in mechanical and electrical contact with a conductive surface on a channel on the elongate member 2102, which is aligned with the conductive surface 2114 on the channel 2104. One of the portions 2112 is also in mechanical and electrical contact with a different conductive surface on a channel on the elongate member 2102, which is aligned with the conductive surface 2115 on the channel 2104. It will be appreciated that the two adjacent portions 2111 and the two adjacent portions 2112 allow for different rotated orientations of the elongate member 2101 relative to the elongate member 2102, while still maintaining a flow of electricity from the electrical conductors in the elongate member 2101 to the electrical conductors in the elongate member 2102 via the torque washer 2111. It will be appreciated that the method for transporting electricity or any other material through the elongate members shown in FIG. 21 can also be used in assemblies similar to 200, 500 and 600. 700, 900, 1000.

FIGS. 22 and 23 show other example assemblies of elongate members having electrical conductors embedded therein to form an electrical circuit. In particular, the electrical circuit may extend across a lattice of such elongate members. The FIGS. 22 and 23 are illustrated in the same manner at FIG. 21 and show similar features.

As best shown in FIG. 23, some of the surfaces of the elongate member 2309 have been made "invisible" so as to illustrate electrical conductors 2304 and 2303 embedded therein. In the example shown in FIG. 23, an end portion of the elongate member 2309 includes a channel 2303 on one side and a channel 2301 on the opposite side. The electrical conductor 2304 is electrically connected to a conductive surface 2305 on the channel 2302, and is electrically connected to a conductive surface 2306 on the opposite channel 2301. The electrical conductor 2303 is electrically connected to a conductive surface 2308 on the channel 2302, and is electrically connected to a conductive surface 2307 on the opposite channel 2301.

FIGS. 24A, 24B and 24C show different perspective views of a multi-tiered structure formed by the elongate structural members 2400. The different tiers 2404, 2403, 2402, 2401 are aligned with the tops of the joints of the elongate structural members. In an example, the upper surfaces of the joints 2405 form a plane, on which may be supported a panel or structure that forms the tier 2404. In another non-limiting example, the upper surfaces of the joints 2406 form another plane, on which may be supported a panel or structure that forms the tier 2403. As shown in FIGS. 24B and 24C, the bottom of the multitiered structure is also supported by the bottom of joints 2407, which share a common plane. Panels affixed to the surfaces of joints 2707 and 2405 allow for a hollow interior so that material can to flow within interior of the panel, e.g. concrete.

FIG. 25 shows an embodiment of a structure having walls 2501, 2502, 2503 and 2504. In this example, walls 2501 and 2503 are parallel to each other, and walls 2504 and 2502 are parallel to each other. Wall 2501 is perpendicular to walls 2504 and 2502. The elongate members forming the walls include pin-spacer brackets 2500, which are used to orient elongate members into perpendicular planes.

As seen in FIGS. 26A and 26B, the pin-spacer bracket 2500 includes a first portion 2601 and a second portion 2604. The first portion 2601 is shaped like a spacer, as it includes a channel 2602. However, first portion 2601 also includes interior walls 2603 that define a polygonal hole (e.g. a hexagonal hole) that extends through the first portion. The first portion 2601 is able to mechanically connect with the end portions of elongate structural members via torque washers, and secured to each other using pin, bolt, nut, etc. The second portion 2604 includes a channel 2605 that is polygonal and surrounds a circular hole 2606. The axis of the hole 2605, represented by the dotted line 2607, is substantially perpendicular to the axis of the hole in the first portion 2601, which is represented by the dotted line 2608. The interior wall defining the hole 2606 is threaded so that a threaded bolt may screw into the hole 2606. It will be appreciated that the same methodology applied to the electrical transmission in FIGS. 20-23 can be used for all pin-spacer brackets and angled brackets.

FIG. 27 shows an embodiment of a structure that is assembled from elongate structural members. an embodiment of a pin-spacer bracket 2700 is used to secure the elongate members to each other at perpendicular planes (e.g. or at some other angle).

FIGS. 28A, 28B, 28C and 28D show different views of the pin-spacer bracket 2700, which is similar to the pins-pacer bracket 2500. However, the orientation of the first portion 2802 is rotated by an angle about the axis of hole defined within the first portion. The pin-spacer bracket 2700 also includes a second portion 2801, which is configured in a similar to the second portion of the pin-spacer bracket 2500.

FIGS. 29A, 29B, 29C and 29D show different views of an embodiment of a pin-spacer bracket 2900, which includes three portions 2901, 2902, 2903. Portions 2901 and 2902 each include a channel and a circular hole to receive a bolt. The hole in each one of the portions 2901, 2902 is threaded. Portion 2903 defines therein a hole to receive a polygonal pin. Using the pin-spacer bracket 2900, elongate members may be attached to each other in three different planes. It will be appreciated that FIGS. 29A-D and 30A-D can be assembled using two pin-spacer brackets differing in orientation (e.g. 28A-D). It will be appreciated that the hole in the pin-spacer bracket may continue to the polygonal hole of the spacer portion to allow for material flowing through the centre the change of direction depending on the angle of the pin-spacer bracket.

FIGS. 30A, 30B, 30C and 30D show different views of an embodiment of a pin-spacer bracket 3000, which includes three portions. The pin-spacer bracket 3000 is similar to the pin-spacer bracket 2900, but the portion, which defines therein a polygonal hole for receiving a pin, is rotated by an angle about the axis of the hole.

FIGS. 31-52 each show a top view, a side view and a front view of an example assembly using elongate structural members. The relative positioning of the top, side and front views are the same throughout FIGS. 31-52. In an example, the views are labelled in FIG. 31, which shows in the front view four elongate structural members arranged in a diamond shape. The side view and the top view show the orientation of the elongate members with alternating slopes. FIGS. 31-52 can made up of any assembly of identical members described herein.

In particulars, FIGS. 31-42 show diamond shaped assemblies comprising four elongate members. As can be seen from the top and the side views, the assembled structures have a thin profile. These diamond shaped assemblies may be repeated to form a larger structure. FIGS. 31-42 can be combined in order to create panels or structures shown 200, 500 and 600. 700, 900, 1000 or other assemblies not shown here. It will be appreciated that the individual members that make up FIGS. 31-42 are identical and differ in only orientation or rotation.

Figure 44:
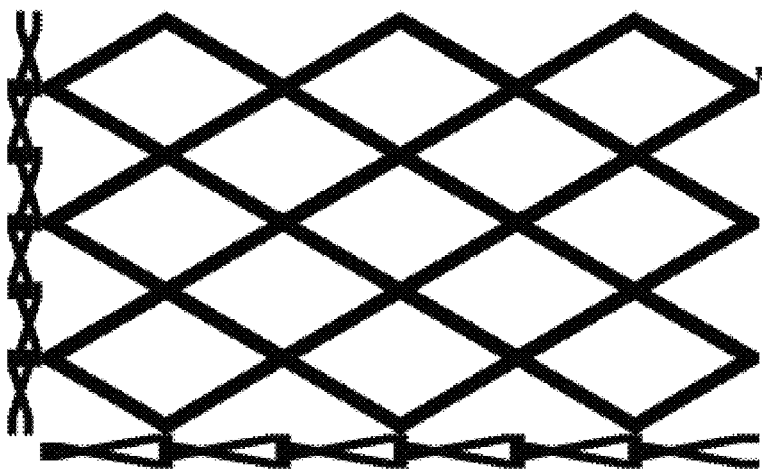
Figure 43:
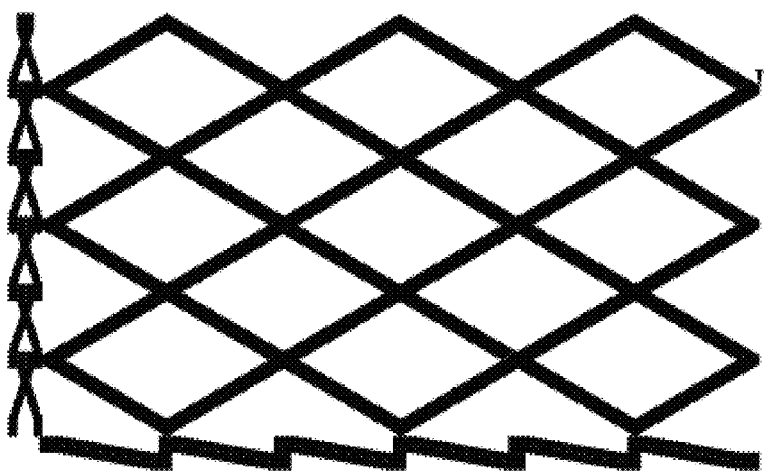
Figure 45:
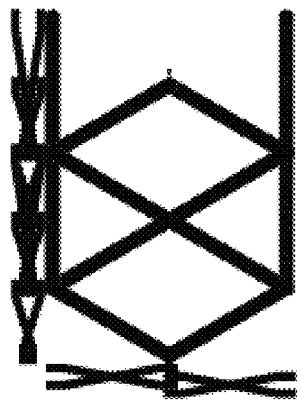
Figure 46:
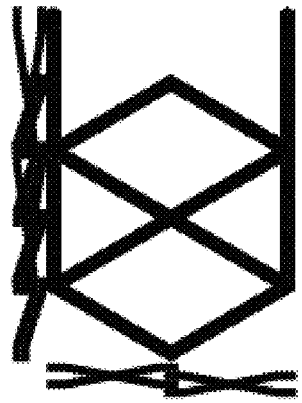
Figure 47:
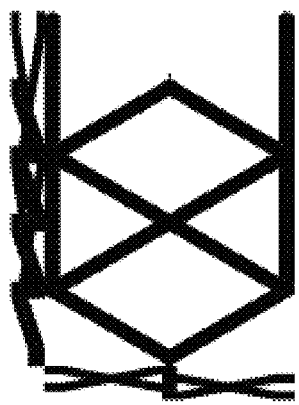
Figure 48:
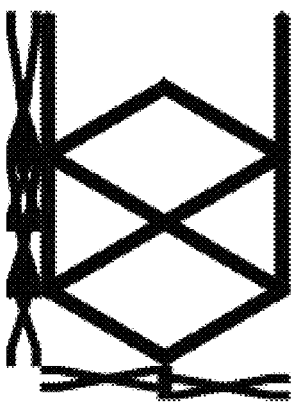

FIGS. 43 and 44 show examples of diamond shaped lattice assemblies. FIGS. 45-48 shows assemblies that have an upper bar and a lower bar separated by diamond shaped substructures. These assemblies may used, for example, to form part of a truss.

Figure 49:
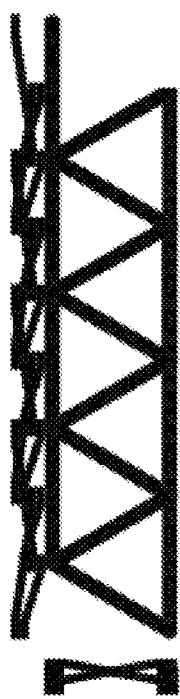

FIG. 49 shows an assembly with an upper bar and a lower bar separated by triangle shaped substructures. This assembly, for example, is used to form part of a truss.

Figure 50:
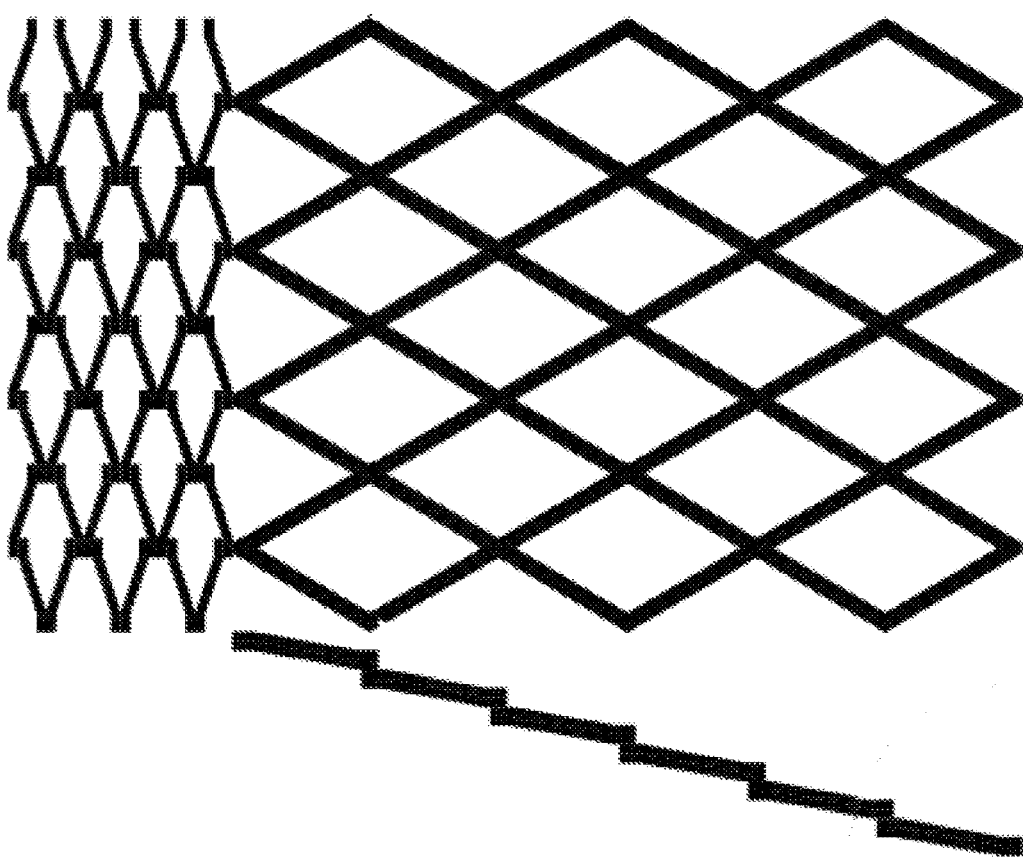
Figure 51:
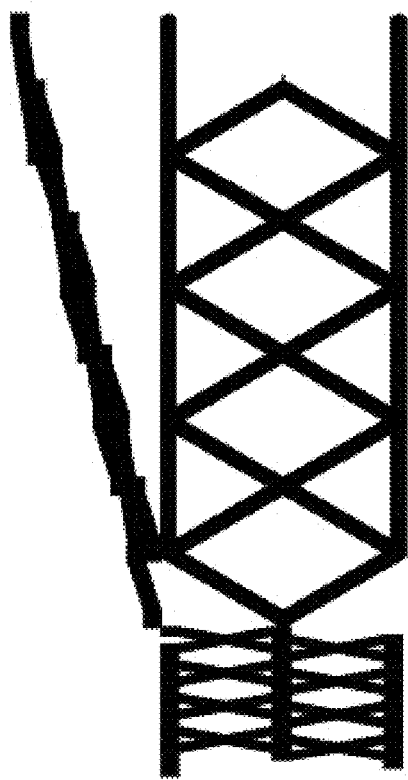
Figure 52:
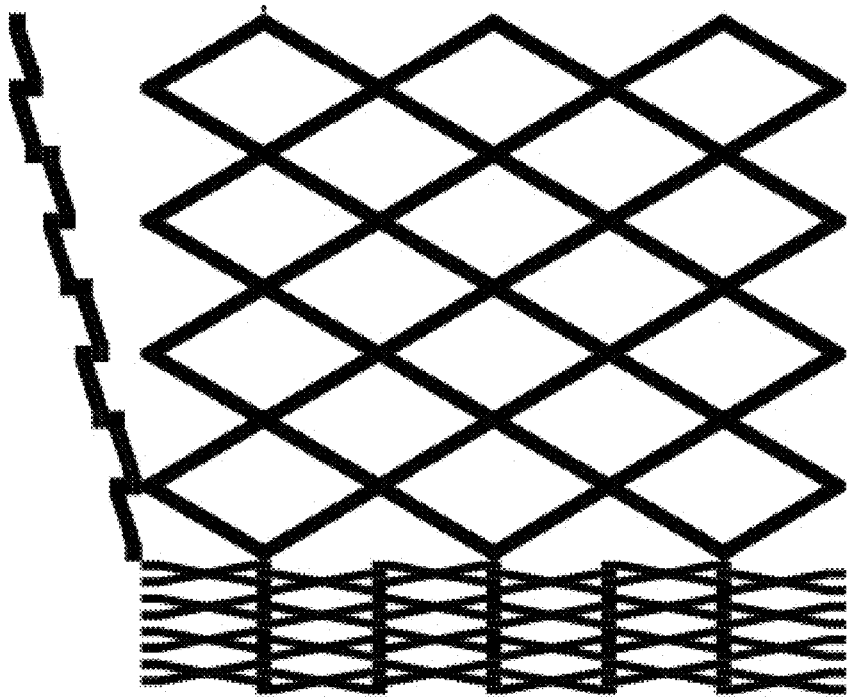

FIG. 50 shows a lattice assembly comprising diamond shaped substructures. As best seen from the side view in FIG. 50, the lattice is sloped. Similarly, the lattice assemblies in FIGS. 51 and 52 are also sloped, as be seen from the top views.

It will therefore be appreciated that the elongate members described herein may be assembled in many ways to form different structures.

Therefore, a kit of parts may include many of the same elongate members. Using the principles described above, many different structures may be assembled together using such a versatile kit. Patterns may be repeated to build larger structures.

The elongate member may also be used to form structures that distribute the load over a larger area, thereby making the structure stronger. Furthermore, each elongate member includes offset faces at the end portions, due to the sloped mid-portion, which creates a narrow triangular stability on the axis perpendicular to the face of the elongate member. The tension caused by the offset adds to the rigidity of the assembly by furthering the opposition of forces as they are interlaced with one another along their individual planes as defined by their given axis.

Furthermore, the components described herein may be sold as a kit, and transported as a kit. The components are collapsible into a small space, which makes transporting such a kit easier.

Turning to FIGS. 53A and 53B an embodiment of an elongate structural member 5301 is shown. It includes an end portion 5302 having a unitary attachment. As best seen in FIG. 53A the unitary attachment is like a pin that is extruded from the flat face 5304 of the end portion 5302. In particular, walls 5303 extend substantially perpendicular outward form the flat face 5304, which form a polygonal perimeter of the unitary attachment. The unitary attachment also includes top surface 5306 and a circular wall 5305 extending downwards from the top surface, to define a circular opening that extends through the end portion 5302. The circular opening allows a bolt to pass through.

From the underside perspective view in FIG. 53B the unitary attachment extends inwards to the flat surface 5307 of the end portion 5302. The flat surface 5307 is the opposite to the flat surface 5304. In particular, walls 5309 extend substantially perpendicularly inward from the flat surface 5307, to define a space having a polygonal perimeter. The space is further defined by an inset surface 5308. The circular wall 5305 extends from the inset surface 5308 to the top of surface 5306. The space shown in FIG. 53B is dimensioned to receive the top surface and outwardly extending walls of another unitary attachment from a different instance of the elongate structural member. In this way, the end portions may be nested together and to lock their relative orientation.

In particular, when two elongate structural members are in a nested configuration a top surface of a first elongate structural member faces the inset surface 5308 of a second elongate structural member. Furthermore, the outwardly extending walls 5303 of the first elongate structural member are flush against the inwardly extending walls 5309 of the second elongate structural member. The circular holes of the two elongate structural members are aligned and a bolt may pass through the holes.

FIG. 54 shows an example assembly (eg. A truss assembly) of multiple instances of elongate members 5301 nested together. It will be appreciated that this example of the elongate structural member may be used to build all structures herein and others not disclosed.

FIGS. 55A and 55b show two perspective view of opposite sides of an embodiment of an elongate structural member 5501. It includes a unitary attachment point that also allows for multiple instances of elongate structural members to be nested together similar to the embodiment 5301. In particular, on one side of the elongate structural member 5501, there is a raised v-structure 5503 that forms a polygonal perimeter of a first polygonal opening (eg. A hexagon-shaped opening). On the opposite side at the same end portion as shown in FIG. 55b, there is an inset v-shaped depression 5504 that forms a polygonal perimeter of a second polygonal opening. The first and the second polygonal openings are at opposite ends of the same polygonal hole that extends through the end portion. It will be appreciated that the revised v-structure of the first elongate structural member nests within the inset v-shaped depression of a second elongate structural member.

FIGS. 56A and 56b show different perspective views of an embodiment of a pin spacer bracket 5600. The general principles and may of the features are similar to the pin-spacer brackets 1600 and 1700 but the orientation of the pin and the spacer are varied. It will be appreciated that all pin-spacer brackets can be integrated into a elongate structural to form a unitary structural member depending on the structure.

The pin-spacer bracket 5600 may be used to create structures with right-angle joints, such as the assembly shown in FIG. 57. It will be appreciated that the angle of the joint is affected by the polygonal or round shape of the pin of the end portion, so that any angle is possible.

FIGS. 58A and 58b show different perspective views of an embodiment of a pin-spacer bracket 5800. It is similar to the pin spacer bracket 5600. but the orientation of the pin and spacer are varied. The pin-spacer bracket 5800 may be used to create structures with right angle joints, or any other angle, such as the example assembly shown in FIG. 59.

General embodiments and example aspects are described below.

In an embodiment, an elongate structural member includes: a first end portion, a second end portion, and an elongate mid- portion that extends between the first and the second end portions; the first end portion within a first plane and the second end portion within a second plane, the first and the second planes are offset and parallel to each other; the elongate mid-portion being sloped between the first and the second planes; and each of the first and the second end portions defining therein a polygonal hole.

In an example aspect, a thickness of the first portion and a thickness of the second portion are both a first distance, and an offset distance of the elongate midportion that is perpendicular between the first and the second planes is proportional to the first distance.

In another non-limiting example aspect, the offset distance is twice the first distance.

In another non-limiting example aspect, the polygonal hole is a hexagon shape.

In another non-limiting example aspect, the first end portions comprises a first flat face and a second flat face at opposite ends; the polygonal hole extends from the first flat face to the second flat face; and a channel is defined within at least one of the first flat face and the second flat face, the channel having a same polygonal shape as the polygonal hole and surrounding an opening of the polygonal hole.

In another non-limiting example aspect, walls that define the channel are angled downwards and inwards to each other form a V-shaped cross-section of the channel.

In another general embodiment, a kit of parts includes at least two elongate structural members, each one of elongate structural members comprising: a first end portion, a second end portion, and an elongate midportion that extends between the first and the second end portions; the first end portion within a first plane and the second end portion within a second plane, the first and the second planes are offset and parallel to each other; the elongate mid-portion being sloped between the first and the second planes; and each of the first and the second end portions defining therein a polygonal hole. The kit also includes: a pin with an polygonal perimeter that is shaped to sit flush within the polygonal hole, the pin defining therein a hollow core extending through a length of the pin; a bolt comprising a bolt head and a shank, a length of the shank longer than the length of the pin and sized to pass through the hollow core of the pin; and a spacer defining therein a polygonal hole, the polygonal hole of the spacer shaped to receive and be flush with the polygonal perimeter of the pin.

In another general embodiment, an assembly includes at least a first elongate structural member and a second elongate structural member, and each of the first and the second elongate structural members includes: a first end portion, a second end portion, and an elongate midportion that extends between the first and the second end portions; the first end portion within a first plane and the second end portion within a second plane, the first and the second planes are offset and parallel to each other; the elongate mid-portion being sloped between the first and the second planes; and each of the first and the second end portions defining therein a polygonal hole. The first end portion of the first elongate structural member is fastened to the first end portion of the second elongate structural member. A pin is positioned through a polygonal hole of first end portion of the first elongate structural member and through a polygonal hole of the first end portion of the second elongate structural member. The pin has a polygonal perimeter that is shaped to sit flush within the polygonal holes of the first and the second elongate structural members, the pin defining therein a hollow core extending through a length of the pin. A bolt includes a bolt head and a shank. A length of the shank is longer than the length of the pin and the shank is positioned within the hollow core of the pin. A spacer defines therein a polygonal hole, with the polygonal hole of the spacer shaped to match the polygonal perimeter of the pin. The spacer is positioned against a face of the first end portion of the first elongate structural member and the pin positioned within the polygonal hole of the spacer.

In an example aspect, the assembly includes a lattice wall formed from multiple elongate structural members, including the first and the second elongate structural members. In another non-limiting example aspect, the assembly includes a cement wall, wherein a cement material encases the lattice wall.

in an embodiment the assembly includes a lattice wall formed from multiple elongate structural member, including the first and second elongate structural members. In another example aspect the assembly includes a cement wall wherein a cement material encases the lattice wall.

in an embodiment cement material is poured over an assembly formed by the elongate structural members, and the cement material hardens to encase the assembly.

in a further embodiment, bolts or pins or both are not used to form the assembly as the cement material will hold the assembly together.

In another general embodiment, an elongate structural member includes: a first end portion, a second end portion, and an elongate mid-portion that extends between the first and the second end portions; the first end portion within a first plane and the second end portion within a second plane, the first and the second planes are offset and parallel to each other; the elongate midportion being sloped between the first and the second planes; the first end portion defining therein a first hole and the second end portion defining therein a second hole; a first electrical conductor embedded in the elongate structural member extending between a first electrical conductive portion at a surface opening of the first hole and a second electrical conductive portion at a surface opening of the second hole; and a second electrical conductor embedded in the elongate structural member extending between a third electrical conductive portion at the surface opening of the first hole and a fourth electrical conductive portion at the surface opening of the second hole.

In an example aspect, the first electrical conductor and the second electrical conductor are electrically insulated from each other; the first electrical conductive portion and the third electrical conductive portion at the surface opening of the first hole are electrically insulated from each other; and the second electrical conductive portion and the fourth electrical conductive portion at the surface opening of the second hole are electrically insulated from each other.

In another general embodiment, a lattice structure includes multiple elongate structural members that are connected at their ends to form joints of the lattice structure. Each of the elongate structural members includes: a first end portion, a second end portion, and an elongate mid-portion that extends between the first and the second end portions; the first end portion within a first plane and the second end portion within a second plane, the first and the second planes are offset and parallel to each other; the elongate mid-portion being sloped between the first and the second planes; and each of the first and the second end portions defining therein a polygonal hole. For a given joint between a first elongate structural member and a second elongate structural member, a first hole of a first end portion of the first elongate structural member is aligned with a second hole of a first end portion of the second elongate structural member. The given joint defines therein a hole extending through the given joint. The hole of the given joint is smaller than and is positioned within the aligned first and the second holes of the first and the second elongate structural members.

In an example aspect, the lattice structure further includes a tube or a cable extending through the hole of the given joint.

It will be appreciated that although features are described herein in combination with each other according to certain embodiments, the features described herein may be combined with each other to form different embodiments that have not been explicitly stated. In other words, different features, components, etc. may be used together according to other embodiments, although not specifically stated.

While the basic principles of these inventions have been described and illustrated herein it will be appreciated by those skilled in the art that variations in the disclosed arrangements, both as to their features and details and the organization of such features and details, may be made without departing from the spirit and scope thereof. Accordingly, the embodiments described and illustrated should be considered only as illustrative of the principles of the inventions, and not construed in a limiting sense.

Detailed descriptions of FIGS. 60-66 and the system and methodology that they describe are contained further herein. It will be appreciated that "material", "fluid", "force", "motion" and "magnetism" may be used interchangeably herein. Furthermore, it will also be appreciated that "centrifugal", "centripetal", "vertical motion", "horizontal motion", "centripetal vortex motion", "centrifugal vortex motion", "vortex motion", "vortex" or "other directional motion" may be used interchangeably herein. Further more it will be appreciated that "Channels", "funnels" and "tubes" may be used interchangeably herein. Further more it will be appreciated that "Turbine", "Structure", "torus", "donut", "vehicle" and "vortex"may be used interchangeably herein. Further more it will be appreciated that "Valves", "hatches" or "openings" may be used interchangeably herein.

It will be appreciated that the material is funnelled toward the centre of the torus shaped structure through the channels that overlap, are woven and funnelled and are nested within each other. The material flowing through the channels are wound similar to that of a spring and maintain potential energy in the absence of exterior inputs. The potential energy of desperate entry vectors are combined to create momentum that further support and accelerates the entry of material through the channels on the exterior of the turbine to the interior of the turbine. Exit vectors within the the interior of the turbine can be directed to a traditional turbine or propeller on the interior of the turbine so as to turn a mass around the central interior axis of the turbine. It will be appreciated that this interior turbine or propellor or mass may be suspended and stabilized by way of magnets or other method so as to reduce drag of the rotating mass within the interior of the turbine structure further increasing the efficiency of the rotating interior mass.

It will be appreciated that those with knowledge of prior art will be able to understand how traditional methods of extracting energy from rotating masses will be able to generate electricity that can be transmitted through the integrated member or by other methods used by those well versed in the prior art. Furthermore additional inputs can be applied using the solar panels affixed or imbedded within the body of the integrated member.

It will be appreciated that the material can be continually channeled further into the centre of the turbine limited only by the volume of the channel and the entry and exit valves or points of entry and exit from the channel. Furthermore It will be appreciated that the turbine captures material from any direction and channels it through an intended path. The path of the material within the turbine is determined by the channels shape and its relationship to other channels of the turbine. The channels may be combined and linked at their ends with other channels. It will be appreciated in another example embodiment the channels within the turbine are separate. Furthermore it will be appreciated that the turbine may be made up of one single channel that changes in direction, shape and volume as winds around the central axis of the torus.

The movement within the channels allow forces or the flow of material to be efficiently converted from centrifugal to centripetal motion and vice versa. It will be appreciated that the methodology contained herein is defined by at least one change of the flow of material through a channel from centripetal to centrifugal motion. Furthermore the combination of one or more channels and the opposing forces on opposing sides of their shared channel allow for further differentiation and capturing of energy to take place.

It will be appreciated that the conversion of motion back and forth eg. Centripetal to centrifugal to centripetal and back again to centripetal is achieved by the nesting the channels inward to the interior of the turbine. In this way the force or the flow of material is wound within the turbine. The energy channeled from the exterior of the turbine to the interior is concerned by way of momentum, and is increased by natural forces determined by the materials from which the turbine is made. In a non-limiting embodiment the upper half of the turbine is clear, capturing the greenhouse effect creating heat, while the bottom of the half of the turbine is opaque, this difference in material creates further temperature differentials which increases the energy, efficiency or force of the material within the channels.

It will be appreciated that exit valves can be affixed to the channels so as to exit the turbine on its exterior. Furthermore the exit channels may be on the interior of the structure so as to apply force to the interior of the turbine. In an example embodiment the exit valves move material from one channel to another. These exit channels may be opened or closed so as to regulate the material flowing through the valve. These exit valves, openings or hatches may be used direct the motion of the vehicle in space when applied to the exterior of the turbine depending on the exit vector. Furthermore the combination of one or more valve may be used to steer the vehicle within multi-dimensional space. It will be appreciated that the combination of one or more valves can be used to propel or create thrust in any given direction or vector. Furthermore exit vectors leaving the channels on the interior of the stationary body of a turbine can be directed to move another nested turbine or other structure propeller within the stationary body of the exterior structure.

It will be appreciated that the flow of material exiting the channels through valves captured in the interior of the structure and rotating around the central axis of the torus may be substantial so as to constitute a mass that can rotate and generate momentum of its own on the interior of the stationary structure. Furthermore it will be appreciated that this momentum of the material on the interior of the structure acts to pull more material from the outside of the structure or turbine, through the channels accounting for a decrease in force from the exterior of the structure while increasing the mass of the spinning material on the interior. Furthermore it will be appreciated that the interior volume of the turbine may be fixed so as to increase the density of the material rotating on the interior of the turbine, further increasing the mass and potential energy. It will be appreciated that interior volume of the turbine may be plastic or may change or increase creating a greater volume of rotating material around the axis of the torus. Furthermore it will be appreciated that the rotating mass on the interior of the structure may be utilized by way of valves directly from the interior to the exterior to generate the effects detailed above.

It will be appreciated that material may enter at any vector enter through valves or ends of the cannel on the exterior surface of the structure. Furthermore valves may be affixed to the end of the channels on the exterior or interior of the structure so as to regulate the intake or outtake of material from the channels. It will be appreciated that numerous entry or exit vectors may be used in combination with each other to achieve different results or for different applications. It will be appreciated that valves may also be a-fixed to the end of the joints of an assembly of integrated members used to assemble the structure of the turbine.

It will be appreciated centripetal or centrifugal motion of a material within the stationary structure generate stability utilizing the physics similar to that of a gyroscope. Furthermore it will be appreciated that this motion of material within the channels may also produce similar stability mentioned above, at vector other than that of the rotating mass within the interior of the structure. Further more it will be appreciated that this stability can be changed or manipulated depending on the relationship of the channels to one another, the channels to the valves or any other variables of elements of components mentioned herein.

It will be appreciated that numerous disparate energy vectors, i.e. swirling masses of air, are then able to be channeled and combined so as to structure the otherwise chaotic motion and structure of particles of water or air or another material. Furthermore It will be appreciated that material flow may originate from any vector so that the the channels become smaller, as the wind inward, through the channels as they funnel and become until such time as the channels are small enough to move individual molecules or atoms or other particles flowing side by side in the intended direction, It will be appreciated that the inner shape of the channel may be such that it influences the flow of material prior to the particulate phase of the material e.g. fins causing the material to rotate within the channel at an angle or rotation different or similar the the direction of the channel itself. Furthermore that alignment of the particles increases the efficiency of the flow of material through the channels. The outward or capturing end of the channel is greater then the inner portion of the channel and the material is forced into a funnel making use of vortex motion within the channel or through the axis of the turbine. Furthermore this motion vortex motion acts to excellerate the flow of material through the channels of the turbine causing all portion within the system to accelerate and thus generate more energy. Further more it will be appreciated that the absence of force entering the outer end or wide end of the channel the inner motion of the funnel as it narrows acts to create a negative pressure or pull on the material outside the turbine and organize the material outside the exterior of the system of the turbine.

It will be appreciated that the turbine makes use of temperature differentials at each end of a given channel as described in the length of the pin of the joint of the elongate member. Furthermore it will be appreciated that the combination of multiple forces and methods of generating, channeling and organizing disparate energy sources, originating from multiple entry vectors cause the system to be efficient, generate more force and moment, while creating the conditions and environment that support further efficient entry of material and force into the system. It will be appreciated that the pull begins to organize the material outside turbine, this organization of material on the exterior the turbine further increases the efficiency of the turbine as it moves toward the centre. It will be appreciated that the channels change the direction of the material without significantly decreasing the energy move the direction of the material in the opposite direction.

Material flows in opposite direction on opposite sides of a surface. It will be recognized that a smaller simpler turbine whose axis is or is not substantially parallel, may be affixed to the surface with the channel wall, or any surface of the channel, whose fins capture the energy of the material flowing in opposite directions over their shared channel walls. These opposing directions of the flow of material are complimentary and both add to the momentum and energy generated by that of the spinning body of the turbine affixed to the surface of the channel.

It will be appreciated that the offset panels of the interior of a turbine structure and the exterior of an interior nested turbine may be clad in magnets that are substantially parallel to each other, having opposing magnetic forces so as to create repulsion, causing the interior turbine to turn around its central axis while the exterior structure stays stationary. It will be appreciate that magnets can be applied imbedded to the elongate mid-portion or the end pieces of the integrated ember so as to utilize the differential in angle and allow for the opposing forces to create motion around a central axis of the pin or of the central of the turbine axis. Furthermore in an example embodiment the centre of circular opening at the end of an elongate member may be stacked to form a joint of multiple elongate members whose mid-portions are positioned to allow for the opposing magnetic forces to create a spinning motion around the central axis of the centre of the opening in the end portion of the elongate member. Furthermore it will be appreciated that the angle and shape of the elongate mid-portion can have magnets or electro magnets or other electrical devices embedded in their surface magnets or interior so as to allow for the motion described above.

The invention claimed is:

1. An elongate structural member comprising:
 a first end portion, a second end portion, and an elongate mid-portion that extends between the first and the second end portions;
 the first end portion within a first plane and the second end portion within a second plane, the first and the second planes are offset and parallel to each other;
 the elongate mid-portion being sloped between the first and the second planes;
 each of the first and the second end portions defining therein a polygonal hole; and
 wherein the first end portion comprises a first flat face and a second flat face at opposite ends; the polygonal hole extends from the first flat face to the second flat face; and a channel is defined within at least one of the first flat face and the second flat face, the channel having a same polygonal shape as the polygonal hole and surrounding an opening of the polygonal hole.

2. The elongate structural member of claim 1 wherein a thickness of the first portion and a thickness of the second portion are both a first distance, and an offset distance of the elongate mid-portion that is perpendicular between the first and the second planes is proportional to the first distance.

3. The elongate structural member of claim 2, wherein the offset distance is twice the first distance.

4. The elongate structural member of claim 1 wherein the polygonal hole is a hexagon shape.

5. The elongate structural member of claim 1 wherein walls that define the channel are angled downwards and inwards to each other form a V-shaped cross-section of the channel.

6. The elongate structure of claim 1 further comprising a first electrical conductor and a second electrical conductor that extend between the first end portion and the second end portion.

7. A kit of parts comprising:
 at least two elongate structural members, each one of elongate structural members comprising:
  a first end portion, a second end portion, and an elongate mid-portion that extends between the first and the second end portions;
  the first end portion within a first plane and the second end portion within a second plane, the first and the second planes are offset and parallel to each other;
  the elongate mid-portion being sloped between the first and the second planes; and
  each of the first and the second end portions defining therein a polygonal hole;
 a pin with a polygonal perimeter that is shaped to sit within the polygonal hole, the pin defining therein a hollow core extending through a length of the pin;
 a bolt comprising a bolt head and a shank, a length of the shank longer than the length of the pin and sized to pass through the hollow core of the pin; and
 a spacer defining therein a polygonal hole, the polygonal hole of the spacer shaped to receive the pin.

8. The kit of parts of claim 7 wherein each one of the elongate structural members further comprise a first electrical conductor and a second electrical conductor that extend between the first end portion and the second end portion.

9. The kit of parts of claim 7 wherein the bolt defines therein a hollow core passing through the entire length of the bolt.

10. The kit of parts of claim 9 further comprising a cable that passes through the hollow core of the bolt.

11. The kit of parts of claim 9 further comprising a tube that passes through the hollow core of the bolt.

12. An assembly comprising at least a first elongate structural member and a second elongate structural member, each of the first and the second elongate structural members comprising:
 a first end portion, a second end portion, and an elongate mid-portion that extends between the first and the second end portions;
 the first end portion within a first plane and the second end portion within a second plane, the first and the second planes are offset and parallel to each other;
 the elongate mid-portion being sloped between the first and the second planes; and
 each of the first and the second end portions defining therein a polygonal hole;
 the first end portion of the first elongate structural member fastened to the first end portion of the second elongate structural member, comprising a pin positioned through a polygonal hole of first end portion of the first elongate structural member and through a polygonal hole of the first end
 portion of the second elongate structural member, the pin having a polygonal perimeter that is shaped to sit within the polygonal holes of the first and the second elongate structural members, the pin defining therein a hollow core extending through a length of the pin;
 a bolt comprising a bolt head and a shank, a length of the shank longer than the length of the pin and positioned within the hollow core of the pin; and
 a spacer defining therein a polygonal hole, the polygonal hole of the spacer shaped to match the polygonal perimeter of the pin, the spacer positioned against a face of the first end portion of the first elongate structural member and the pin positioned within the polygonal hole of the spacer.

13. The assembly of claim 12 comprising a lattice wall formed from multiple elongate structural members, include the first and the second elongate structural members.

14. The assembly of claim 13 further comprising a cement wall, wherein a cement material encases the lattice wall.

15. The assembly of claim 12 wherein each one of the first and the second elongate structural members further comprise a first electrical conductor and a second electrical conductor that extend between the first end portion and the second end portion.

16. The assembly of claim 12 wherein the bolt defines therein a hollow core passing through the entire length of the bolt.

17. The assembly of claim 16 wherein a cable passes through the hollow core of the bolt.

18. The assembly of claim 16 wherein a tube that passes through the hollow core of the bolt.

19. An elongate structural member comprising:
a first end portion, a second end portion, and an elongate mid-portion that extends between the first and the second end portions;
the first end portion within a first plane and the second end portion within a second plane, the first and the second planes are offset and parallel to each other;
the elongate mid-portion being sloped between the first and the second planes;
the first end portion defining therein a first hole and the second end portion defining therein a second hole;
a first electrical conductor embedded in the elongate structural member extending between a first electrical conductive portion at a surface opening of the first hole and a second electrical conductive portion at a surface opening of the second hole; and
a second electrical conductor embedded in the elongate structural member extending between a third electrical conductive portion at the surface opening of the first hole and a fourth electrical conductive portion at the surface opening of the second hole.

20. The elongate structural member of claim 19, wherein the first electrical conductor and the second electrical conductor are electrically insulated from each other; the first electrical conductive portion and the third electrical conductive portion at the surface opening of the first hole are electrically insulated from each other; and the second electrical conductive portion and the fourth electrical conductive portion at the surface opening of the second hole are electrically insulated from each other.

21. A lattice structure comprising:
multiple elongate structural members that are connected at their ends to form joints of the lattice structure;
each of the elongate structural members comprising:
a first end portion, a second end portion, and an elongate mid-portion that extends between the first and the second end portions;
the first end portion within a first plane and the second end portion within a second plane, the first and the second planes are offset and parallel to each other;
the elongate mid-portion being sloped between the first and the second planes; and
each of the first and the second end portions defining therein a polygonal hole;
for a given joint between a first elongate structural member and a second elongate structural member, the polygonal hole of a first end portion of the first elongate structural member is aligned with the polygonal hole of a first end portion of the second elongate structural member; and
the given joint defining therein a hole extending through the given joint, the hole of the given joint being smaller than and being positioned within the aligned polygonal holes of the first and the second elongate structural members.

22. The lattice structure of claim 21 further comprising a tube extending through the hole of the given joint.

23. The lattice structure of claim 21 further comprising a cable extending through the hole of the given joint.

24. A kit of parts comprising:
at least two elongate structural members, each one of elongate structural members comprising:
a first end portion, a second end portion, and an elongate mid-portion that extends between the first and the second end portions;
the first end portion within a first plane and the second end portion within a second plane, the first and the second planes are offset and parallel to each other;
the elongate mid-portion being sloped between the first and the second planes; and
each of the first and the second end portions defining therein a polygonal hole; and
an angled bracket comprising two pins that protrude outwardly from a shim body, and the two pins are at angle from each other, and wherein each of the pins have a perimeter that is shaped to sit within the polygonal hole.

25. The kit of parts of claim 24 wherein the each of the pins have defined therein a void for receiving a bolt; and the kit of parts further comprise at least two bolts.

26. An assembly comprising at least a first elongate structural member and a second elongate structural member, each of the first and the second elongate structural members comprising:
a first end portion, a second end portion, and an elongate mid-portion that extends between the first and the second end portions;
the first end portion within a first plane and the second end portion within a second plane, the first and the second planes are offset and parallel to each other;
the elongate mid-portion being sloped between the first and the second planes; and
each of the first and the second end portions defining therein a hole;
the first end portion of the first elongate structural member fastened to the first end portion of the second elongate structural member by an angled bracket, wherein the angled bracket comprises a first pin and a second pin protruding from a shim body at an angle relative to each other, wherein the first pin is positioned through a polygonal hole of first end portion of the first elongate structural member and the second pin is positioned through a polygonal hole of the first end portion of the second elongate structural member, and wherein each of the first pin and the second pin have a polygonal perimeter.

27. The assembly of claim 26 wherein each one of the first pin and the second pin define therein a void; and a first bolt is positioned in the first pin's void and a second bolt is positioned in the second pin's void.

28. A kit of parts comprising:
at least two elongate structural members, each one of elongate structural members comprising:
a first end portion, a second end portion, and an elongate mid-portion that extends between the first and the second end portions;
the first end portion within a first plane and the second end portion within a second plane, the first and the second planes are offset and parallel to each other;
the elongate mid-portion being sloped between the first and the second planes; and
each of the first and the second end portions defining therein a polygonal hole;
a bracket comprising a pin extending from a spacer that form a unitary body, wherein the pin has a polygonal perimeter that is shaped to sit within the polygonal hole, and wherein the spacer defines therein a polygonal hole that is shaped to receive an ancillary pin; and
the ancillary pin, wherein, in assembly, the ancillary pin placed in the spacer and the pin of the bracket are at an angle to each other.

29. An assembly comprising at least a first elongate structural member and a second elongate structural member, each of the first and the second elongate structural members comprising:
a first end portion, a second end portion, and an elongate mid-portion that extends between the first and the second end portions;
the first end portion within a first plane and the second end portion within a second plane, the first and the second planes are offset and parallel to each other;
the elongate mid-portion being sloped between the first and the second planes; and
each of the first and the second end portions defining therein a polygonal hole;
the first end portion of the first elongate structural member fastened to a bracket comprising a pin extending from a spacer, the bracket being a unitary body, and wherein the pin is positioned through the polygonal hole of the first end portion of the first elongate structural member;
the first end portion of the second elongate structural member is also fastened to the bracket, wherein an ancillary pin with a polygonal perimeter is positioned both in the polygonal hole of the first end portion of the second elongate structural member and in a polygonal hole defined in the spacer, and wherein the ancillary pin is at an angle to the pin of the bracket.

30. An elongate structural member comprising:
a first end portion, a second end portion, and an elongate mid-portion that extends between the first and the second end portions;
the first end portion within a first plane and the second end portion within a second plane, the first and the second planes are offset and parallel to each other;
the elongate mid-portion being sloped between the first and the second planes;
the first end portion comprising a first surface and an opposite facing second surface with a first hole extending there between with a polygonal inset channel surrounding the hole on the first surface and a complimentary raised polygonal protrusion surrounding the hole on the second surface;
the second end portion comprising a third surface and an opposite facing fourth surface with a second hole extending there between with a polygonal inset channel surrounding the second hole on the third surface and a complimentary raised polygonal protrusion surrounding the second hole on the fourth surface, and wherein the first and the third surfaces face a first same direction and the second and the fourth surfaces face a second same direction.

31. The elongate structure of claim 30 wherein the first hole and the second hole are circular holes.

32. The elongate structure of claim 30 wherein the first hole and the second hole are polygonal holes.

33. An elongate structural member comprising:
a first end portion, a second end portion, and an elongate mid-portion that extends between the first and the second end portions;
the first end portion within a first plane and the second end portion within a second plane, the first and the second planes are offset and parallel to each other;
the elongate mid-portion being sloped between the first and the second planes;
the first end portion comprising a first surface and an opposite facing second surface with a first polygonal hole extending there between, and a first channel and a second channel are respectively
defined within the first and the second surfaces, the first and the second channels having a same polygonal shape as the first polygonal hole and surrounding the first polygonal hole;
the second end portion comprising a third surface and an opposite facing fourth surface with a second polygonal hole extending there between, and a third channel and a fourth channel are respectively defined within the third and the fourth surfaces, the third and the fourth channels having a same polygonal shape as the second polygonal hole and surrounding the second polygonal hole.

* * * * *